US011835119B2

(12) United States Patent
Moulin

(10) Patent No.: US 11,835,119 B2
(45) Date of Patent: Dec. 5, 2023

(54) TRACK SYSTEM WITH A SUPPORT MEMBER

(71) Applicant: Lear Corporation, Southfield, MI (US)

(72) Inventor: Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 367 days.

(21) Appl. No.: 17/179,170

(22) Filed: Feb. 18, 2021

(65) Prior Publication Data

US 2021/0261169 A1   Aug. 26, 2021

Related U.S. Application Data

(60) Provisional application No. 62/979,812, filed on Feb. 21, 2020.

(51) Int. Cl.
*F16H 55/26* (2006.01)
*F16H 1/04* (2006.01)
(Continued)

(52) U.S. Cl.
CPC .......... *F16H 55/26* (2013.01); *B60N 2/0722* (2013.01); *B60N 2/08* (2013.01); *B61B 13/02* (2013.01); *B61C 11/04* (2013.01); *B61F 9/00* (2013.01); *E01B 25/04* (2013.01); *F16H 1/04* (2013.01); *F16H 55/17* (2013.01); *F16H 57/12* (2013.01); *H01R 13/187* (2013.01); *H01R 13/62911* (2013.01); *H01R 33/02* (2013.01); *H01R 33/92* (2013.01); *H01R 33/94* (2013.01);
(Continued)

(58) Field of Classification Search
CPC ...... B60N 2/0722; B60N 2/0715; B60N 2/08; F16H 55/26; F16H 55/17; F16H 57/12; F16H 19/04; B61B 13/02; B61F 9/00
See application file for complete search history.

(56) References Cited

U.S. PATENT DOCUMENTS 1,962,789 A   6/1934 Simpson
2,126,143 A   8/1938 McGregor
(Continued)

FOREIGN PATENT DOCUMENTS

CH   523159 A   5/1972
CN   1182686 A   5/1998
(Continued)

OTHER PUBLICATIONS

Co-pending U.S. Appl. No. 16/711,661, filed Dec. 12, 2019.
(Continued)

*Primary Examiner* — Robert J McCarry, Jr.
(74) *Attorney, Agent, or Firm* — McGarry Bair PC

(57) ABSTRACT

An anchor for a support member of a track system may include an anchor body and a toothed anchor portion. The anchor body may be connectable to said support member. The toothed anchor portion may include a plurality of anchor teeth configured to engage a plurality of track teeth of a toothed portion of a track assembly. The anchor body and the toothed anchor portion may be connected to one another to collectively form a hook portion configured to engage said toothed portion of said track assembly. At least a subset of anchor teeth of the plurality of anchor teeth may be disposed one after another in a curved or angled configuration to define a curved or angled row of anchor teeth.

20 Claims, 29 Drawing Sheets

(51) Int. Cl.
  *F16H 55/17* (2006.01)
  *F16H 57/12* (2006.01)
  *B61B 13/02* (2006.01)
  *B61C 11/04* (2006.01)
  *H01R 13/187* (2006.01)
  *H01R 13/629* (2006.01)
  *H01R 33/02* (2006.01)
  *H01R 33/92* (2006.01)
  *H01R 33/94* (2006.01)
  *B61F 9/00* (2006.01)
  *E01B 25/04* (2006.01)
  *B60N 2/07* (2006.01)
  *B60N 2/08* (2006.01)
  *F16H 19/00* (2006.01)
  *H01R 39/64* (2006.01)

(52) U.S. Cl.
  CPC ...... *B60N 2/0715* (2013.01); *F16H 2019/008* (2013.01); *H01R 39/64* (2013.01); *H01R 2201/26* (2013.01)

(56) References Cited

U.S. PATENT DOCUMENTS

| | | |
|---|---|---|
| 2,263,554 A | 11/1941 | Brach |
| 2,480,622 A | 8/1949 | Warnock |
| 2,678,082 A | 5/1954 | Nathan |
| 3,096,066 A | 7/1963 | Granet et al. |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,154,422 A | 5/1979 | Muhr |
| 4,198,025 A | 4/1980 | Lowe et al. |
| 4,238,099 A | 12/1980 | Hunwicks |
| 4,243,248 A | 1/1981 | Scholz et al. |
| 4,281,871 A | 8/1981 | Grittner |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,804,229 A | 2/1989 | Nishino |
| 4,830,531 A | 5/1989 | Condit et al. |
| 4,853,555 A | 8/1989 | Wheat |
| 4,941,636 A | 7/1990 | Fujiwara et al. |
| 4,961,559 A | 10/1990 | Raymor |
| 4,969,621 A | 11/1990 | Munchow et al. |
| 4,987,316 A | 1/1991 | White et al. |
| 5,106,144 A | 4/1992 | Hayakawa et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,302,065 A | 4/1994 | Vogg et al. |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,524,504 A | 6/1996 | Brandoli et al. |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,785,387 A | 7/1998 | Hernandez et al. |
| 5,796,177 A | 8/1998 | Werbelow et al. |
| 5,800,015 A | 9/1998 | Tsuchiya et al. |
| 5,893,545 A | 4/1999 | Lyons et al. |
| 5,899,532 A | 5/1999 | Paisley et al. |
| 5,918,847 A | 7/1999 | Couasnon |
| 5,921,606 A | 7/1999 | Moradell et al. |
| 5,931,436 A | 8/1999 | Rohee |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,260,813 B1 | 7/2001 | Whitcomb |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,364,272 B1 | 4/2002 | Schuler et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,588,722 B2 | 7/2003 | Eguchi et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,869,057 B2 | 3/2005 | Matsumoto et al. |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,156,463 B2 | 1/2007 | Taubmann et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |

(56) References Cited

U.S. PATENT DOCUMENTS

| | | |
|---|---|---|
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,408,631 B2 | 4/2013 | Sandmann et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,578 B2 | 6/2014 | Kitamura et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,399,412 B2 | 7/2016 | Kanai |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,879,458 B2 | 1/2018 | Gabriel et al. |
| 9,919,624 B2 | 3/2018 | Cziomer et al. |
| 9,950,682 B1 | 4/2018 | Gramenos et al. |
| 10,059,229 B2 | 8/2018 | Kume et al. |
| 10,059,232 B2 | 8/2018 | Frye et al. |
| 10,160,351 B2 | 12/2018 | Sugimoto et al. |
| 10,220,731 B2 | 3/2019 | Kume |
| 10,479,227 B2 | 11/2019 | Nolte et al. |
| 10,486,554 B2 | 11/2019 | Napau |
| 10,493,243 B1 | 12/2019 | Braham |
| 10,547,135 B2 | 1/2020 | Sugiura |
| 10,549,659 B2 | 2/2020 | Sullivan et al. |
| 10,583,752 B2 | 3/2020 | Higuchi |
| 10,654,378 B2 | 5/2020 | Pons |
| 11,220,194 B2 | 1/2022 | Krpo |
| 2002/0056798 A1 | 5/2002 | Eguchi |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2011/0225773 A1 | 9/2011 | Hearn et al. |
| 2012/0001049 A1 | 1/2012 | Selbold |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0153735 A1 | 6/2013 | Ruthman et al. |
| 2013/0334390 A1 | 12/2013 | Schebaum |
| 2013/0341479 A1 | 12/2013 | Yamada et al. |
| 2014/0110554 A1 | 4/2014 | Oya et al. |
| 2014/0224954 A1 | 8/2014 | Oh et al. |
| 2014/0263920 A1 | 9/2014 | Anticuar et al. |
| 2014/0265479 A1 | 9/2014 | Bennett |
| 2014/0291473 A1 | 10/2014 | Mischer |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0298580 A1 | 10/2015 | Kanai |
| 2016/0039314 A1 | 2/2016 | Anticuar et al. |
| 2016/0154170 A1 | 6/2016 | Thompson et al. |
| 2016/0181708 A1 | 6/2016 | Busse |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166091 A1 | 6/2017 | Cziomer |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0058122 A1 | 3/2018 | Lang |
| 2018/0072188 A1 | 3/2018 | Yamada |
| 2018/0086230 A1 | 3/2018 | Kume et al. |
| 2018/0086232 A1 | 3/2018 | Kume |
| 2018/0105072 A1 | 4/2018 | Pons |
| 2018/0126875 A1 | 5/2018 | Kume et al. |
| 2018/0148011 A1 | 5/2018 | Zaugg et al. |
| 2018/0154799 A1 | 6/2018 | Lota |
| 2018/0183623 A1 | 6/2018 | Schoenfeld et al. |
| 2018/0244175 A1 | 8/2018 | Tan |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0010001 A1 | 1/2020 | Pinkelman et al. |
| 2020/0047641 A1 | 2/2020 | D'Eramo et al. |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0247275 A1 | 8/2020 | Yetukuri et al. |
| 2020/0262367 A1 | 8/2020 | Fernandez Banares et al. |

(56) References Cited

U.S. PATENT DOCUMENTS

| | | |
|---|---|---|
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2021/0101562 A1 | 4/2021 | Ricart et al. |
| 2021/0105011 A1 | 4/2021 | Ricart et al. |
| 2021/0105012 A1 | 4/2021 | Ricart et al. |
| 2021/0107419 A1 | 4/2021 | Ricart et al. |
| 2021/0129710 A1 | 5/2021 | Petit et al. |
| 2021/0129778 A1 | 5/2021 | Fernandez Banares et al. |

FOREIGN PATENT DOCUMENTS

| | | | |
|---|---|---|---|
| CN | 201272262 Y | | 7/2009 |
| CN | 203190203 U | | 9/2013 |
| CN | 103380024 A | | 10/2013 |
| CN | 203799201 U | | 8/2014 |
| CN | 104071039 A | | 10/2014 |
| CN | 104487282 A | | 4/2015 |
| CN | 104648190 A | | 5/2015 |
| CN | 206287857 U | | 6/2017 |
| CN | 106965712 A | | 7/2017 |
| CN | 106994917 A | * 8/2017 | ............... B60N 2/42 |
| CN | 106994917 A | | 8/2017 |
| CN | 107614316 A | | 1/2018 |
| CN | 107867204 A | | 1/2018 |
| CN | 107706680 A | | 2/2018 |
| CN | 107804196 A | | 3/2018 |
| CN | 107867205 A | | 4/2018 |
| CN | 109070771 A | | 12/2018 |
| CN | 208640054 U | | 3/2019 |
| CN | 109878384 A | | 6/2019 |
| CN | 110435487 A | | 11/2019 |
| CN | 110435493 A | | 11/2019 |
| CN | 110435494 A | | 11/2019 |
| CN | 209599576 U | | 11/2019 |
| CN | 110856444 A | | 2/2020 |
| DE | 2004504 A1 | | 8/1971 |
| DE | 2659311 A1 | | 7/1978 |
| DE | 19509344 A1 | | 9/1996 |
| DE | 19602250 A1 | | 7/1997 |
| DE | 10143721 A1 | | 3/2003 |
| DE | 60100054 T2 | | 7/2003 |
| DE | 202005013714 U1 | | 12/2005 |
| DE | 102005007430 A1 | | 3/2006 |
| DE | 102006022032 A1 | | 12/2006 |
| DE | 102009059126 A1 | | 7/2010 |
| DE | 102010017038 A1 | | 2/2011 |
| DE | 102011002656 A1 | | 9/2011 |
| DE | 102011056278 A1 | | 2/2013 |
| DE | 202014102336 U1 | | 6/2014 |
| DE | 102013109653 A1 | | 3/2015 |
| DE | 102015212100 A1 | | 12/2015 |
| DE | 102016113409 A1 | | 4/2017 |
| DE | 102015221077 A1 | | 5/2017 |
| DE | 102017210396 A1 | | 12/2017 |
| DE | 102019206304 A1 | | 11/2019 |
| DE | 102019206411 A1 | | 11/2019 |
| DE | 102020128572 A1 | | 5/2021 |
| DE | 102019135631 A1 | | 6/2021 |
| EP | 0074754 A2 | | 3/1983 |
| EP | 0090235 A2 | | 10/1983 |
| EP | 0783990 A1 | | 7/1997 |
| EP | 1176047 A1 | | 1/2002 |
| EP | 2298609 B1 | | 3/2011 |
| EP | 3150426 A1 | | 4/2017 |
| EP | 3456579 A1 | | 3/2019 |
| FR | 2762814 A1 | | 11/1998 |
| FR | 2951329 A1 | | 4/2011 |
| FR | 2986751 A1 | | 8/2013 |
| JP | 2001500307 A | | 1/2001 |
| JP | 3314591 B2 | | 8/2002 |
| JP | 2003227703 A | | 8/2003 |
| JP | 2004103346 | | 4/2004 |
| JP | 2005119518 A | | 5/2005 |
| JP | 2007112174 A | | 5/2007 |
| JP | 2008158578 A | | 7/2008 |
| JP | 4222262 B2 | | 2/2009 |
| JP | 2009200023 A | | 9/2009 |
| JP | 2009202813 A | | 9/2009 |
| JP | 2013230721 A | | 11/2013 |
| JP | 2019098789 A | | 6/2019 |
| JP | 2020023292 A | | 2/2020 |
| KR | 20100044775 A | | 4/2010 |
| WO | 01/87665 A1 | | 11/2001 |
| WO | 2003002256 A2 | | 1/2003 |
| WO | 2005/068247 A2 | | 7/2005 |

OTHER PUBLICATIONS

Co-pending U.S. Appl. No. 17/078,706, filed Oct. 23, 2020.
Co-pending U.S. Appl. No. 17/116,959, filed Dec. 9, 2020.
Co-pending U.S. Appl. No. 17/179,147, filed Feb. 18, 2021.
Co-pending U.S. Appl. No. 17/179,159, filed Feb. 18, 2021.
Co-pending U.S. Appl. No. 17/179,166, filed Feb. 18, 2021.
Co-pending U.S. Appl. No. 17/179,176, filed Feb. 18, 2021.
Co-pending U.S. Appl. No. 17/179,144, filed Feb. 18, 2021.
German Office Action dated Oct. 26, 2021 related to corresponding German Patent Application No. 10 2021 104016.7.
Chinese Office Action dated Nov. 16, 2022 for Chinese Patent Application No. 202110199607.7.

* cited by examiner

TRACK SYSTEM WITH A SUPPORT MEMBER

CROSS-REFERENCE TO RELATED APPLICATION

This application claims the benefit of U.S. Provisional Patent Application Ser. No. 62/979,812, filed on Feb. 21, 2020, the disclosure of which is hereby incorporated by reference in its entirety as though fully set forth herein.

TECHNICAL FIELD

The present disclosure generally relates to a track/rail system and/or support members configured for connection with, movement along/relative to, and removal from tracks/rails, including support members and tracks/rails that may, for example, be utilized in connection with vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track systems may have support members that may not provide sufficient functionality, may be complex to operate and/or assemble, and/or may not operate efficiently. For example, some support members may not effectively and/or efficiently engage a track of a track assembly.

There is a desire for solutions/options that minimize or eliminate one or more challenges or shortcomings of track systems. The foregoing discussion is intended only to illustrate examples of the present field and is not a disavowal of scope.

SUMMARY

In embodiments, an anchor for a support member of a track system may include an anchor body and a toothed anchor portion. The anchor body may be connectable to said support member. The toothed anchor portion may include a plurality of anchor teeth configured to engage a plurality of track teeth of a toothed portion of a track assembly. The anchor body and the toothed anchor portion may be connected to one another to collectively form a hook portion configured to engage said toothed portion of said track assembly. At least a subset of anchor teeth of the plurality of anchor teeth may be disposed one after another in a curved row and/or angled row of anchor teeth.

In embodiments, a track system may include a track assembly and a support assembly. The track assembly may include a toothed portion having a plurality of track teeth. The support assembly may include a removable support member that may be adjustably connected to the track assembly. The support member may include at least two anchors configured to connect the support assembly to the track assembly. The at least two anchors may include a first anchor and a second anchor. The first anchor may include a plurality of first anchor teeth configured to engage the plurality of track teeth. The second anchor may include a plurality of second anchor teeth configured to engage the plurality of track teeth. At least a first subset of first anchor teeth of the plurality of first anchor teeth may be disposed one after another in a curved and/or angled row of first anchor teeth. The plurality of second anchor teeth may be disposed one after another in a linear manner to define a linear row of second anchor teeth.

In embodiments, a method of operating a track system may include connecting the support member and the track assembly in a Z-direction, adjusting the first anchor into an engaged position in which at least some of the plurality of first anchor teeth are engaged with the plurality of track teeth, and adjusting the second anchor into an engaged position in which the plurality of second anchor teeth are engaged with the plurality of track teeth.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1A:
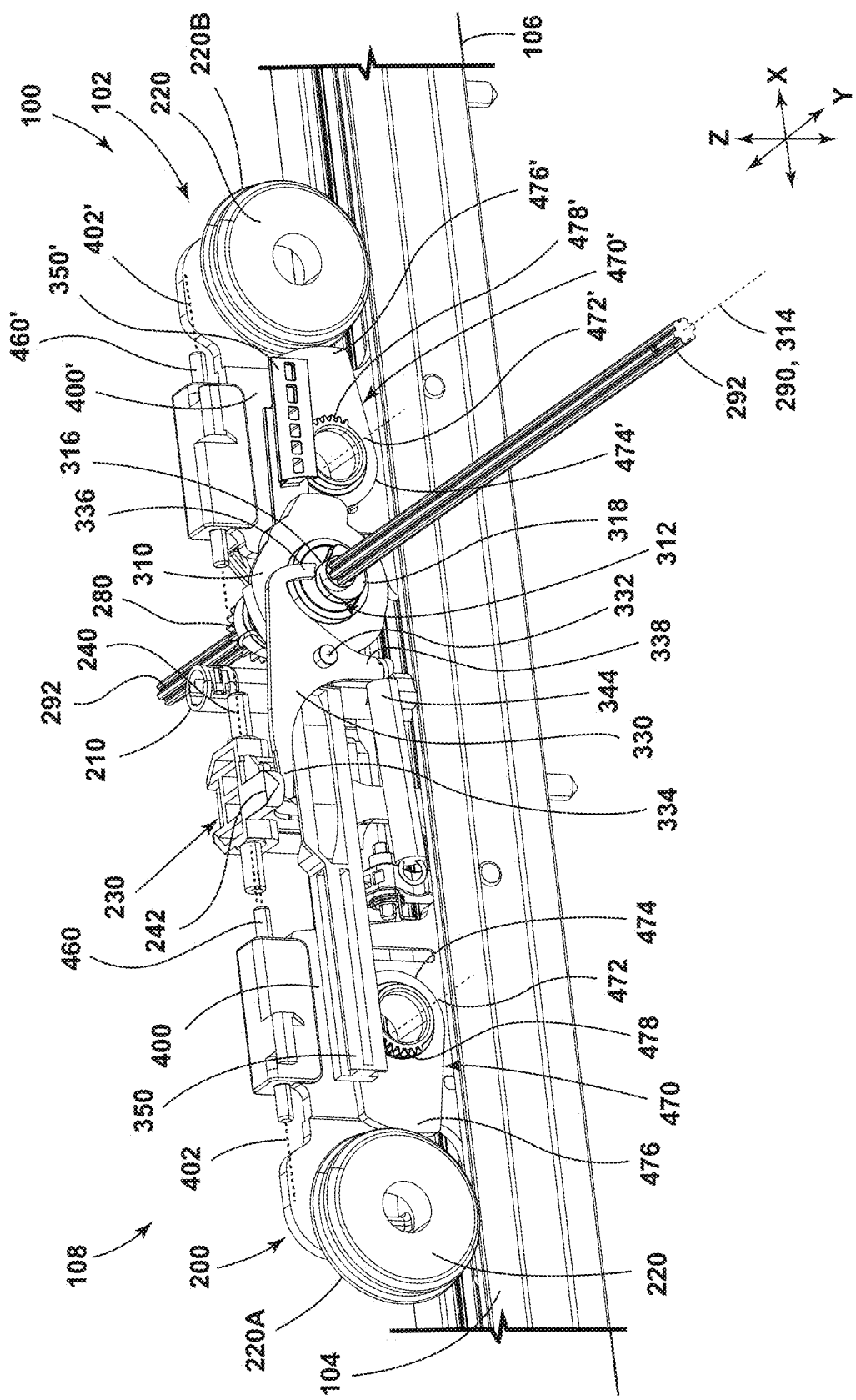
FIGS. 1A and 1B are perspective views generally illustrating an embodiment of a track system according to teachings of the present disclosure.
Figure 1B:
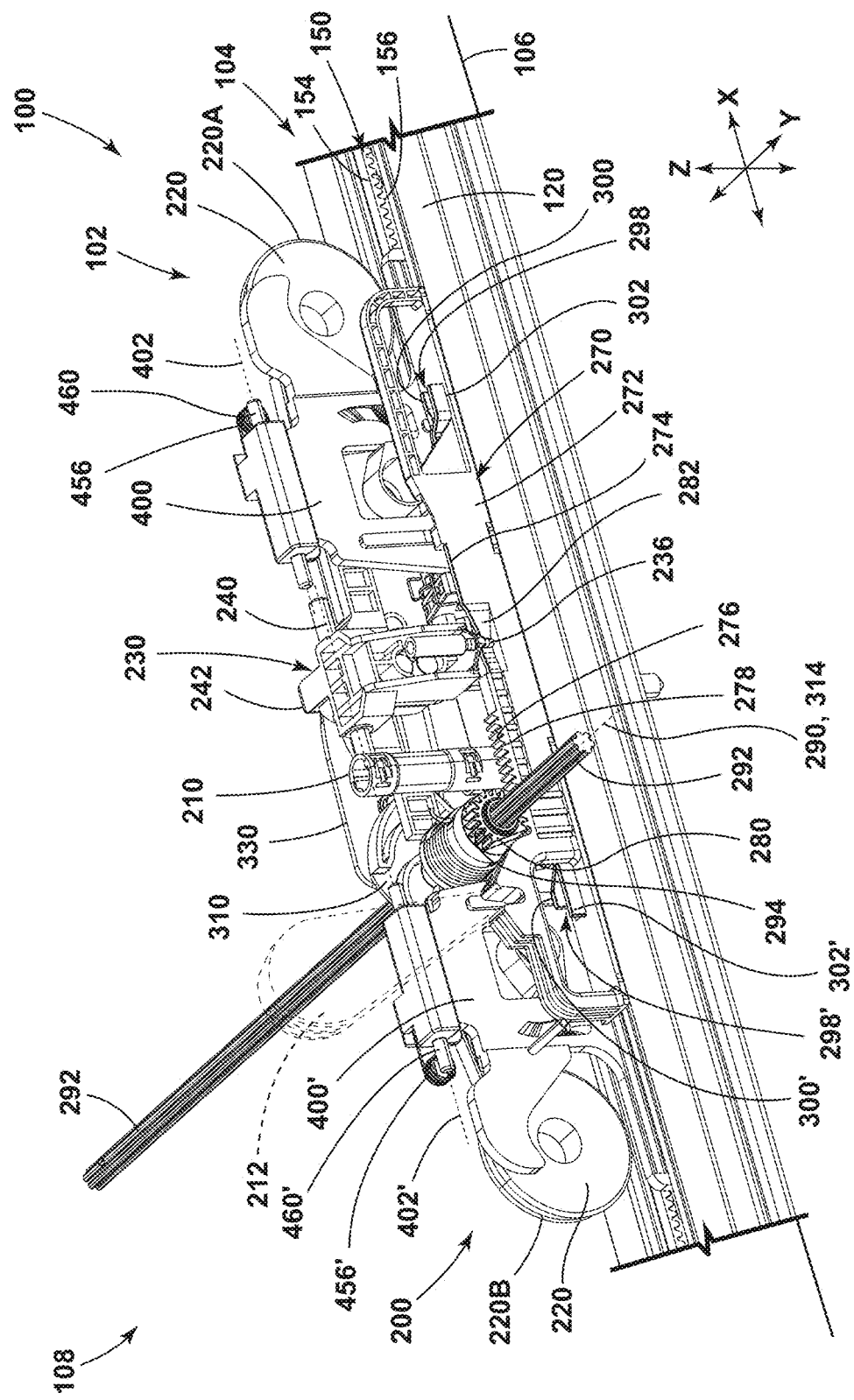

In embodiments, such as generally illustrated in FIGS. 1A and 1B, a track system 100 may include a support assembly 102 and/or one or more track/rail assemblies 104. A support assembly 102 and/or a track assembly 104 may include and/or be connected to an electrical system (e.g., of a vehicle 108), which may include a controller and/or a power source.

In embodiments, such as generally illustrated in FIGS. 1A and 1B, a track assembly 104 may be connected to and/or disposed in a mounting surface 106 (e.g., a floor of a vehicle 108) and may facilitate selective connection of one or more support assemblies 102 to the mounting surface 106. A track assembly 104 may facilitate adjustment of one or more support assemblies 102, such as relative to the mounting surface 106 and/or within a vehicle 108. In examples, a track system 100 may include several track assemblies 104 that may be configured to engage a corresponding portion of a support assembly 102. Several track assemblies 104 may be connected to a portion of the mounting surface 106 (e.g., a floor, wall, ceiling, etc.), may extend parallel to one another, and/or may be offset from each other in a lateral/transverse direction (e.g., a Y-direction) such that the track assemblies 104 may be generally/substantially aligned with respective outer sides of a support assembly 102.

Figure 2:
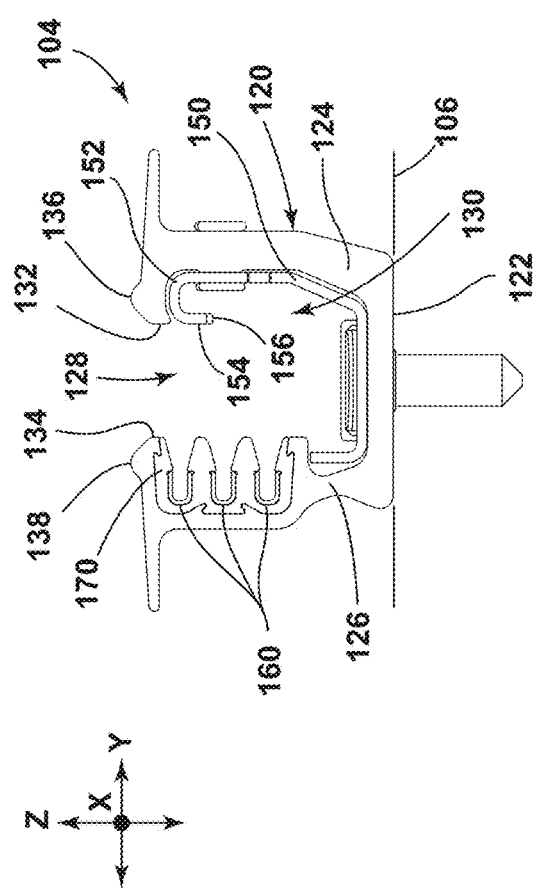
FIG. 2 is an end view generally illustrating an embodiment of a track assembly according to teachings of the present disclosure.

With embodiments, such as generally illustrated in FIG. 2, a track assembly 104 may include an outer track 120 and/or an inner track 150. An outer track 120 and/or an inner track 150 may be an elongated member extending generally in an X-direction (e.g., a longitudinal direction). An outer track 120 and/or an inner track 150 may facilitate movement and/or adjustment of a support assembly 102 and/or a support member 200 along a track assembly 104. For example and without limitation, a support member 200 may roll along a top surface of an outer track 120 via one or more rolling members 220, and/or a support member 200 may selectively engage the outer track 120 and/or the inner track 150 to selectively restrict/control relative movement between a support assembly 102 and a track assembly 104. An outer track 120 and/or an inner track 150 may include one or more of a variety of materials. For example and without limitation, the outer track 120 may include a first material (e.g., aluminum) that may be relatively light, and/or the inner track 150 may include a second material (e.g., steel) that may be relatively strong compared to the first material.

With embodiments, such as generally illustrated in FIG. 2, an outer track 120 may have a track base portion 122 and two track wall portions (e.g., a first track wall portion 124 and a second track wall portion 126) protruding from the track base portion 122 to form a generally U shaped cross-section in a Y-Z plane (e.g., in a plane perpendicular to an X-direction). The U-shaped cross section may define a track receptacle 130 configured to receive and/or at least temporarily retain a portion of a support assembly 102. A first track lip/wing 132 and a second track lip/wing 134 may project inwardly toward one another from the first track wall portion 124 and the second track wall portion 126, respectively. A track opening 128 may be defined between the two track lips 132, 134. A portion of a support assembly 102 may be inserted into the track opening 128 and selectively retained within the track receptacle 130. An outer track 120 may include a first rolling portion 136 and/or a second rolling portion 138, which may be configured to engage one or more rolling members 220 of a support member 200. A first rolling portion 136 may be disposed on and/or adjacent to a first track lip 132 (e.g., at or about a top surface of the outer track 120). A second rolling portion 138 may be disposed on and/or adjacent to a second track lip 134. A first rolling portion 136 and/or the second rolling portion 138 may be configured as a ridge, for example, protruding from a track assembly 104 in a Z-direction and/or may extend substantially in an X-direction along some or all of a length of the outer track 120.

Figure 3:
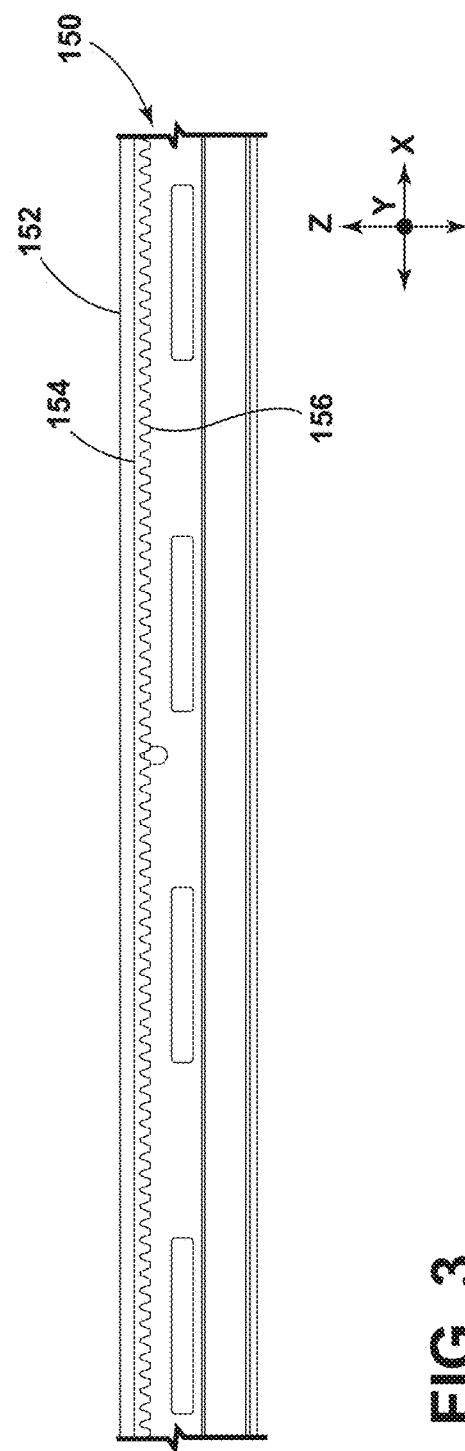
FIG. 3 is a cross-sectional view generally illustrating an embodiment of an inner track according to teachings of the present disclosure.

With embodiments, such as generally illustrated in FIGS. 2 and 3, an inner track 150 may be disposed partially and/or completely within a track receptacle 130. An inner track 150 may be disposed on and/or connected (e.g., fixed) to a track base portion 122 and/or one or more track wall portions 124, 126 of an outer track 120. An inner track 150 may, for example, include a generally L-shaped cross section. An inner track 150 may include a hook portion 152, which may be disposed adjacent to and/or extend adjacent to a first track wall portion 124 and/or a first track lip 132.

With embodiments, such as generally illustrated in FIGS. 2 and 3, a track assembly 104 may include one or more toothed portions 154 (e.g., gear racks) configured to engage an adjuster pinion 250 of an adjuster assembly 230. A toothed portion 154 may each include one or more track teeth 156. A toothed portion 154 may generally extend in an X-direction, such as along some or all of a length of the inner track 150. One or more (e.g., all) of the track teeth 156 may be disposed one after another and/or aligned with one another in an X-direction. Track teeth 156 may extend and/or protrude from the toothed portion 154 generally in a Z-direction (e.g., downward in the Z-direction toward the mounting surface 106). A toothed portion 154 may be disposed within a track receptacle 130 and/or may be disposed on an underside of a track assembly 104. A toothed portion 154 may be connected to and/or formed as a portion of an outer track 120 and/or an inner track 150. For example and without limitation, a toothed portion 154 may be connected to and/or integrally formed with an inner track 150, such as at or about a distal end of a hook portion 152. A toothed portion 154 and/or track teeth 156 may be disposed adjacent to and/or substantially aligned/overlapping (e.g., in a Z-direction) with an edge of a first track lip 132 that at least partially defines a track opening 128.

In embodiments, such as generally illustrated in FIG. 2, a track assembly 104 may include one or more electrical conductors 160 (e.g., bus bars) configured to selectively contact and/or engage (e.g., electrically connect with) one or more contacts of a support assembly 102. With examples, a conductor 160 may be an elongated member extending in the X-direction and/or may have a generally U-shaped cross section that opens in a Y-direction (e.g., a transverse direction). A conductor 160 may be operatively connected to a controller and/or a power source. A conductor 160 may be connected to a first track wall portion 124 and/or a second track wall portion 126 of an outer track 120, and/or another portion of a track assembly 104. A conductor 160 may be connected to a track assembly 104 via an insulator 170, which may be configured to electrically insulate/isolate a conductor 160 from other portions of a track assembly 104. An insulator 170 may be an elongated body, which may extend in an X-direction, and/or may be configured to receive and/or retain one or more conductors 160.

With embodiments, such as generally illustrated in FIGS. 1A, 1B, 13-15C, 17A, and 17B, a support assembly 102 may include a support member 200. A support assembly 102 and/or a support member 200 may be adjusted and/or moved along a track assembly 104 (e.g., in an X-direction) manually and/or via an adjuster assembly 230. A support member 200 may be configured for connection with and removal (e.g., in a vertical/Z-direction) from a track assembly 104, such as in a plurality of locations along the track assembly 104. A support member 200 may, for example and without limitation, include, be connected to, and/or support a seat, such as a vehicle seat, and/or one or more other components (e.g., consoles, cargo, cargo racks, etc.). The support assembly 102, the support member 200, and/or one or more components connected thereto may include one or more electrical components (e.g., controllers, power sources, seat heaters, airbags, air bladders, fans, etc.). A support member 200 may be configured as a base, a leg, and/or a support structure, for example. A support member 200 may include a body 202, which may be configured as a portion of a housing, casing, and/or cassette, for example (see, e.g., FIG. 17A, 17B). A body 202 may include one or more contact surfaces 204, 204' and/or one or more projections 206A, 206B, 206A', 206B', which may be configured to engage an associated anchor 400, 400' to, for example, movably connect one or more anchors 400, 400' to a support member 200. For example and without limitation, a first anchor 400 may be disposed between (e.g., relative to an X-direction) a first projection 206A and a second projection 206B, which may extend perpendicularly from a body 202 of a support member 200 (e.g., generally in a Y-direction). Additionally and/or alternatively, a second anchor 400' may be disposed between (e.g., relative to an X-direction) a first projection 206A' and a second projection 206B', which may extend perpendicularly from a body 202 of a support member 200 (e.g., generally in a Y-direction).

With embodiments, such as generally illustrated in FIGS. 1A, 1B, and 13-15C, a support member 200 may include one or more electrical connectors 210 that may be configured for selective connection with a track assembly 104. An electrical connector 210 may be configured to selectively electrically connect with a track assembly 104, such as with a conductor 160 (e.g., a bus bar) of the track assembly 104. For example, one or more contacts of the electrical connector 210 may rotate into and out of contact with one or more conductors 160. Electrical connection between an electrical connector 210 and a conductor 160 may permit electrical power and/or one or more signals (e.g., control signals, sensor data signals, etc.) to be provided to and/or received from the support member 200 (e.g., an electrical component).

With embodiments, such as generally illustrated in FIGS. 1A, 1B, and 13-15C, a support member 200 may include one or more rolling members 220. A rolling member 220 may be configured to engage and/or roll along a first rolling portion 136 and/or a second rolling portion 138 of a track assembly 104. A support member 200 may be configured to move along a track assembly 104, at least in part, via one or more rolling members 220 (e.g., rolling members 220A, 220B). In embodiments, a rolling member 220 may be configured to support at least a portion of the support assembly 102. A rolling member 220 may rotate as the support assembly 102 moves along the track assembly 104. A rolling member 220 may be rotatably connected to a body of the support member 200. For example and without limitation, a first rolling member 220A may be rotatably connected at or about a first end of a support member 200, and/or a second rolling member 220B may be rotatably connected at or about a second end of the support member 200. One or more rolling members 220 (e.g., first and second rolling members 220A, 220B) may be connected to the same lateral side of a support member 200. In such embodiments, a first and second rolling member 220A, 220B may both engage and/or roll along the same rolling portion (e.g., a first rolling portion 136, a second rolling portion 138, etc.). Additionally and/or alternatively, rolling members 220 may be rotatably connected on opposite sides of an adjuster assembly 230 relative to a Y-direction, such that a rolling member 220 may roll along a first rolling portion 136 another rolling member 220 may roll along a second rolling portion 138.

With embodiments, such as generally illustrated in FIGS. 1A, 1B, and 13-15C, a support member 200 may include an adjuster assembly 230 configured to facilitate adjustment of the position (e.g., in an X-direction) of a support member 200 relative to a track assembly 104. For example and without limitation, an electric motor 232 of the adjuster assembly 230 may rotate an adjuster pinion 250, which may engage the toothed portion 154 to adjust the position of the support member 200 relative to the track assembly 104, such as in an X-direction. An electric motor 232 may be disposed within the adjuster assembly 230 and/or may be operatively connected to an adjuster pinion 250 such that the adjuster pinion 250 is rotatable via the electric motor 232. Additionally and/or alternatively, an electrical motor 232 may be disposed within a support assembly 102 and/or may be operatively connected to one or more support members 200. For example and without limitation, a support assembly 102 may include (i) two or more support members 200 disposed opposite one another (e.g., relative generally to a Y-direction) and/or (ii) an electrical motor 232 disposed between the two support members 200 and connected to an adjuster assembly 230 of one or both of the two support members 200, such as via a respective flex shaft, which may be curved and/or bent in some examples. In some circumstances, a transmission may connect a motor 232 to an adjuster assembly 230.

With embodiments, such as generally illustrated in FIGS. 1A, 1B, and 13-15C, an adjuster assembly 230 may be adjustably connected to a body of the support member 200 such that the adjuster assembly 230 may move and/or float relative to the body of the support member 200, such as in a Z-direction. Additionally and/or alternatively, an adjuster assembly 230 may be rotatable relative to the support member 200 and/or the track assembly 104, such as about an adjuster axis 240. An adjuster assembly 230 may be operatively connected to an electrical component of a support member 200, such as via one or more wires. For example and without limitation, an electrical component may provide power to and/or control operation of the electric motor 232 of the adjuster assembly 230.

With embodiments, such as generally illustrated in FIG. 1B, an adjuster assembly 230 may include one or more portions (e.g., a tab 236) configured to contact and/or engage a slider 270 of a support member 200. For example and without limitation, a tab 236 may be configured as a protrusion extending, such as generally in a Z-direction (e.g., downward in the Z-direction toward the mounting surface 106). Additionally and/or alternatively, a tab 236 may be configured as a surface, edge, slot, recess, body, and/or any other structure configured to engage a slider 270.

With embodiments, such as generally illustrated in FIGS. 1A, 1B, and 14-15C, an adjuster assembly 230 may include one or more portions (e.g., a flange 242) configured to contact and/or engage an actuation body 330. An adjuster assembly 230 may be adjustable, such as in a generally Z-direction, via a flange 242. A flange 242 may extend generally in a Y-direction and/or may be disposed on the same or an opposite side of the adjuster assembly 230 relative to an adjuster pinion 250. Additionally and/or alternatively, a flange 242 may be configured as a surface, edge, slot, recess, body, and/or any other structure configured to engage an actuation body 330.

Figure 14:
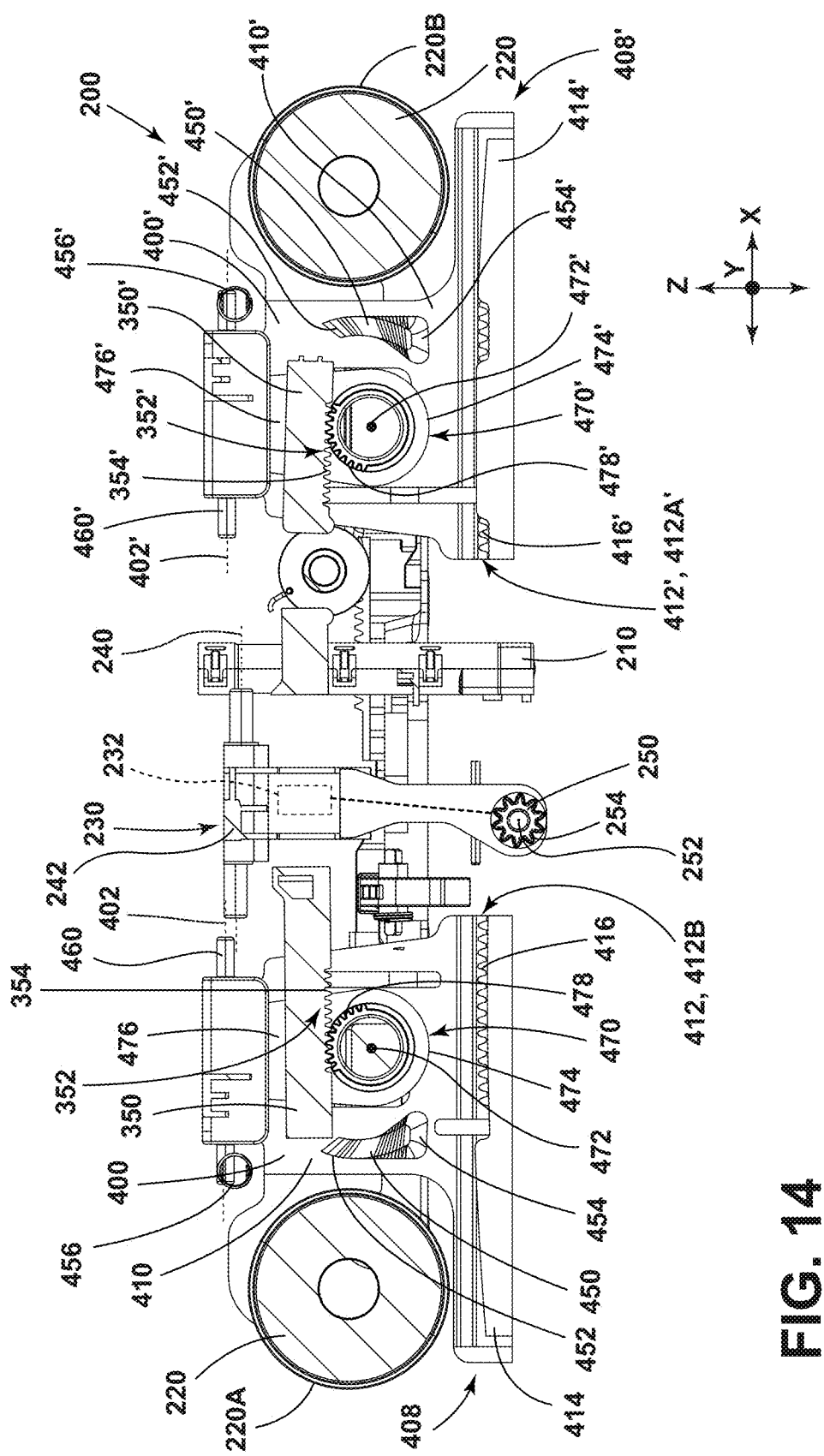
FIG. 14 is a cross-sectional view generally illustrating an embodiment of a support member according to teachings of the present disclosure.
Figure 15A:
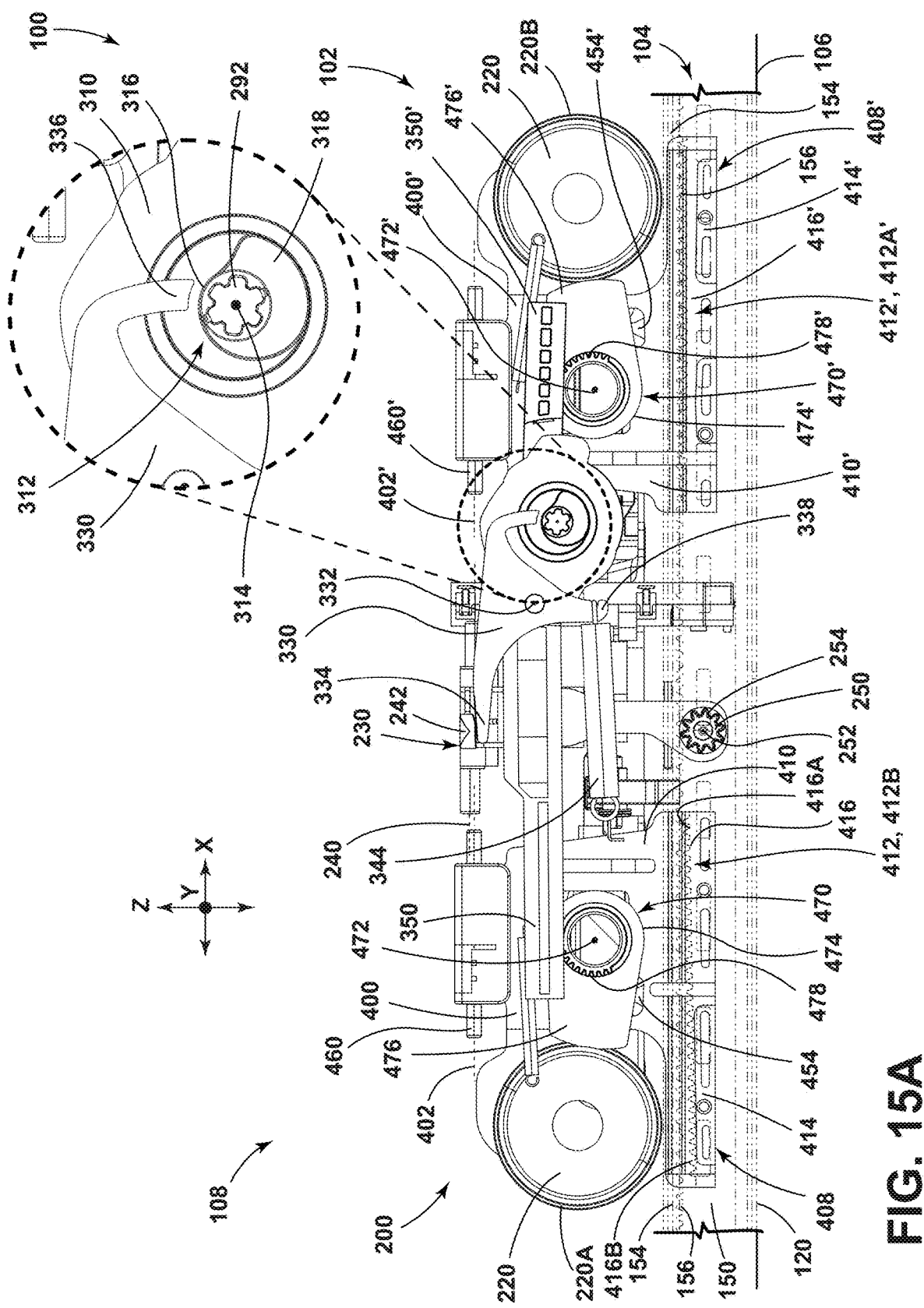
FIGS. 15A-15C are side views generally illustrating an embodiment of a track system with an anchor in a disengaged position, an anchor in a default position and engaged with a track assembly, and an anchor in a tilted position and engaged with a track assembly, respectively, according to teachings of the present disclosure.
Figure 15B:
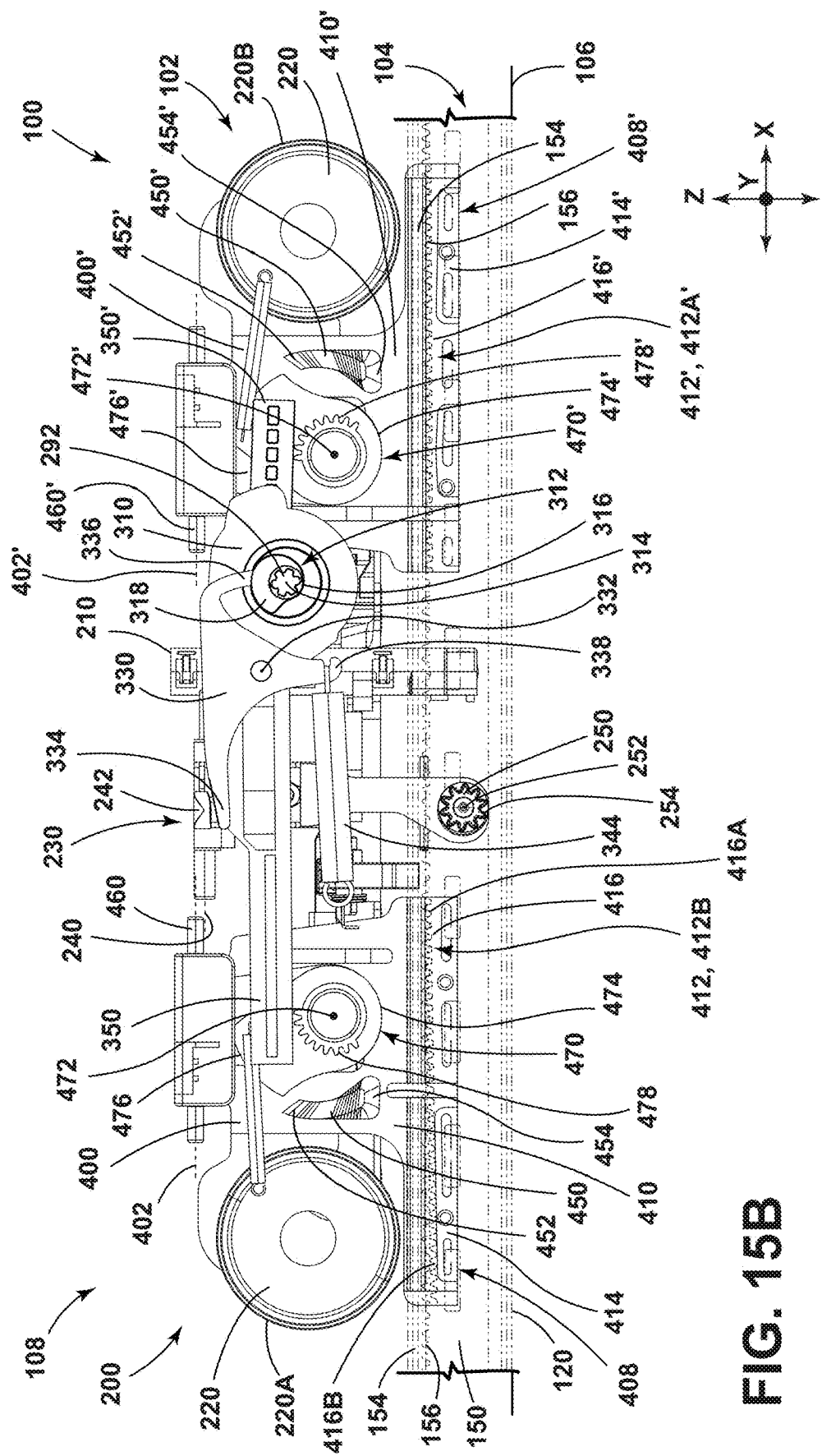
Figure 15C:
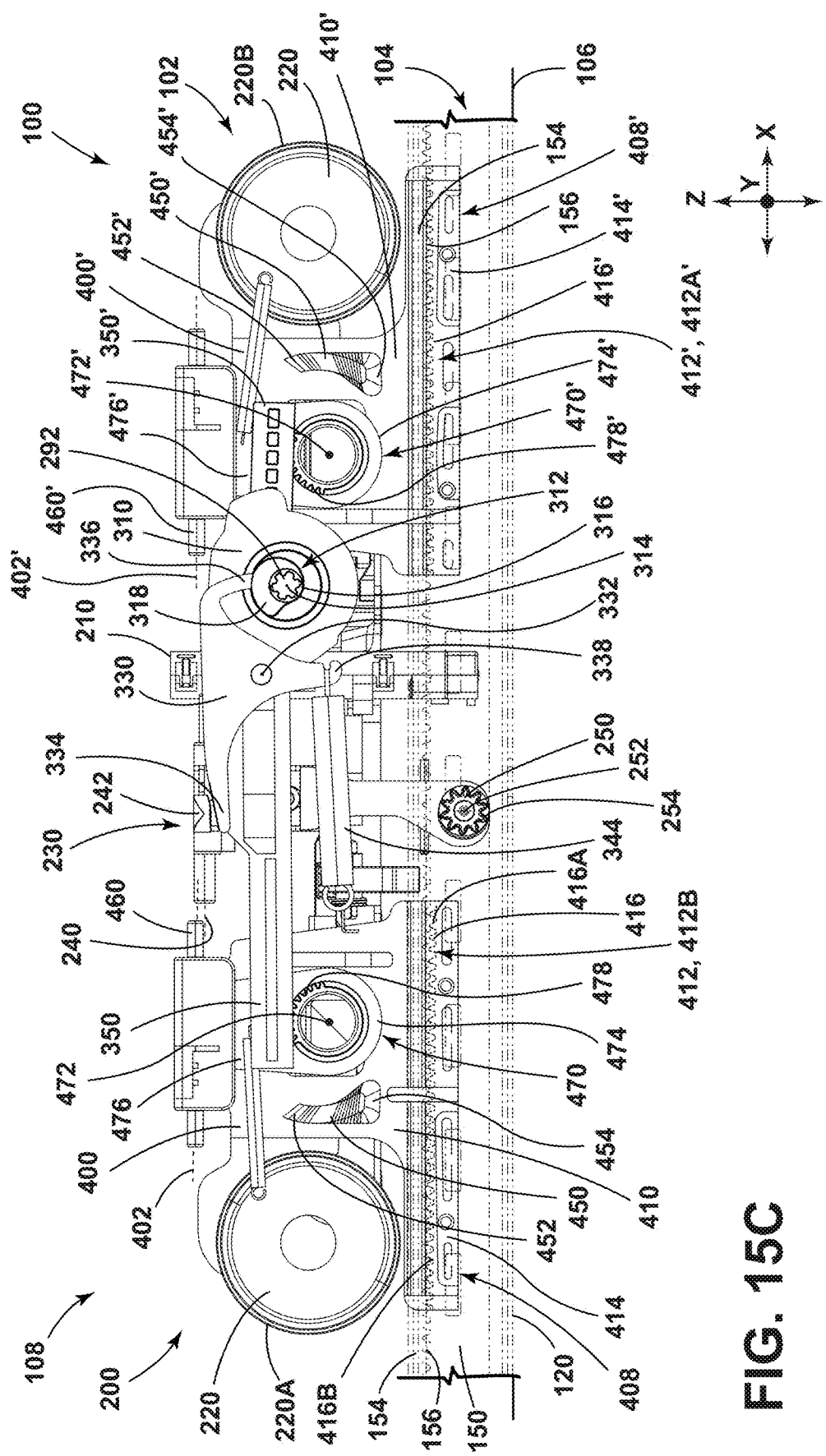

With embodiments, such as generally illustrated in FIGS. 14-15C, a support member 200 may include an adjuster pinion 250. An adjuster pinion 250 may be configured to engage a toothed portion 154 of a track assembly 104. An adjuster pinion 250 may be rotatable about an adjuster pinion axis 252, which may extend generally in a Y-direction (e.g., perpendicular to a longitudinal direction of the track assembly 104). An adjuster pinion 250 may include one or more adjuster pinion teeth 254 configured to engage one or more track teeth 156 of a toothed portion 154. Adjuster pinion teeth 254 may extend radially outward from the adjuster pinion 250 relative to the adjuster pinion axis 252. An adjuster pinion 250 may be connected to an electric motor 232 directly and/or indirectly (e.g., via a flex shaft). An electric motor 232 may be operatively connected to an adjuster pinion 250 such that the adjuster pinion 250 is rotatable via the electric motor 232.

With embodiments, an adjuster pinion 250 (and the adjuster assembly 230, at least in some configurations) may be adjustable to engage and/or disengage a toothed portion 154 of a track assembly 104 (e.g., the adjuster pinion teeth 254 are or are not engaged with the track teeth 156). An adjuster pinion 250 and/or the adjuster assembly 230 may, for example, be adjusted generally downward in a Z-direction to disengage a track assembly 104 and/or may be adjusted generally upward in a Z-direction to engage a track assembly 104. An adjuster pinion 250 and/or an adjuster assembly 230 may, when disengaged from the toothed portion 154 for example, be adjusted (e.g., moved, slid, rotated) generally laterally in a Y-direction into and/or out of Z-direction alignment with a toothed portion 154 of a track assembly 104.

With embodiments, such as generally illustrated in FIGS. 1B, 4, 5, 12, and/or 13, a support member 200 may include a slider 270, which may be adjustable, movable, slidable, etc. in a direction generally parallel to an X-direction, for example. A slider 270 may be disposed between a top and bottom of an adjuster assembly 230. A slider 270 may be configured to engage and/or facilitate adjustment of the adjuster assembly 230 and/or an anchor 400, 400'. Additionally and/or alternatively, a slider 270 may be configured to engage and/or facilitate adjustment (e.g., rotation) of an electrical connector 210 to engage one or more contacts with a corresponding conductor 160. In examples, when a support assembly 102 is disposed on and/or connected to a track assembly 104, a slider 270 of the support assembly 102 and a toothed portion 154 of the track assembly 104 may be disposed on opposite sides of a track opening 128 relative to a Y-direction (e.g., a slider 270 may be disposed proximate/adjacent to a second track lip 134 and a toothed portion 154 may be disposed proximate/adjacent to a first track lip 132).

With embodiments, such as generally illustrated in FIGS. 1B and/or 5, a slider 270 may include a slider body 272, which may be configured as an elongated member and/or may extend generally in an X-direction. A slider 270 may include a slider protrusion 274, which may extend generally in a Z-direction. A slider protrusion 274 may be disposed on and/or connected to the slider body 272. A slider 270 and/or a slider protrusion 274 may include a guide surface 282 configured to engage, contact, and/or abut an adjuster assembly 230 (e.g., a tab 236). A guide surface 282 may extend generally in an X-direction and/or may face generally in a Y-direction. A guide surface 282 may include a first end 284, an intermediate section 286, and/or a second end 288.

With embodiments, when an adjuster pinion 250 and/or an adjuster assembly 230 is not in Z-direction alignment with a toothed portion 154 of a track assembly 104, a tab 236 may be disposed adjacent to and/or in contact with a first end 284 of the guide surface 282 and/or may extend obliquely relative to a slider protrusion 274. An adjuster assembly 230 may, for example, be biased generally in a Y-direction (e.g., about an adjuster axis 240) such that a tab 236 is biased into contact with a slider protrusion 274 and/or a guide surface 282. When an adjuster pinion 250 and/or an adjuster assembly 230 is in Z-direction alignment with and disengaged from a toothed portion 154 of a track assembly 104 (see, e.g., FIGS. 15A and 15B), a tab 236 may be disposed between a first end 284 and an intermediate section 286 of the guide surface 282 and/or may extend generally parallel to a slider protrusion 274 (see, e.g., FIG. 1B). When an adjuster pinion 250 and/or an adjuster assembly 230 is engaged with a toothed portion 154 of a track assembly 104, such as generally illustrated in FIGS. 1A and 15A, a tab 236 may be disposed adjacent to and/or in contact with an intermediate section 286 of the guide surface 282 and/or may extend generally parallel to a slider protrusion 274.

Figure 4:
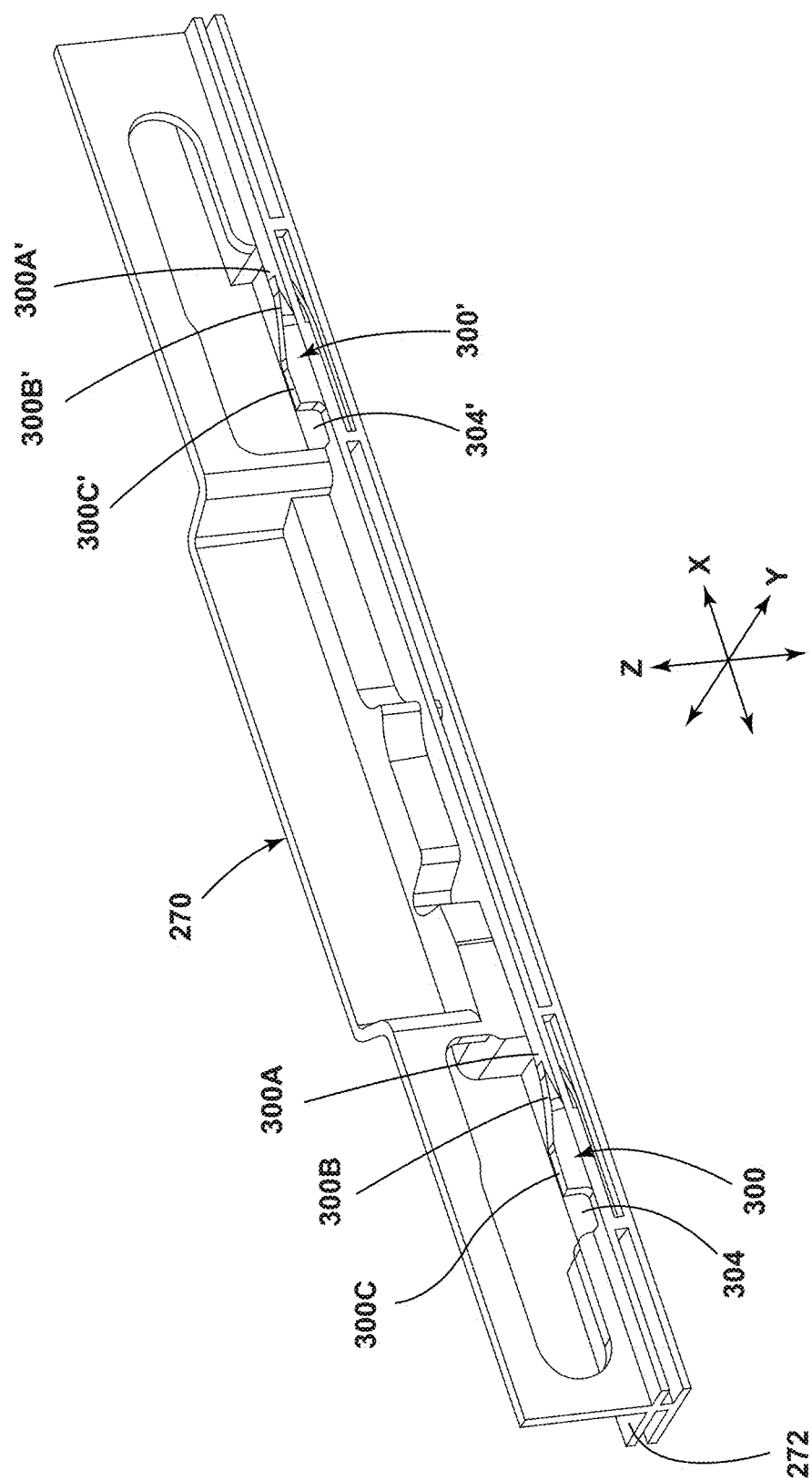
FIGS. 4 and 5 are perspective views generally illustrating different embodiments of a slider according to teachings of the present disclosure.
Figure 5:
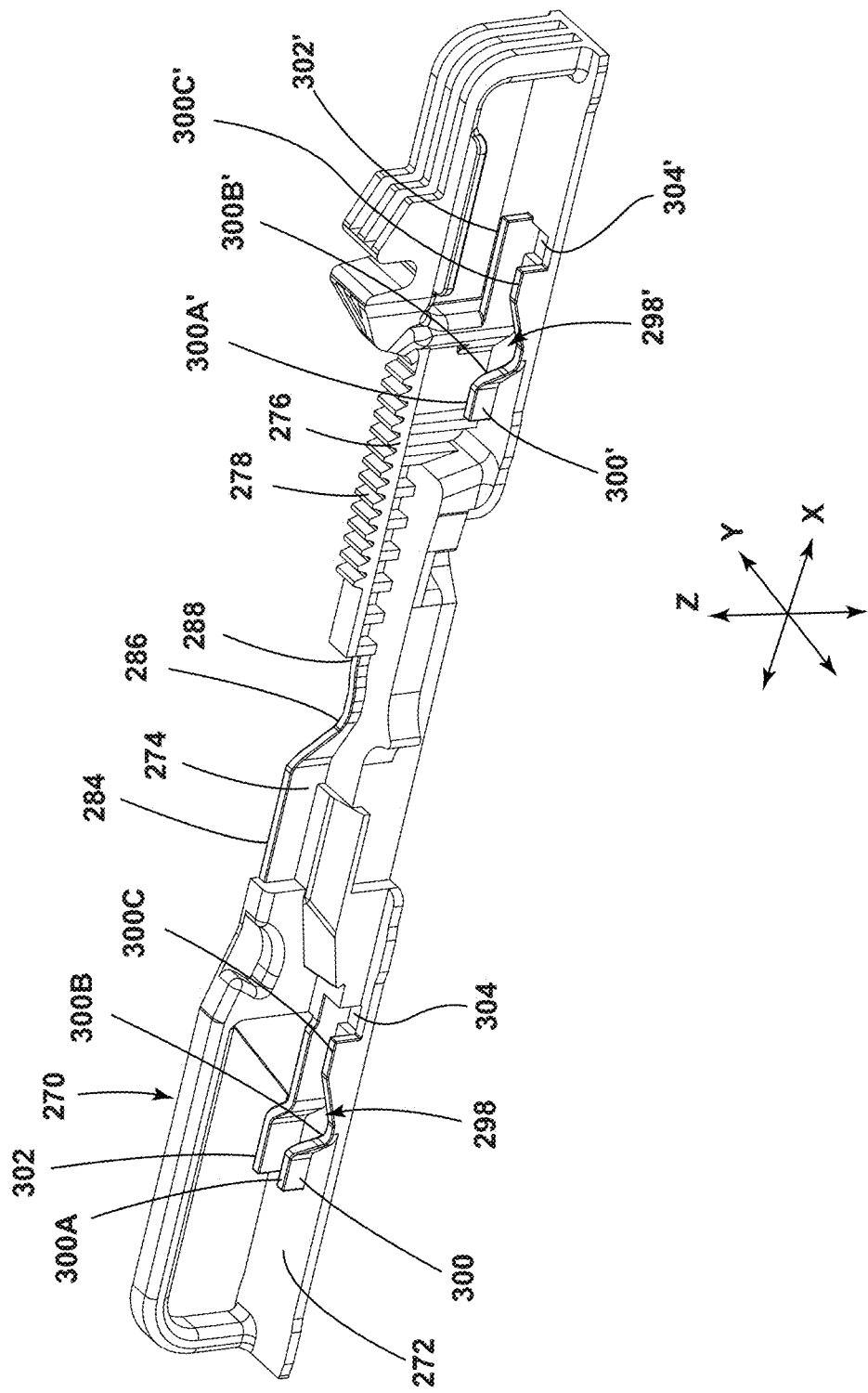
Figure 6A:
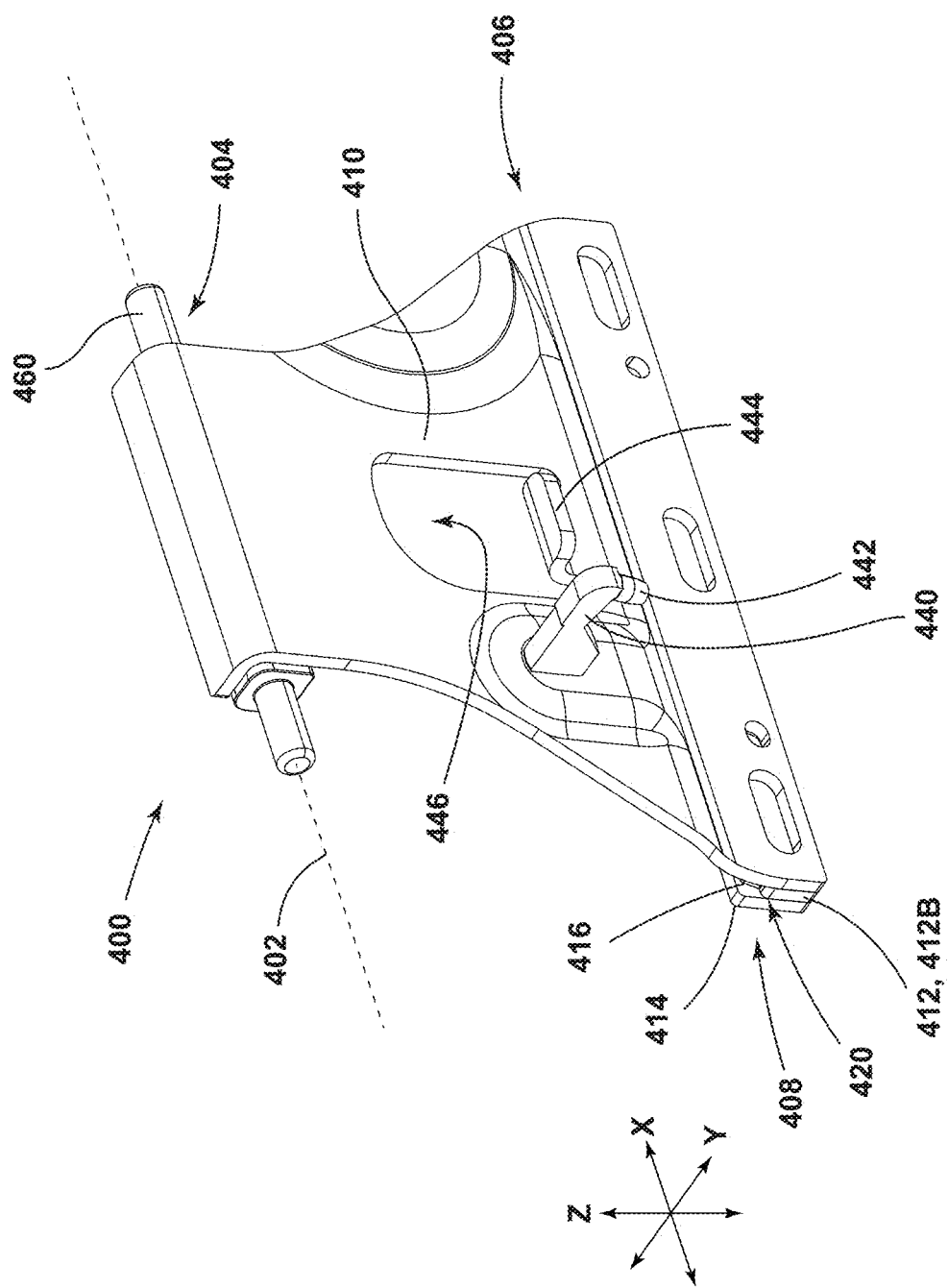
FIGS. 6A and 6B are perspective views generally illustrating an embodiment of an anchor including an anchor protrusion according to teachings of the present disclosure.
Figure 6B:
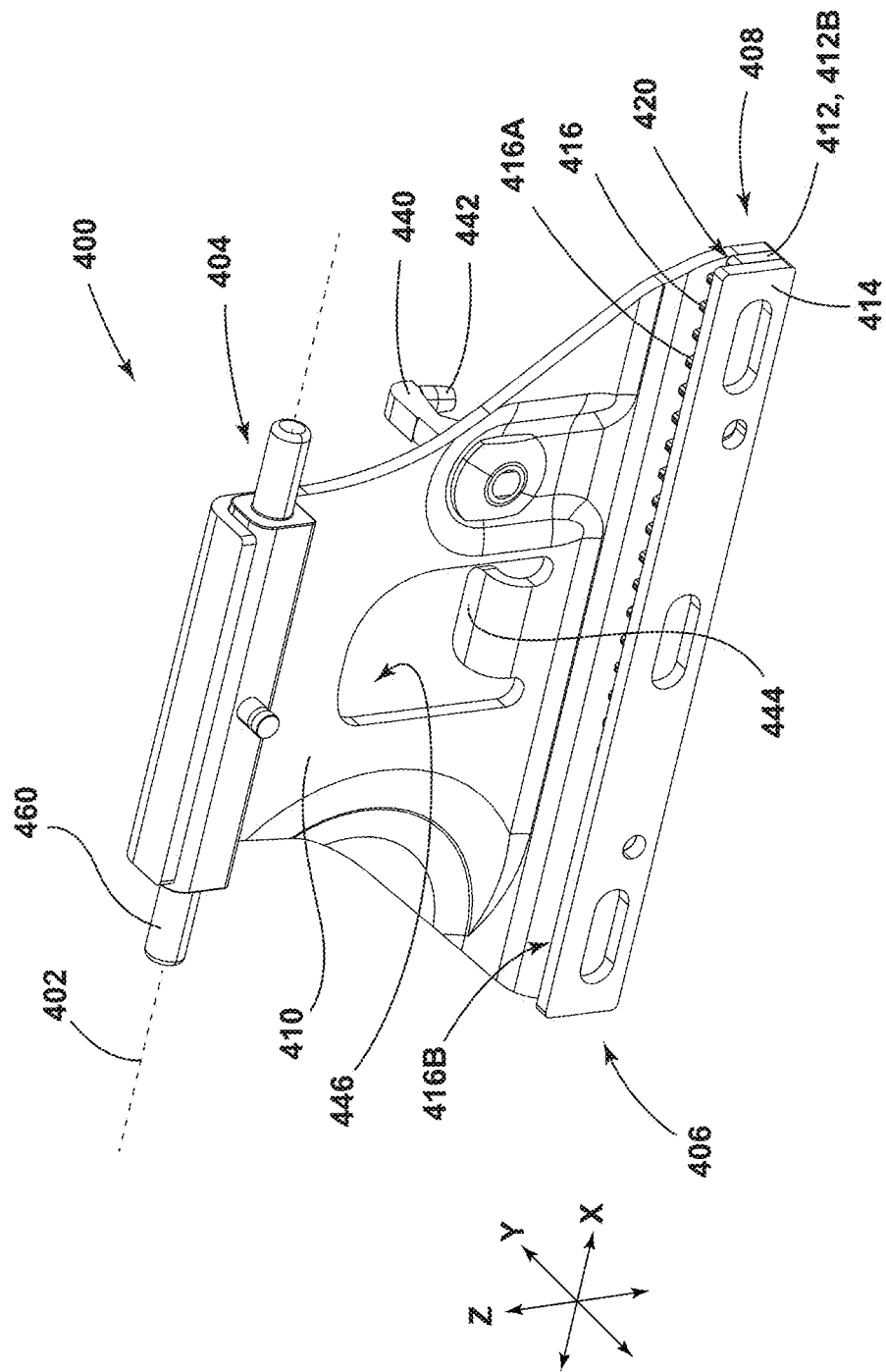
Figure 7:
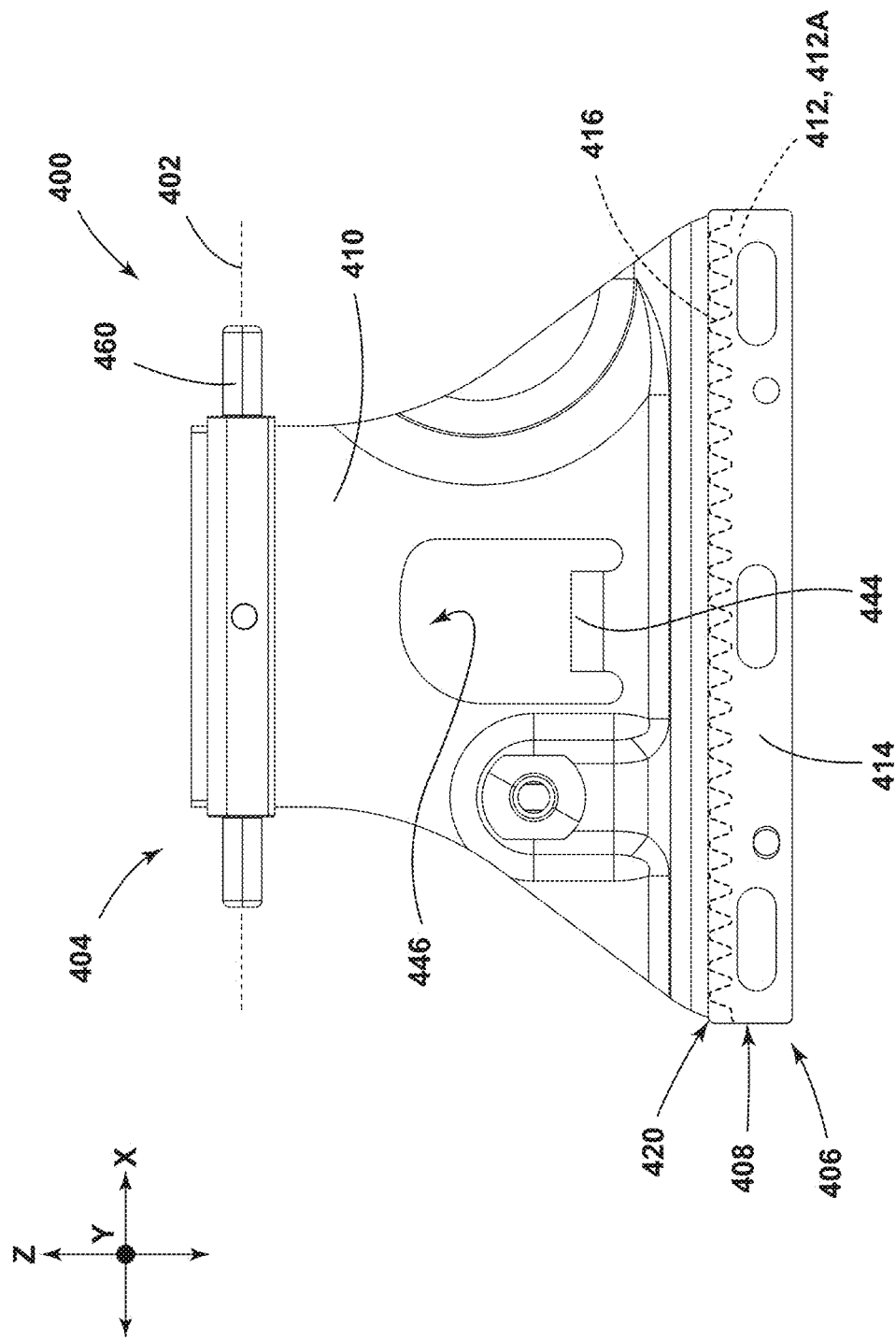
FIGS. 7 and 8 are side views generally illustrating an embodiment of an anchor including a first toothed anchor portion and an anchor including a second toothed anchor portion, respectively, according to teachings of the present disclosure.
Figure 8:
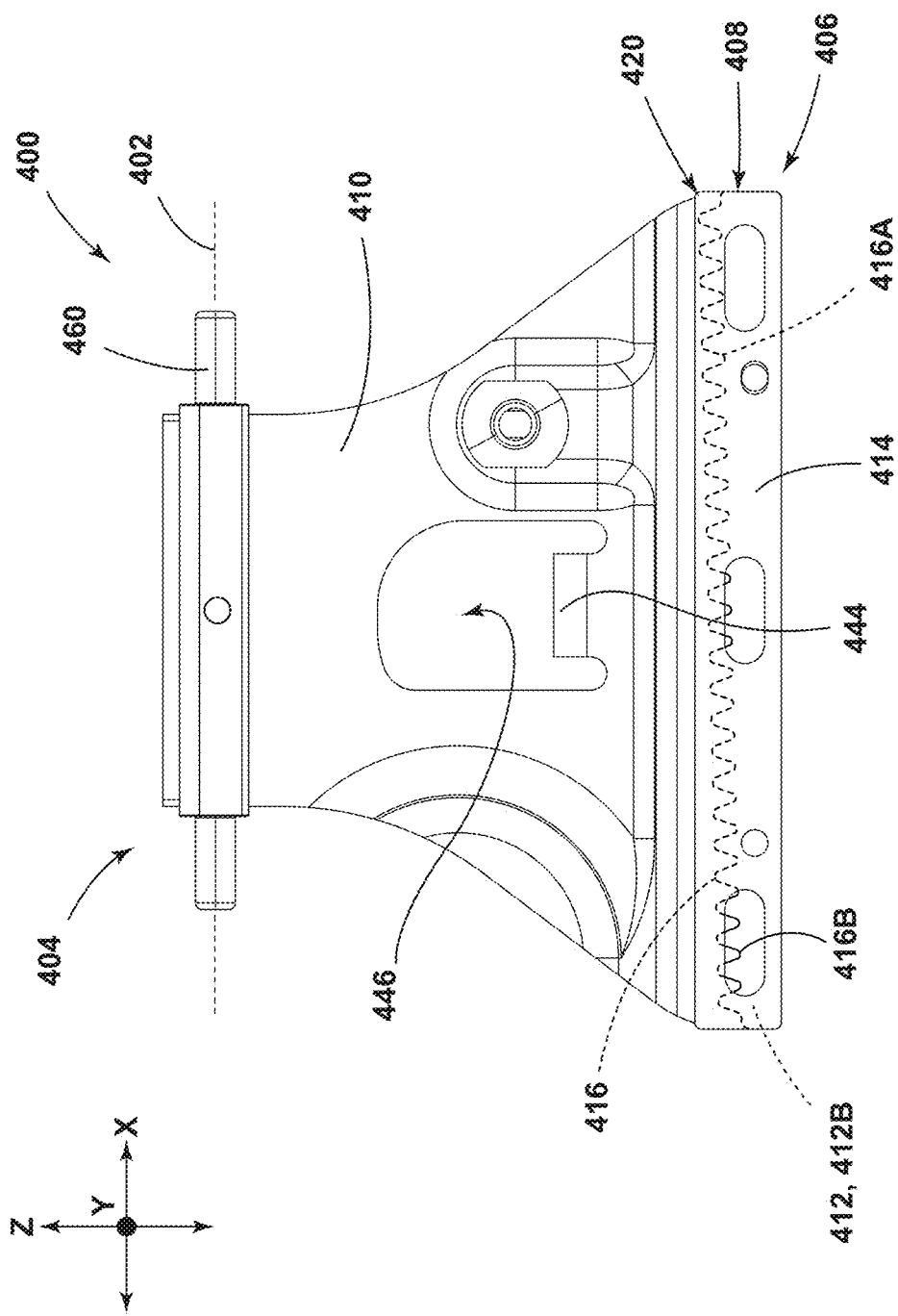

With embodiments, such as generally illustrated in FIGS. 1B, 4, 5, 12, and/or 13, a slider 270 may include one or more slider walls (e.g., a first slider wall 300, a second slider wall 302), configured to engage and/or adjust one or more anchors 400, 400'. A slider wall 300 may be disposed on and/or connected to the slider body 272. A slider wall 300 may extend along a slider body 272 generally in an X-direction and/or may project from a slider body 272 generally in a Z-direction. A slider wall 300 may be configured to engage, contact, and/or abut an anchor protrusion 440 and/or an anchor tab 442 of a corresponding anchor 400. For example and without limitation, an anchor tab 442 may be adjustable (e.g., slidable) along a slider wall 300 to adjust a position of an anchor 400. A slider wall 300 may include a first section 300A, a second section 300B, and/or a third section 300C. A second section 300B may be disposed between the first and third sections 300A, 300C. A first section 300A and a third section 300C may be disposed offset from one another (e.g., generally in a Y-direction) such that a second section 300B extends obliquely to an X-direction and/or a Y-direction, which may facilitate adjustment (e.g., generally in a Y-direction) of an anchor 400 into and/or out of Z-direction alignment with a toothed portion 154 of a track assembly 104. In some examples, such as generally illustrated in FIG. 4, a third section 300C of a slider wall 300 may extend farther from a slider body 272 generally in a Z-direction than a first section 300A of a slider wall 300 such that a second section 300B is sloped, which may facilitate adjustment (e.g., generally in a Z-direction) of an anchor 400 into and/or out of engagement with a toothed portion 154 of a track assembly 104. In other examples, such as generally illustrated in FIG. 5, a first section 300A and/or a third section 300C of a slider wall 300 may extend farther from a slider body 272 generally in a Z-direction than a second section 300B of a slider wall 300, which may facilitate adjustment (e.g., generally in a Z-direction) of an anchor 400 into and/or out of engagement with a toothed portion 154 of a track assembly 104. A slider 270 may include a slider recess 304 that may be configured to receive at least a portion of an anchor tab 442, which may facilitate adjustment of an anchor 400 into and/or out of engagement with a track assembly 104. A slider recess 304 may be disposed adjacent to and/or proximate a slider wall 300 (e.g., a third section 300C).

Figure 12:
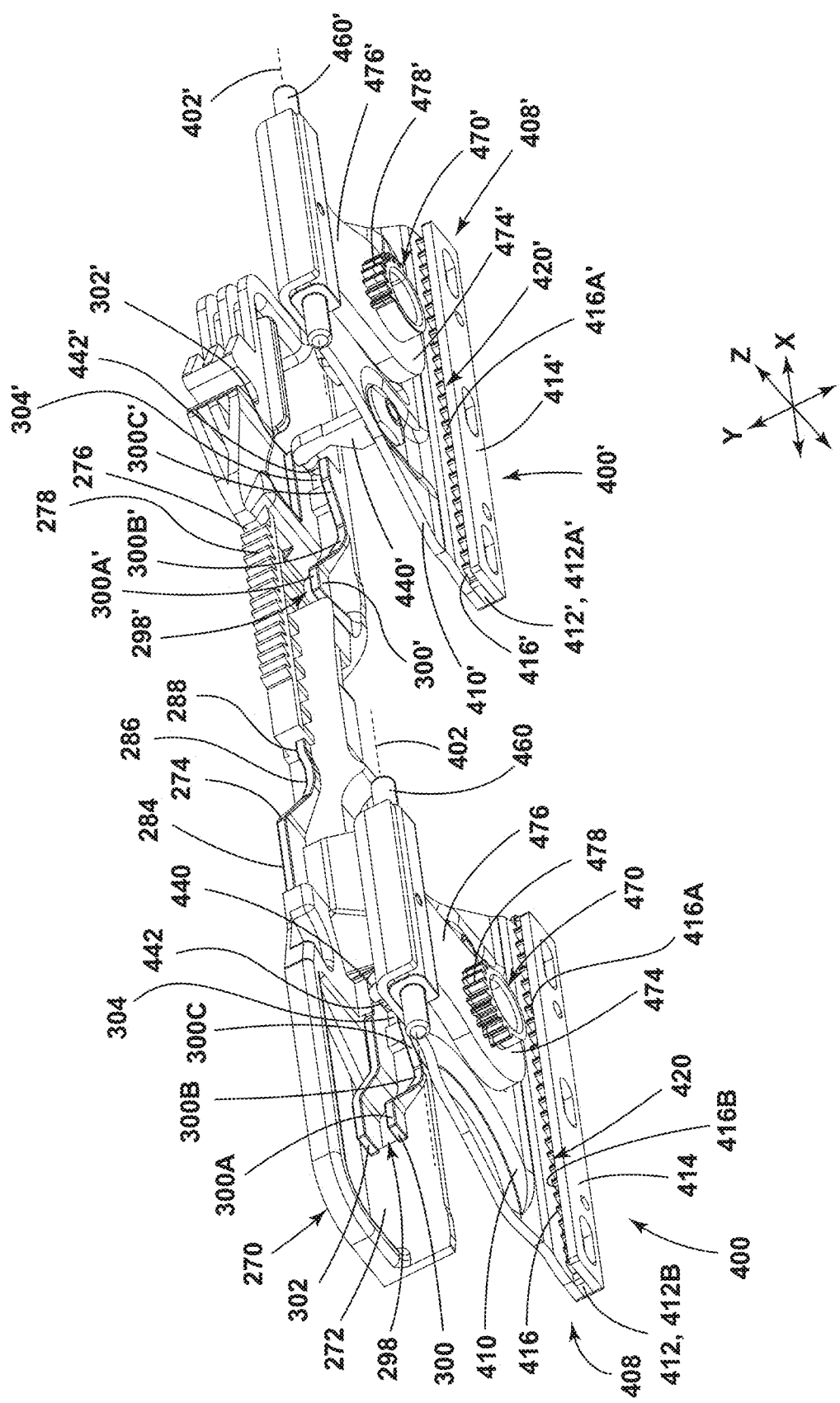
FIG. 12 is a perspective view generally illustrating an embodiment of two anchors and a slider according to teachings of the present disclosure.

With embodiments, such as generally illustrated in FIGS. 5 and 12, a slider 270 may include a second slider wall 302. A second slider wall 302 may be configured similar to and/or differently from a first slider wall 300. A second slider wall 302 may be disposed adjacent to and/or extend substantially parallel to a first slider wall 300. A first slider wall 300 and a second slider wall 302 may be configured to define a slider channel 298 configured to engage and/or receive an anchor protrusion 440 and/or an anchor tab 442 of a corresponding anchor 400 (see, e.g., FIG. 12). For example and without limitation, an anchor tab 442 may be insertable into a slider channel 298 (e.g., downward generally in a Z-direction), may engage, contact, and/or abut one or more slider walls 300, 302, and/or may be adjustable (e.g., slidable) along one or more slider walls 300, 302 within a slider channel 298.

In some examples, a slider 270 may include a second slider channel 298', a second first slider wall 300', a second channel first section 300A', a second channel second section 300B', a second channel third section 300C', a second channel slider wall 302', and/or a slider recess 304' configured to engage a second anchor 400'. The second slider channel 298' may be defined, at least in part, by an additional first slider wall 300' and/or an additional second slider wall 302'.

With embodiments, such as generally illustrated in FIGS. 1B, 5, and 12, a slider 270 may include one or more toothed slider portions 276 (e.g., gear racks) that may be configured to engage a slider pinion 280 of a support member 200, which may include one or more slider pinion teeth 294. A toothed slider portion 276 may include one or more slider teeth 278. A toothed slider portion 276 may generally extend in an X-direction. One or more (e.g., all) of the slider teeth 278 may be disposed one after another and/or aligned with one another in an X-direction. Slider teeth 278 may extend and/or protrude from a slider 270 and/or a toothed slider portion 276 generally in a Z-direction (e.g., upward in the Z-direction away the mounting surface 106).

With embodiments, such as generally illustrated in FIGS. 1A and 1B, a support member 200 may include a slider pinion 280 configured to engage a toothed slider portion 276. A slider pinion 280 may include one or more slider pinion teeth 294 configured to engage one or more slider teeth 278. A slider pinion 280 may be rotatable about a slider pinion axis 290, that may extend generally in a Y-direction and/or that may be substantially coaxial with an engagement cam axis 314. A slider pinion 280 may be disposed on, connected to, and/or engaged with an engagement body 310 and/or an actuation shaft 292. A slider pinion 280 may be rotatable via rotating an actuation shaft 292, rotating an engagement body 310, and/or adjusting a slider 270 (e.g., generally in an X-direction). Additionally and/or alternatively, a slider pinion 280 may be configured to move independently of an actuation shaft 292 and/or an engagement body 310 (e.g., a slider pinion 280 may rotate without causing an actuation shaft 292 and/or an engagement body 310 to rotate, and/or the actuation shaft 292 may rotate without rotating the slider pinion 280). Rotating a slider pinion 280 may, at least in some situations, rotate an engagement body 310, such as with the slider pinion 280 and relative to the actuation shaft 292.

With embodiments, such as generally illustrated in FIGS. 1A and/or 1B, a slider 270 may be actuated/moved in one or more of a variety of ways. For example, a slider 270 may be actuated via adjusting (e.g., rotating) a lever 212 of a support member 200, which may be engaged with and/or connected to the slider 270. A slider 270 may, for example, be actuated via an actuation shaft 292 and/or a slider pinion 280 connected thereto that may be engaged with a toothed slider portion 276 of the slider 270. Additionally or alternatively, a user may move a slider 270 directly and/or via a handle/lever/linkage.

With embodiments, such as generally illustrated in FIGS. 1A and 15A-15C, a support member 200 may include an engagement body 310 that may be configured to facilitate adjustment of one or more anchors 400, 400' into and/or out of engagement with a toothed portion 154 of a track assembly 104. An engagement body 310 may be rotatable about an axis extending generally in a Y-direction (e.g., an engagement cam axis 314). An engagement body 310 may be operatively connected to one or more engagement member 350, 350' such that rotating the engagement body 310 adjusts the engagement members 350, 350' generally in an X-direction. An engagement body 310 may be disposed on, connected to, and/or engaged with an actuation shaft 292, an engagement cam 312, and/or a slider pinion 280. An engagement body 310 may be rotatable via rotating an engagement cam 312 (e.g., via rotating an actuation shaft 292) and/or rotating a slider pinion 280 (e.g., via adjusting a slider 270 with a lever 212). Additionally and/or alternatively, an engagement body 310 may be configured to, at least in some situations, rotate independently of an actuation shaft 292, an engagement cam 312, and/or a slider pinion 280. For example, rotation of the slider pinion 280 (e.g., via longitudinal movement of the slider 270) may cause rotation of the engagement body 310 relative to the actuation shaft 292 and/or the engagement cam 312, which may move the anchors 400, 400' without moving the adjuster assembly 230 (e.g., to maintain the adjuster assembly 230 in a disengaged position).

With embodiments, such as generally illustrated in FIGS. 1A and 15A-15C, a support member 200 may include an engagement cam 312 which may be configured to facilitate adjustment of the adjuster assembly 230 and/or an adjuster pinion 250 into and/or out of engagement with a track assembly 104. An engagement cam 312 may be rotatable about an engagement cam axis 314, which may extend generally in a Y-direction. For example, an engagement cam 312 may be adjustable (e.g., rotatable) to a first position (see, e.g., FIGS. 15B and 15C) and/or to a second position (see, e.g., FIGS. 1A and 15A). An engagement cam 312 may include an engagement cam hub 316 and/or an engagement cam protrusion 318. An engagement cam protrusion 318 may extend radially from an engagement cam hub 316 relative to an engagement cam axis 314. An engagement cam 312 may be disposed on, connected to, and/or engaged with an actuation shaft 292 such that, for example, an engagement cam 312 is rotatable via rotating the actuation shaft 292. An engagement cam 312 may be connected to and/or engaged with an engagement body 310.

With embodiments, such as generally illustrated in FIGS. 1A and 1B, an engagement body 310, an engagement cam 312, and/or a slider pinion 280 may be rotatably connected to a support member 200 (and/or a second support member 200 disposed opposite the first support member 200). In examples, an engagement body 310, an engagement cam 312, and/or a slider pinion 280 may be connected to an actuation shaft 292 of a support member 200, which may be configured to rotate the engagement body 310, the engagement cam 312, and/or the slider pinion 280 about the engagement cam axis 314. For example and without limitation, an actuation shaft 292 may be configured to simultaneously engage and/or rotate a slider pinion 280 and/or an engagement cam 312. An actuation shaft 292 may be actuated manually and/or via a powered actuator (e.g., an electric motor), for example.

With embodiments, such as generally illustrated in FIGS. 1A and 15A-15C, a support member 200 may include an actuation body 330. An actuation body 330 may have and/or be rotatable about an actuation body axis 332, which may extend generally in a Y-direction. An actuation body 330 may include a first actuation portion 334 configured to engage, contact, and/or abut an adjuster assembly 230, such as a flange 242 for example. An actuation body 330 may include a second actuation portion 336 configured to engage, contact, and/or abut an engagement cam 312 (e.g., an engagement cam protrusion 318). An actuation body 330 may include a third actuation portion 338, which may engage and/or be connected to a biasing member 344 (e.g., a spring). A biasing member 344 may, additionally and/or alternatively, be connected to a body of a support member 200, such as at an end opposite the actuation body 330. A biasing member 344 may bias an actuation body 330 about an actuation body axis 332, which may bias a second actuation portion 336 into contact with an engagement cam 312.

With embodiments, such as generally illustrated in FIGS. 1A and 14-15C, a support member 200 may include one or more engagement members 350 configured to engage a corresponding anchor cam 470. An engagement member 350 may be an elongated member, which may extend generally in an X-direction. An engagement member 350 may include an engagement member toothed portion 352 (e.g., a gear rack), which may be configured to engage anchor cam teeth 478 of an anchor cam 470. An engagement member toothed portion 352 may extend generally in an X-direction and/or may include one or more engagement member teeth 354, which may be disposed one after another and/or aligned with one another in an X-direction. Engagement member teeth 354 may extend and/or protrude from an engagement member 350 and/or an engagement member toothed portion 352 generally in a Z-direction (e.g., downward in the Z-direction toward the mounting surface 106). An engagement member 350 may be operatively and/or adjustably connected to an engagement body 310, such as on an opposite side of the engagement body 310 from the engagement cam 312 for example. For example and without limitation, an engagement member 350 may adjustably engage a slot or recess of the engagement body 310, which may be sloped toward an engagement cam axis 314, such that rotation of the engagement body 310 adjusts, moves, etc. the engagement member 350 toward and/or away from the engagement cam axis 314. An engagement member 350 may be operatively and/or adjustably connected to an anchor cam 470. For example and without limitation, an engagement member 350 may be adjusted, moved, slid, etc. generally in an X-direction via an engagement body 310, which may cause an engagement member toothed portion 352 to engage and/or rotate an anchor cam 470.

In embodiments, a support member 200 may include a first engagement member 350 configured to engage a first anchor cam 470 of a first anchor 400 and a second engagement member 350' configured to engage a second anchor cam 470' of a second anchor 400'. A second engagement member 350' may include an engagement member toothed portion 352' and/or engagement member teeth 354', some or all of which may be configured in the same or similar manner as corresponding features of a first engagement member 350. A cross-sectional view through the engagement members 350, 350' of a support member 200 (e.g., in a plane perpendicular to a Y-direction) is generally depicted in FIG. 14 to provide a clear view of the engagement between the engagement members 350, 350' and the anchor cams 470, 470'.

With embodiments, such as generally illustrated in FIGS. 1A, 1B, and 6A-16B, a support member 200 may include one or more anchors 400 configured to engage and/or connect, secure, fix, etc. a support member 200 to a track assembly 104. An anchor 400 may be adjustable generally in a Z-direction, may be adjustable generally in a Y-direction, and/or may be rotatable about an anchor axis 402, which may extend generally in an X-direction. For example and without limitation, an anchor 400 may be adjustable to an engaged position, in which the anchor 400 may engage the toothed portion 154 of a track assembly, and/or to a disengaged position, in which the anchor 400 may not engage the toothed portion 154 of a track assembly 104. An anchor axis 402 may be disposed at or about a first/top end 404 of an anchor 400, which may be disposed opposite a second/bottom end 406 of an anchor 400. An anchor 400 may include an anchor body 410, a toothed anchor portion 412 (e.g., a gear rack), and/or an anchor member 414. A toothed anchor portion 412 and/or an anchor member 414 may be connected to a second end 406 of an anchor 400. An anchor member 414 may be connected to a toothed anchor portion 412 such that, for example, the toothed anchor portion 412 is disposed between an anchor body 410 and an anchor member 414. An anchor body 410, a toothed anchor portion 412, and/or an anchor member 414 may collectively form a hook portion 408 of an anchor 400. In examples, such as those in which an anchor 400 is adjustable via a slider wall 300 (see, e.g., FIGS. 6A-8, and 10-13), an anchor 400 may be biased into engagement with the slider wall 300 (e.g., generally downward in a Z-direction) such that when the slider 270 is moved and the anchor protrusion 440 and/or the anchor tab 442 is aligned with the second section 300B, the anchor 400 may move down into to a disengaged position. In other examples, such as those in which an anchor 400 is adjustable via an engagement body 310 (see, e.g., FIGS. 1A, 1B, 9A-9C, and 14-19B), an anchor 400 may be biased generally upward in a Z-direction (e.g., toward an engaged position), toward a toothed portion 154 generally in a Y-direction, and/or about an anchor axis 402, such as via an anchor biasing member 456. An anchor biasing member 456 (e.g., a spring) may be connected to, disposed on, and/or engaged with a portion of a support member 200 (e.g., a body of the support member 200) and/or a portion of an anchor 400.

With embodiments, a hook portion 408 of an anchor 400 formed by an anchor body 410, a toothed anchor portion 412, and/or an anchor member 414 may provide better space efficiency than anchors 400 that are formed from a single piece (e.g., with a portion bent into a U-shaped configuration). For example, bending a piece of metal into a U-shape may result in rounded portions and/or minimum radiuses that may increase a width in a Y-direction of the hook portion 408 and/or impair connection/formation of anchor teeth 416. A hook portion 408 with a greater width may need to rotate farther to engage and/or disengage a track assembly 104, which may utilize more space and/or a longer actuation distance, either or both of which may increase an overall size and/or weight of the track system 100.

Figure 18A:
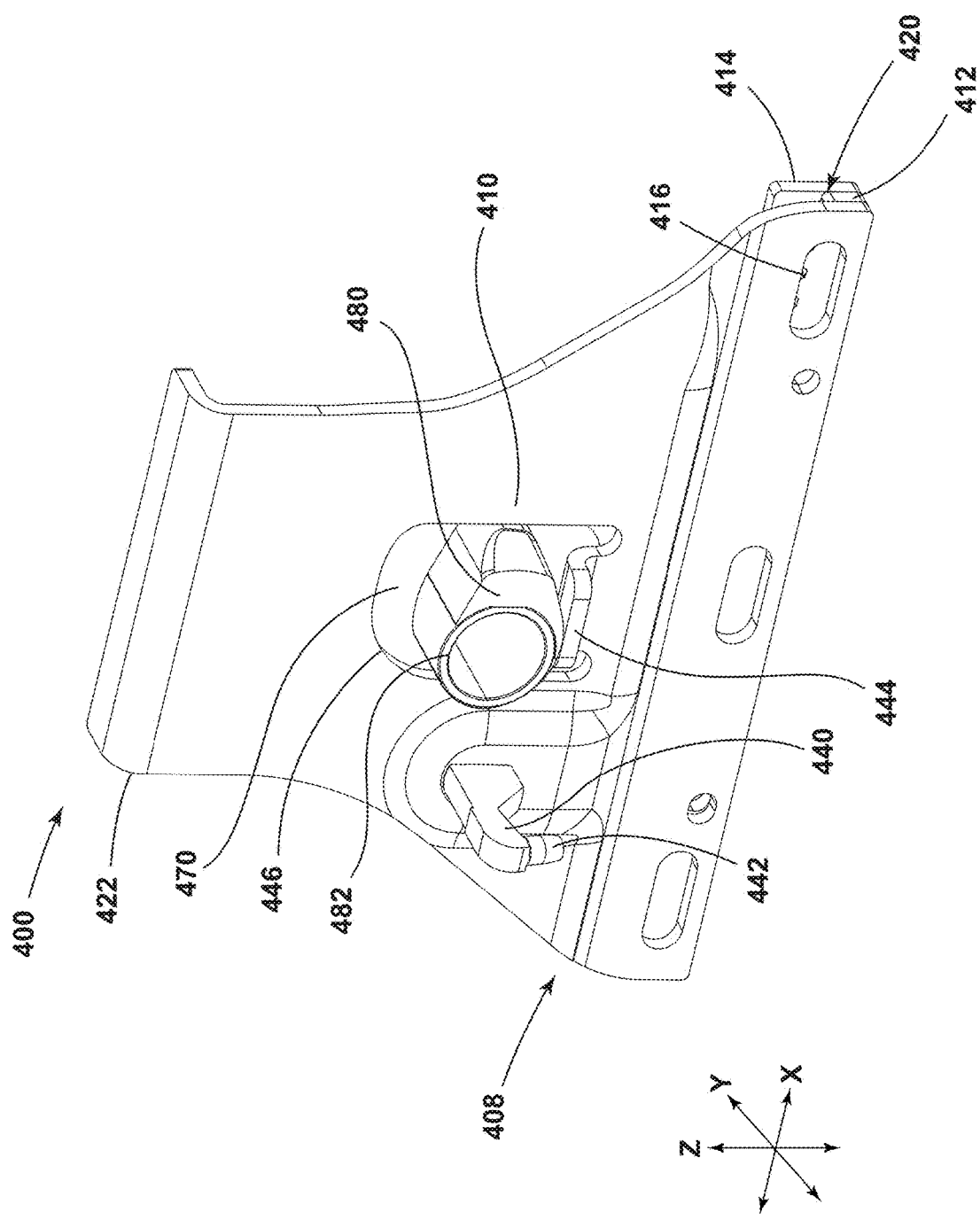
FIG. 18A is a perspective view generally illustrating an embodiment of an anchor cam and an anchor, with the anchor cam in a first position corresponding to an engaged position of the anchor, according to teachings of the present disclosure.
Figure 18B:
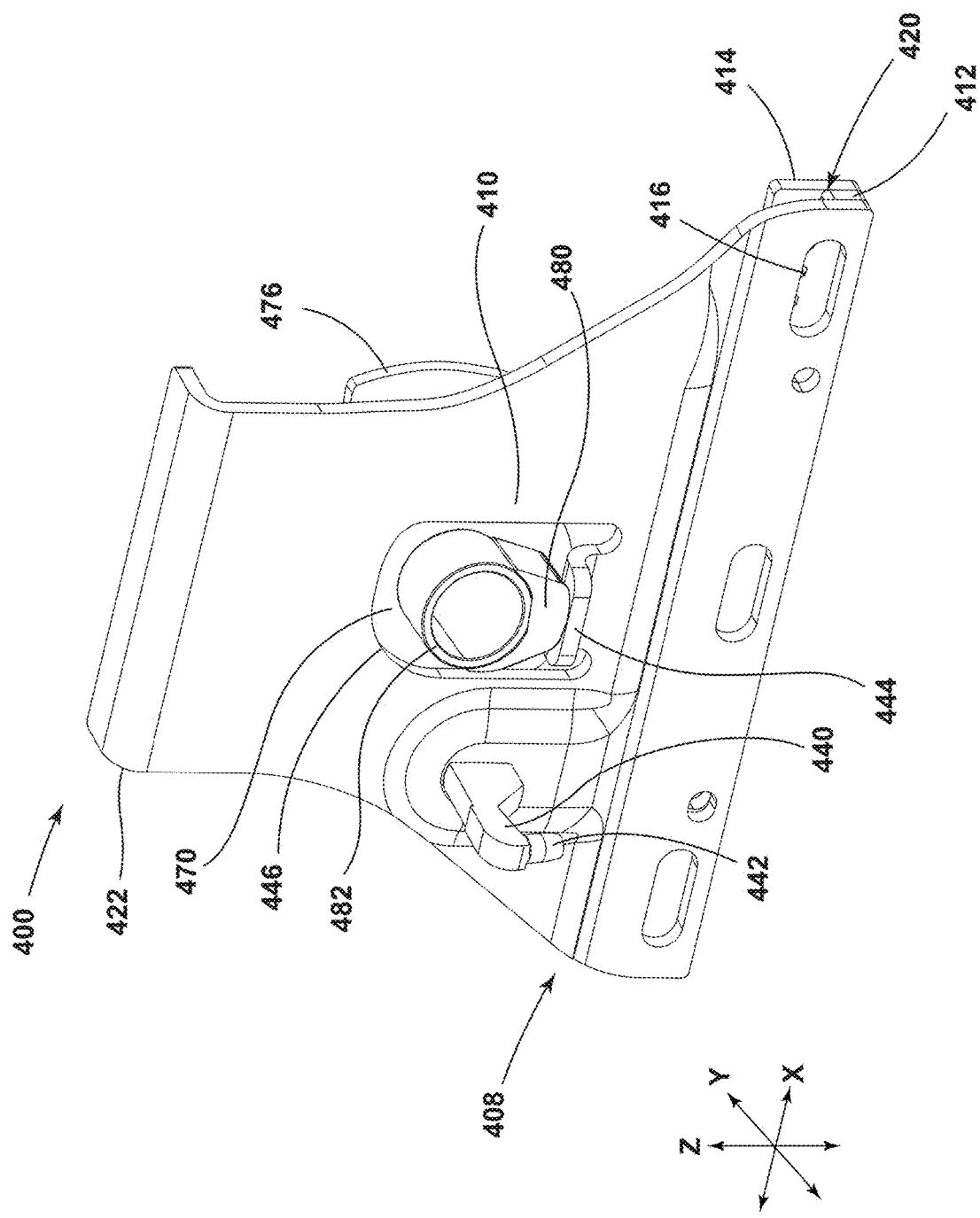
FIG. 18B is a perspective view generally illustrating an embodiment of an anchor cam and an anchor, with the anchor cam in a second position corresponding to a disengaged position of the anchor, according to teachings of the present disclosure.
Figure 19A:
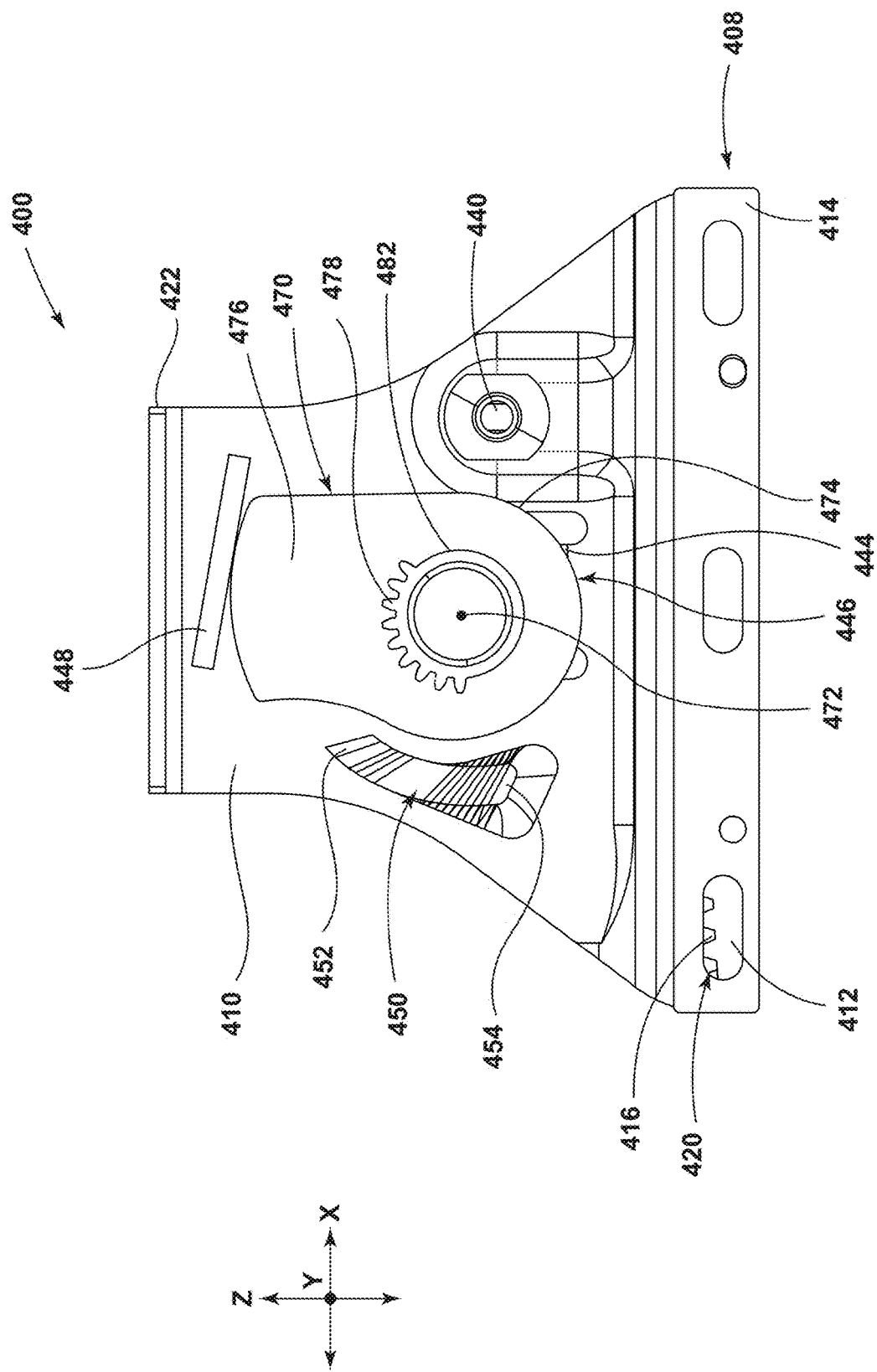
FIG. 19A is a perspective view generally illustrating an embodiment of an anchor cam and an anchor, with the anchor cam in a first position corresponding to an engaged position of the anchor, according to teachings of the present disclosure.
Figure 19B:
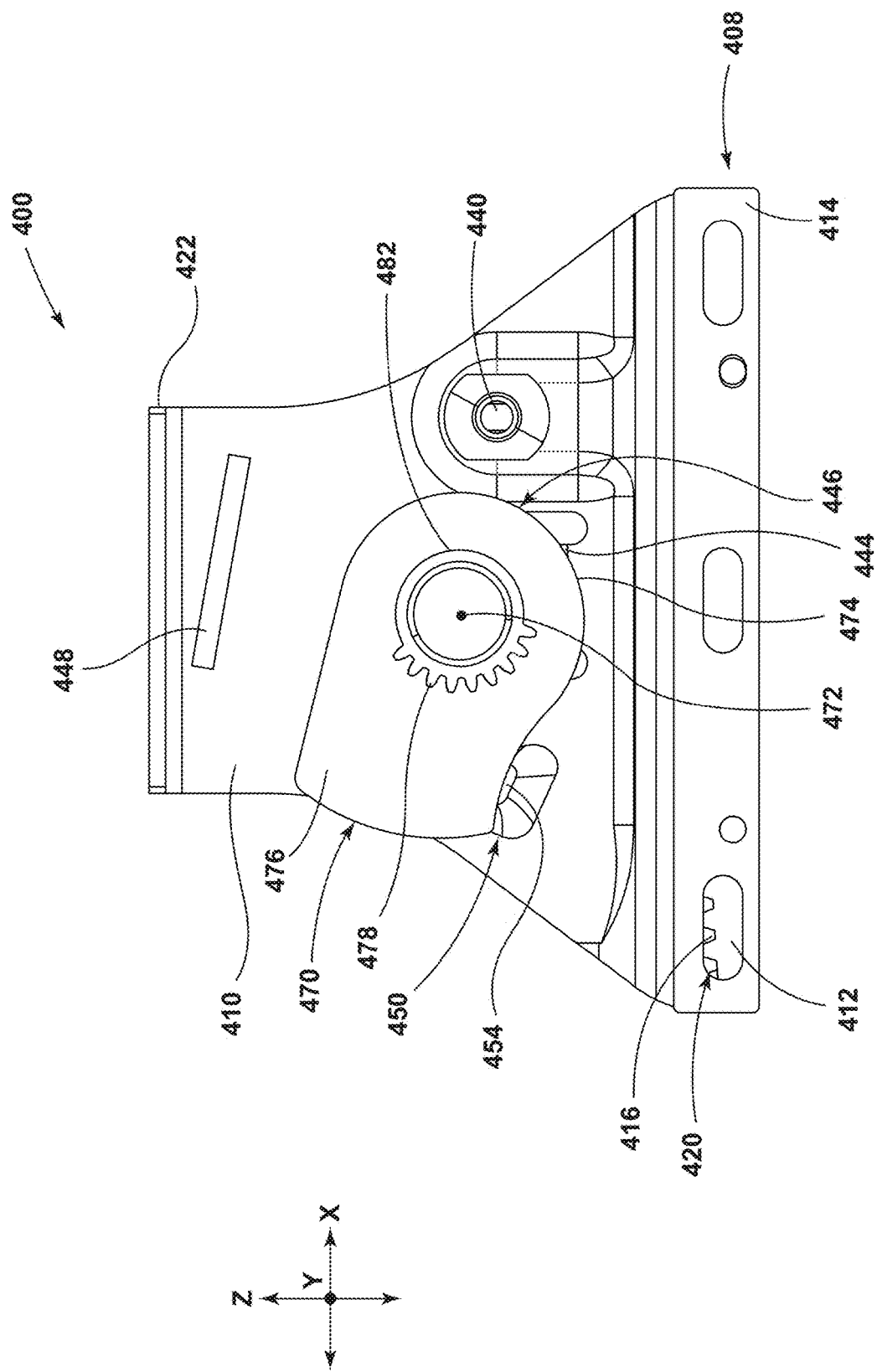
FIG. 19B is a perspective view generally illustrating an embodiment of an anchor cam and an anchor, with the anchor cam in a second position corresponding to a disengaged position of the anchor, according to teachings of the present disclosure.

With embodiments, such as generally illustrated in FIGS. 18A and 18B, an anchor 400 may include an anchor adjustment portion 444 that may be configured to engage an anchor cam projection 480, which may facilitate adjustment of an anchor 400 generally in a Z-direction. An anchor 400 may include an anchor opening 446 which may be configured to at least partially receive an anchor cam base 482. An anchor adjustment portion 444 may extend from an anchor 400 (e.g., an anchor body 410) generally perpendicular to the anchor 400 and/or may be disposed adjacent/proximate an anchor opening 446. Additionally and/or alternatively, an anchor adjustment portion 444 may be configured as a surface, edge, body, and/or other structure configured to engage an anchor cam projection 480.

Figure 9A:
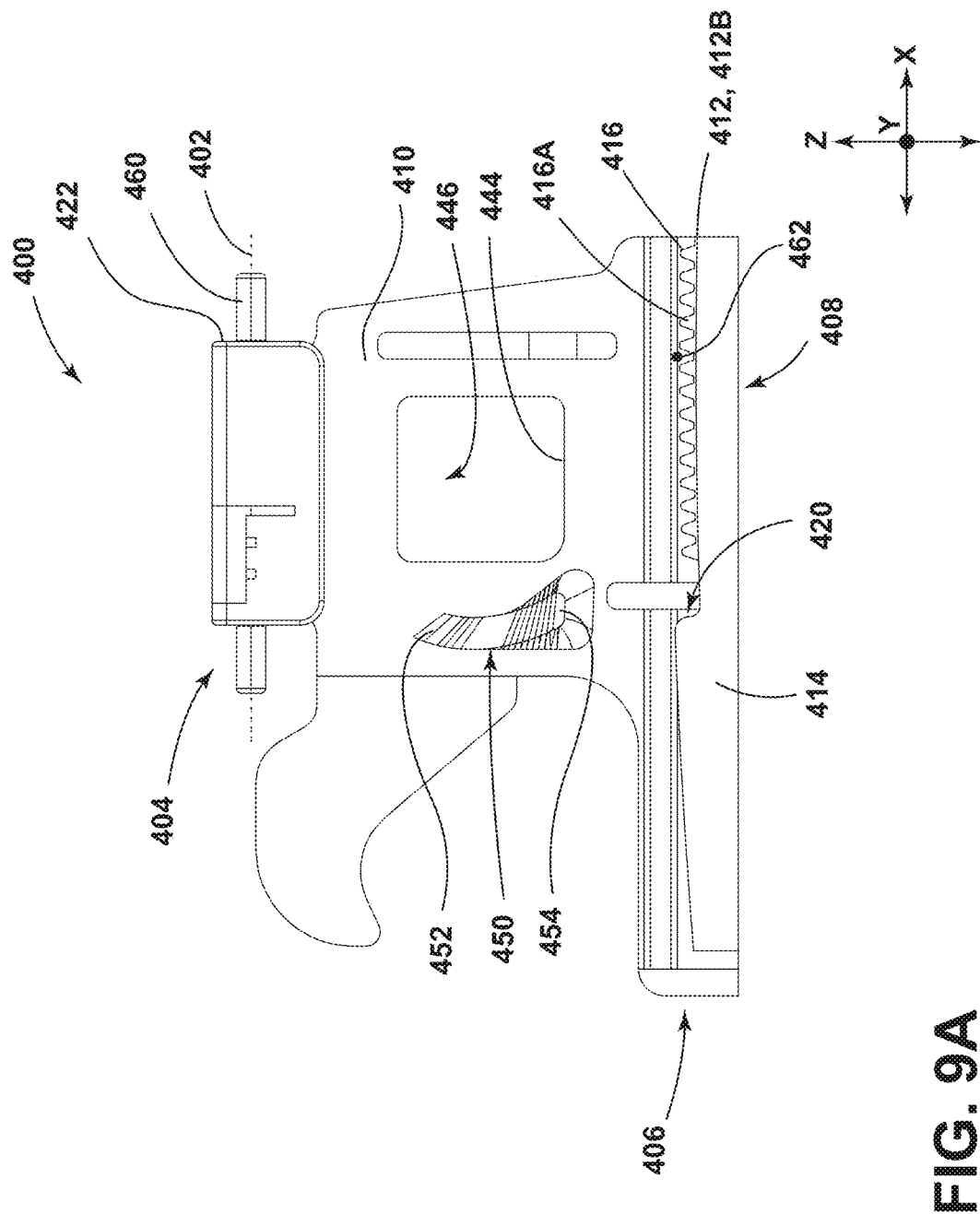
FIGS. 9A, 9B, and 9C are views generally illustrating an embodiment of an anchor including a ramp portion according to teachings of the present disclosure.
Figure 9B:
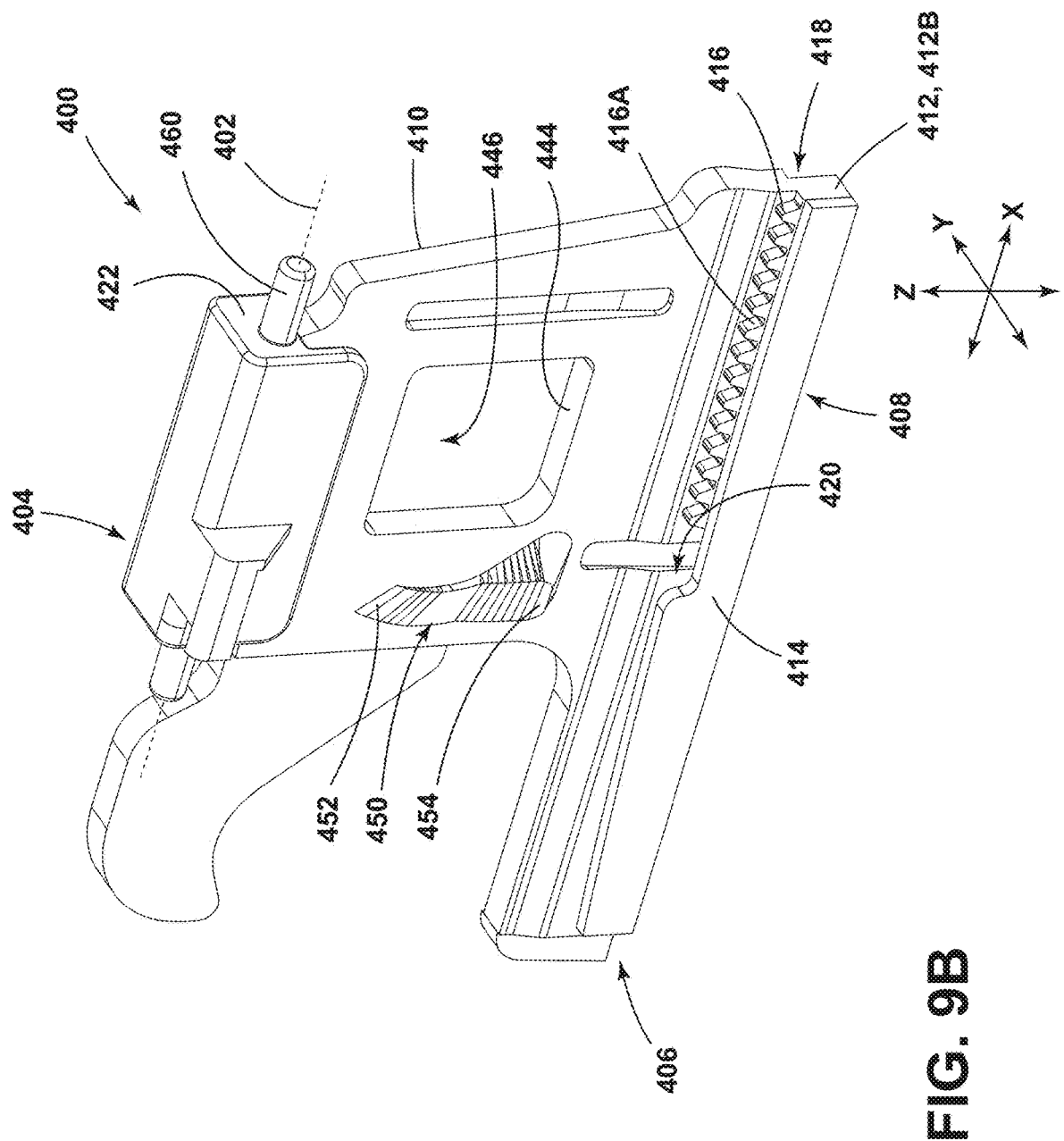
Figure 9C:
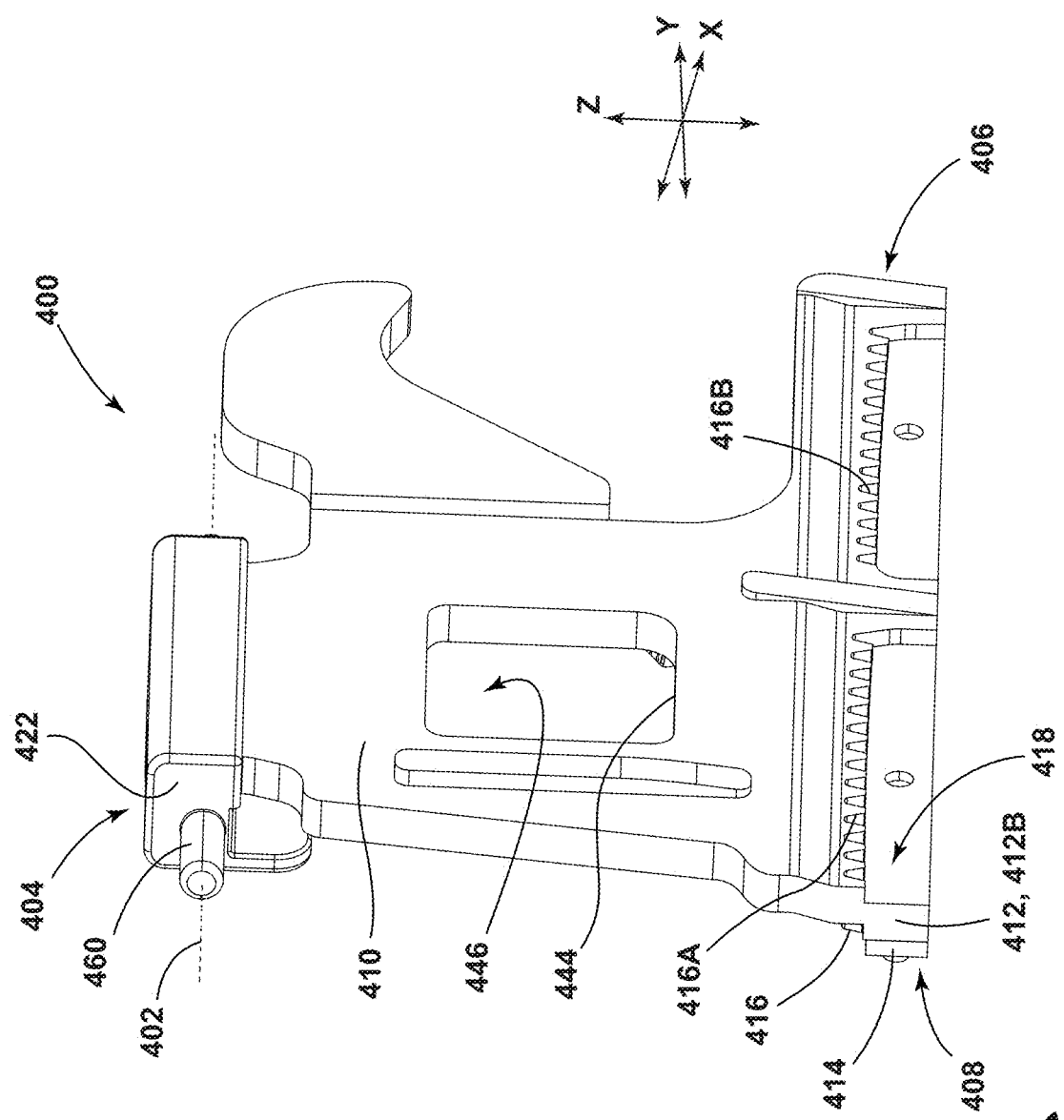
Figure 10:
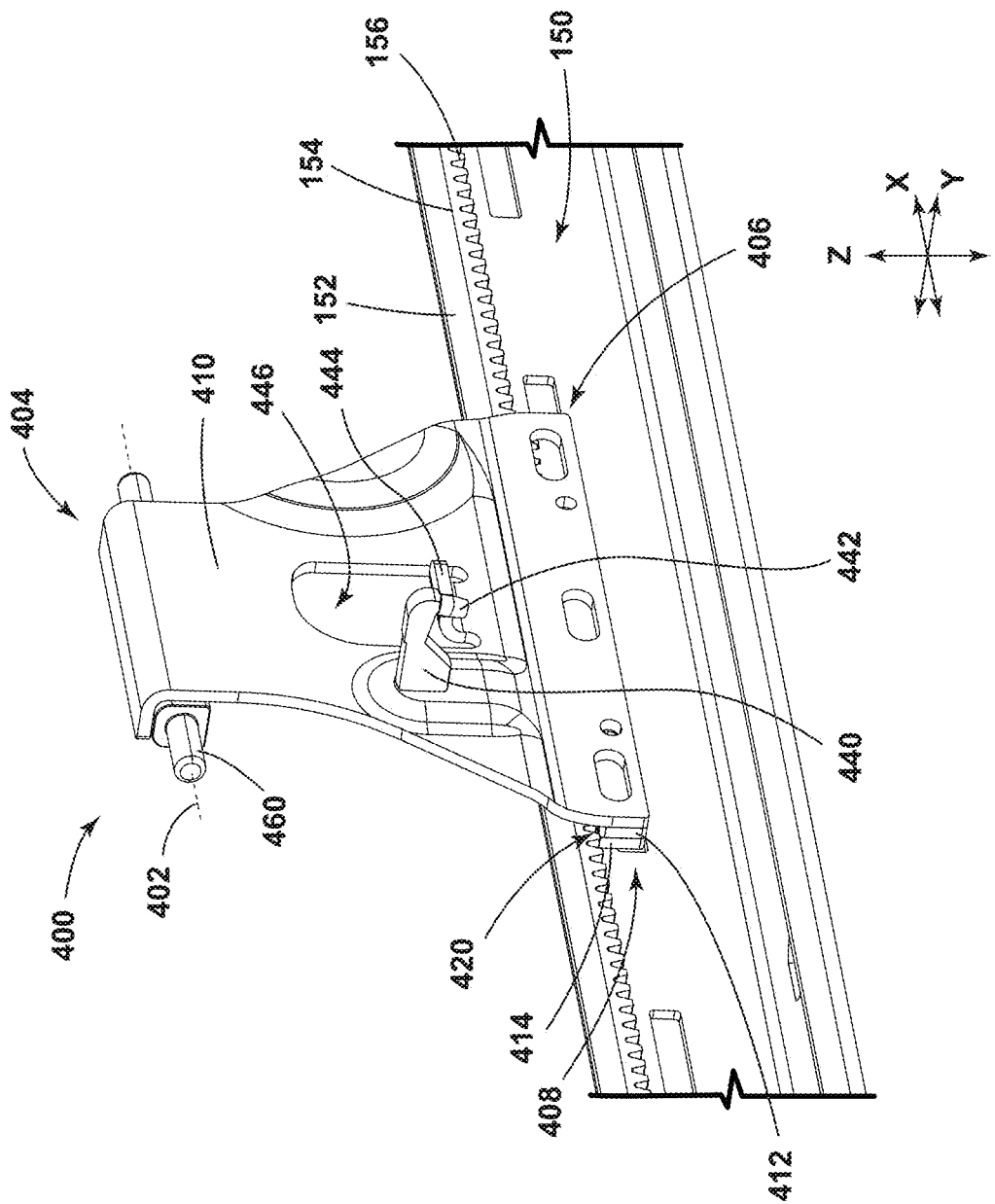
FIG. 10 is a perspective view generally illustrating an embodiment of an anchor engaged with an inner track according to teachings of the present disclosure.
Figure 11A:
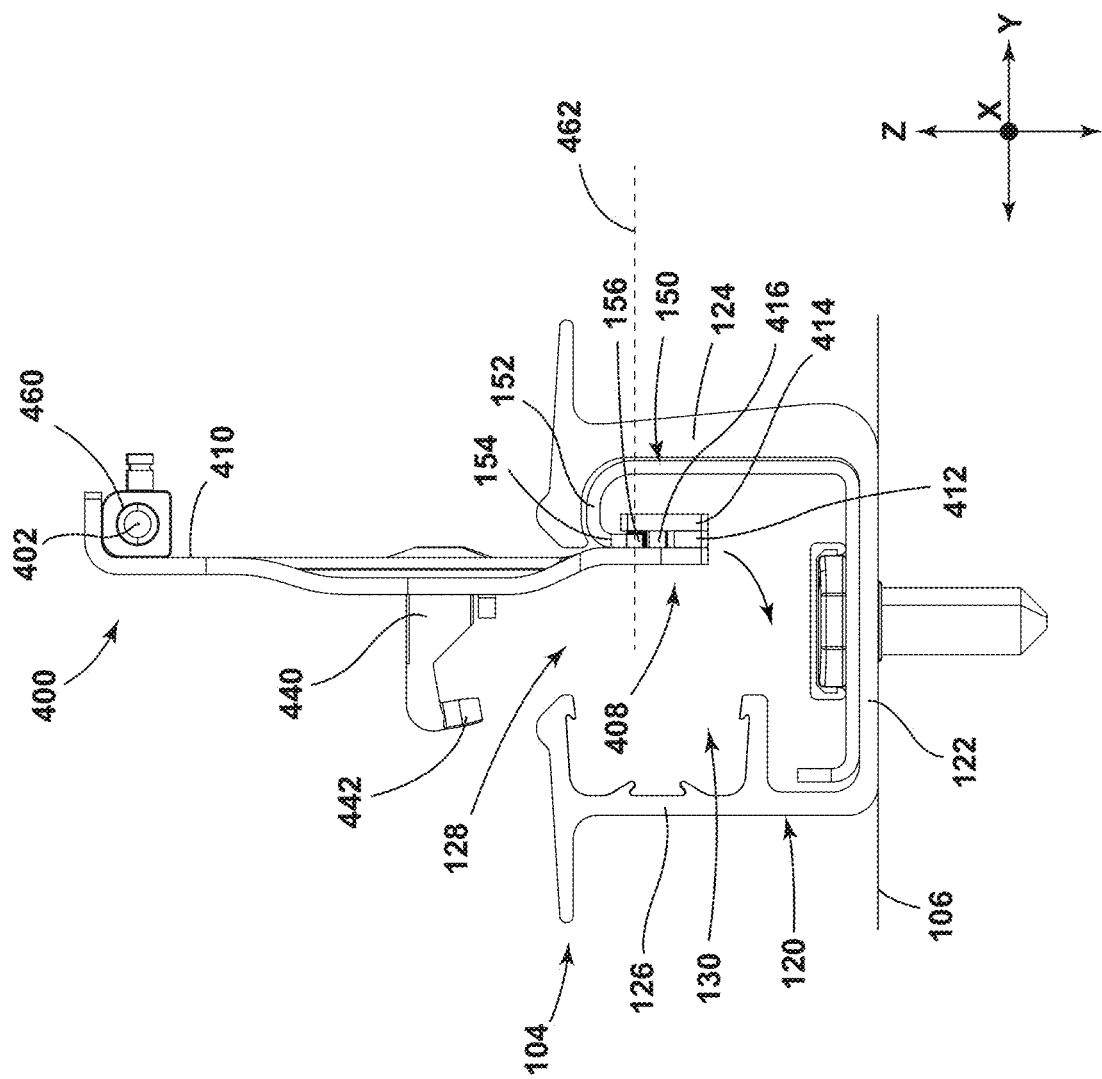
FIGS. 11A and 11B are end views generally illustrating an embodiment of a track system with an anchor in an engaged position and a disengaged position, respectively, according to teachings of the present disclosure.
Figure 11B:
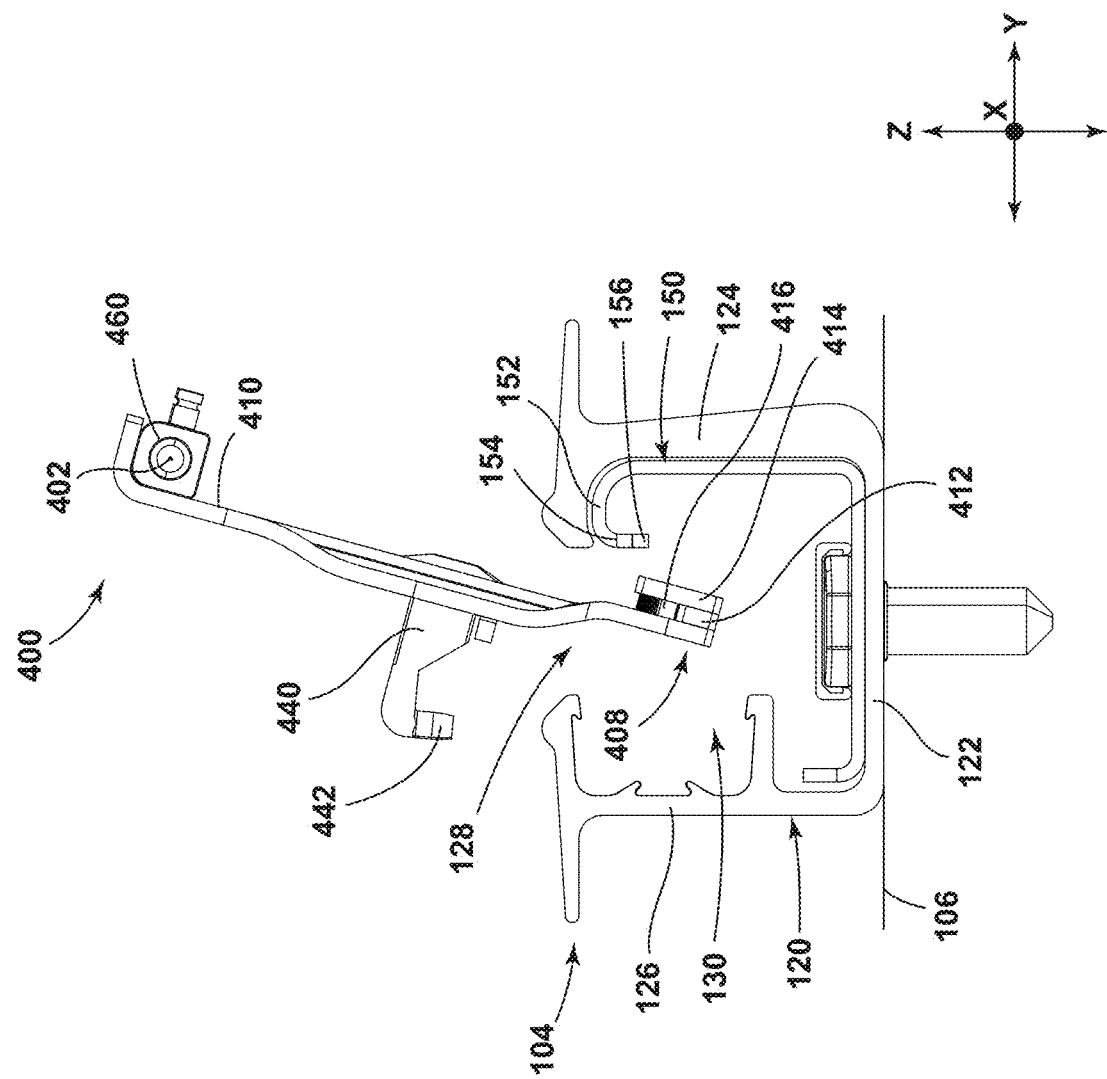

With embodiments, such as generally illustrated in FIGS. 6A-12 and 14-19B, a toothed anchor portion 412 may be configured to engage a toothed portion 154 of a track assembly 104. A toothed anchor portion 412 may be an elongated and/or planar member, and/or may extend generally in an X-direction. A toothed anchor portion 412 may be configured as a separate, individual component from an anchor body 410 and/or an anchor member 414 (see, e.g., FIGS. 6A-8). Additionally and/or alternatively, a toothed anchor portion 412 may be integrally formed with and/or project from an anchor body 410 and/or an anchor member 414. For example, as generally illustrated in FIGS. 9A-9C, a toothed anchor portion 412 may be stamped into an anchor body 410 and/or an anchor member 414 and, thus, configured as a stamped-in portion 418 of an anchor body 410 and/or an anchor 400.

With embodiments, as generally illustrated in FIGS. 6A-12 and 14-19B, a toothed anchor portion 412 may include one or more anchor teeth 416. Anchor teeth 416 may extend and/or protrude from an anchor 400 and/or a toothed anchor portion 412 generally in a Z-direction (e.g., upward in the Z-direction away the mounting surface 106). One or more (e.g., all) of the anchor teeth 416 may be disposed one after another, generally in an X-direction, to define a row of anchor teeth 416. In embodiments, a toothed anchor portion 412 may include a first configuration, such as generally illustrated in connection with first toothed anchor portion 412A in FIG. 7, and/or may include a second configuration, such as generally illustrated in connection with a second toothed anchor portion 412B in FIG. 8.

With embodiments, such as generally illustrated in FIGS. 7, 12, 15A-15C, 17A, and 17B, a first toothed anchor portion 412A may include anchor teeth 416 that may be disposed in a linear manner to define a linear row of anchor teeth 416, which may extend substantially parallel to an X-direction. A linear row of anchor teeth 416 may extend substantially straight across an anchor body 410 such that, for example, a distance between each of the anchor teeth 416 and an anchor axis 402 is the same (see, e.g., FIG. 7). Engagement of an anchor 400 having a first toothed anchor portion 412A with a track assembly 104 may include substantially all of the anchor teeth 416 of the anchor 400 engaging corresponding track teeth 156 of the toothed portion 154. Such engagement may provide resistance to dynamic events and/or large forces (e.g., vehicle crashes), which may help prevent unintended movement of a support assembly 102 relative to a track assembly 104 (e.g., in the X-direction). Increasing the number of engaged anchor teeth 416 may increase the resistance to dynamic events.

With embodiments, such as generally illustrated in FIGS. 6A, 6B, 8-9C, 12, and 15A-17B, an anchor 400 may include a second toothed anchor portion 412B that may be configured to reduce play between an anchor 400 and/or a support member 200 relative to a track assembly 104, such as by pressing or jamming at least some anchor teeth 416 (e.g., one or more anchor teeth 416' of a second anchor 400', one or more of a first subset of anchor teeth 416A, etc.) into the track teeth 156 of the track assembly 104. A second toothed anchor portion 412B may include a plurality of anchor teeth 416 disposed in a curved manner to define a curved row of anchor teeth 416. Additionally and/or alternatively, a second toothed anchor portion 412B may be asymmetrical such that, for example, the anchor teeth 416 are disposed in a row including a linear portion defined by a first subset of anchor teeth 416A and/or a curved portion defined by a second subset of anchor teeth 416B (see, e.g., FIGS. 6B and 8). A first subset of the anchor teeth 416A may be disposed in a linear manner (e.g., extend straight across an anchor body 410) to define a linear row of anchor teeth 416, which may be configured similarly to the anchor teeth 416 of a first toothed anchor portion 412A. A second subset of the anchor teeth 416B may be disposed in a curved manner (e.g., extend across an anchor body 410 along a curve) to define a curved row of anchor teeth 416. A first and second subset of anchor teeth 416A, 416B may be disposed directly adjacent to one another and/or may be connected to one another to form a single continuous row of anchor teeth 416 with a linear portion/section and a curved portion/section (see, e.g., FIG. 8). In examples, a tilt axis 462 may extend perpendicular to an anchor 400, such as through a second end 406 and/or a hooked portion 408 of the anchor 400 (see, e.g., FIG. 16B). In some circumstances, a first and second subset of anchor teeth 416A, 416B may extend (e.g., generally in opposite X-directions) from a tilt axis 462 toward and/or to opposite ends of an anchor 400. Additionally and/or alternatively, a first and second subset of anchor teeth 416A, 416B may be disposed spaced apart from one another as separate and distinct sections or rows of anchor teeth 416 (see, e.g., FIG. 9C).

With embodiments, as generally illustrated in FIGS. 6A, 6B, 8-9C, 12, and 15A-17B, a second subset of the anchor teeth 416B (e.g., a curved row of anchor teeth 416) may include one or more anchor teeth 416B that are disposed farther from an anchor axis 402 than one or more other anchor teeth 416B such that, for example, each anchor tooth 416B may be disposed farther from the anchor axis 402 the closer it is to an edge of the second toothed anchor portion 412B. A distance between an anchor axis 402 and a second subset of the anchor teeth 416B (e.g., a curved row of anchor teeth 416) may progressively increase in a direction toward an edge of the second toothed anchor portion 412B (e.g., generally in an X-direction). A radius R of the rounded/curved configuration of a second subset of the anchor teeth 416B (e.g., a curved row of anchor teeth 416) may be relatively large. For example and without limitation, the radius may be at least as a large as a height of an anchor 400 (e.g., in the Z-direction) and/or may be several times larger than the height of an anchor 400 (e.g., the radius may, in some configurations, be about 1.5 meters). The radius may be substantially constant or may vary.

With embodiments, such as generally illustrated in FIGS. 6A-12 and 14-16B, an anchor member 414 may be configured to facilitate and/or maintain alignment (e.g., generally in a Y-direction) and/or engagement of a toothed anchor portion 412 and a toothed portion 154 of a track assembly 104. An anchor member 414 may include an elongated (e.g., planar) member that extends generally in an X-direction. In some examples, an anchor member 414 may extend beyond and/or farther than a toothed anchor portion 412 generally upward in a Z-direction such that a gap 420 (e.g., a space) is defined between the anchor member 414 and an anchor body 410 (e.g., generally in a Y-direction). The gap 420 may, additionally and/or alternatively, be defined and/or disposed above a toothed anchor portion 412 relative to a Z-direction. The gap 420 may be configured to at least partially receive a toothed portion 154 of a track assembly 104 and/or guide a toothed portion 154 of a track assembly 104, such as generally in a Z-direction, into engagement with a toothed anchor portion 412.

With embodiments, such as generally illustrated in FIGS. 6A, 6B, 10-12, and 16A-19B, an anchor 400 may include an anchor protrusion 440 that may be configured to engage a slider 270. An anchor protrusion 440 may extend from an anchor 400 (e.g., an anchor body 410) generally in a Y-direction. An anchor protrusion 440 may include an anchor tab 442, which may be configured to engage a corresponding slider channel 298. An anchor tab 442 may disposed on and/or connected to an anchor protrusion 440, such as at or about an end of the anchor protrusion 440 opposite the anchor body 410. An anchor tab 442 may extend, such as from an anchor protrusion 440, generally in a Z-direction (e.g., downward in the Z-direction toward the mounting surface 106).

With embodiments, such as generally illustrated in FIGS. 9A, 9B, 14-17B, 19A, and 19B, an anchor 400 may include a ramp portion 450 configured to engage a corresponding anchor cam 470. A ramp portion 450 may project from an anchor 400 (e.g., an anchor body 410) generally in a Y-direction. A ramp portion 450 may extend along an anchor 400, such as from a first ramp end 452 to a second ramp end 454, in a curved manner. A first ramp end 452 may be disposed above a second ramp end 454 relative to a Z-direction, and/or a second ramp end 454 may project farther from an anchor 400 generally in a Y-direction than a first ramp end 452, such that the ramp portion 450 is sloped generally downward in a Z-direction and away from the anchor 400 generally in a Y-direction.

With embodiments, such as generally illustrated in FIGS. 1A, 1B, and 6A-16B, an anchor 400 may be movably connected with a support member 200, such as via an anchor shaft 460. An anchor shaft 460 may be connected to an anchor body 410, such as at or about a first end of an anchor body 410. For example and without limitation, an anchor 400 and/or anchor shaft 460 may be disposed between and/or connected to one or more projections 206A, 206B of a support member 200, which may extend (e.g., generally in a Y-direction) from a body 202 (e.g., a housing, a casing, etc.) of a support member 200. An anchor 400 may be rotatable with and/or about an anchor shaft 460 into/out of Z-direction alignment with a toothed portion 154 of a track assembly 104 and/or into/out of engagement with a toothed portion 154 of a track assembly. In at least some examples, an anchor shaft 460 may define an anchor axis 402 and/or may be disposed coaxially with an anchor axis 402. An anchor shaft 460 may or may not be configured to translate (e.g., in a Z-direction) such as to facilitate engagement of with and/or disengagement from a track assembly 104. An anchor shaft 460 may be disposed in a first position (e.g., a first vertical position) when the anchor 400 is disengaged from the tooth portion 154 of the track assembly 104. An anchor shaft 460 may be disposed in a second position (e.g., a second vertical position) when the anchor 400 is engaged with a toothed portion 154 of a track assembly 104. The first position may be offset from the second position, such as by an oblique angle and/or a distance (e.g., in the Z-direction). For example and without limitation, the second position of the anchor shaft 460 may be disposed at a greater height than the first position of the anchor shaft 460.

With embodiments, such as generally illustrated in FIGS. 16A-17B, 19A and 19B, an anchor 400 may include a tilt protrusion 448, which may be configured to engage an anchor cam protrusion 476, such as to restrict and/or prevent movement/adjustment of an anchor 400 generally in a Z-direction. Additionally and/or alternatively, a tilt protrusion 448 may be configured to engage an anchor cam protrusion 476 to cause the anchor 400 to tilt/rotate generally in an X-direction and/or about an axis that may extend generally in a Y-direction (e.g., a tilt axis 462). For example and without limitation, engaging/disengaging an anchor cam protrusion 476 with a tilt protrusion 448 may cause an anchor 400 to rotate/tilt about a tilt axis 462 (e.g., an offset tilt axis), such as between a default position and a tilted position. A tilt protrusion 448 may extend from an anchor 400 (e.g., an anchor body 410) generally perpendicular to the anchor 400 and/or may be disposed at or about a first end 404 of an anchor 400. A tilt protrusion 448 may be oriented parallel to an anchor axis 402 or obliquely to an anchor axis 402 and/or a toothed portion 412 such that, when engaged with and/or contacted by an anchor cam protrusion 476, a line aligned with a normal force $N_f$ applied to the anchor cam protrusion 476 by the tilt protrusion 448 does not intersect with and/or extends away from a tilt axis 462 (e.g., relative to an X-direction).

Figure 16A:
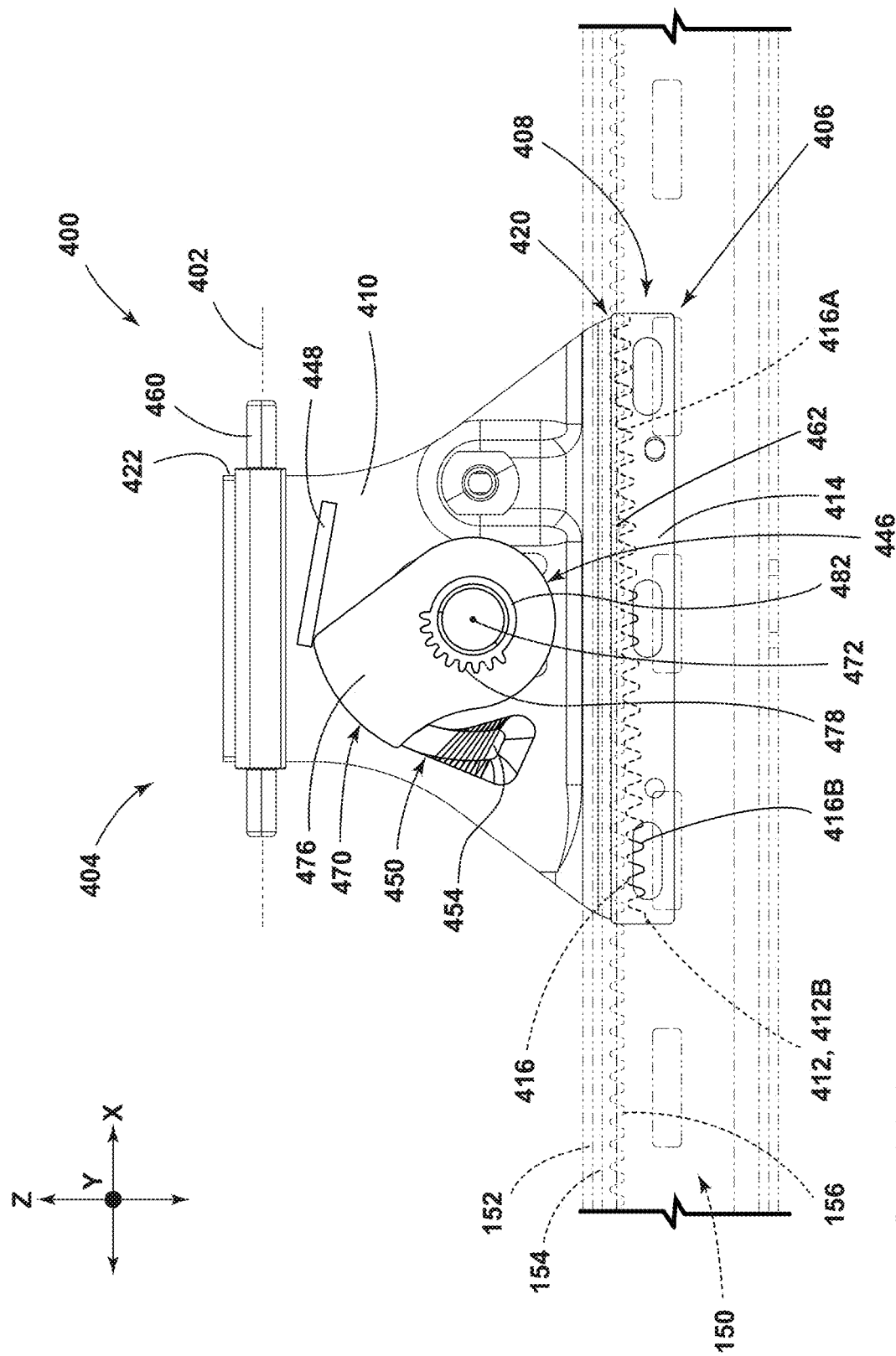
FIGS. 16A and 16B are side views generally illustrating an embodiment of an inner track engaged with an anchor in a default position and in a tilted position, respectively, according to teachings of the present disclosure.
Figure 16B:
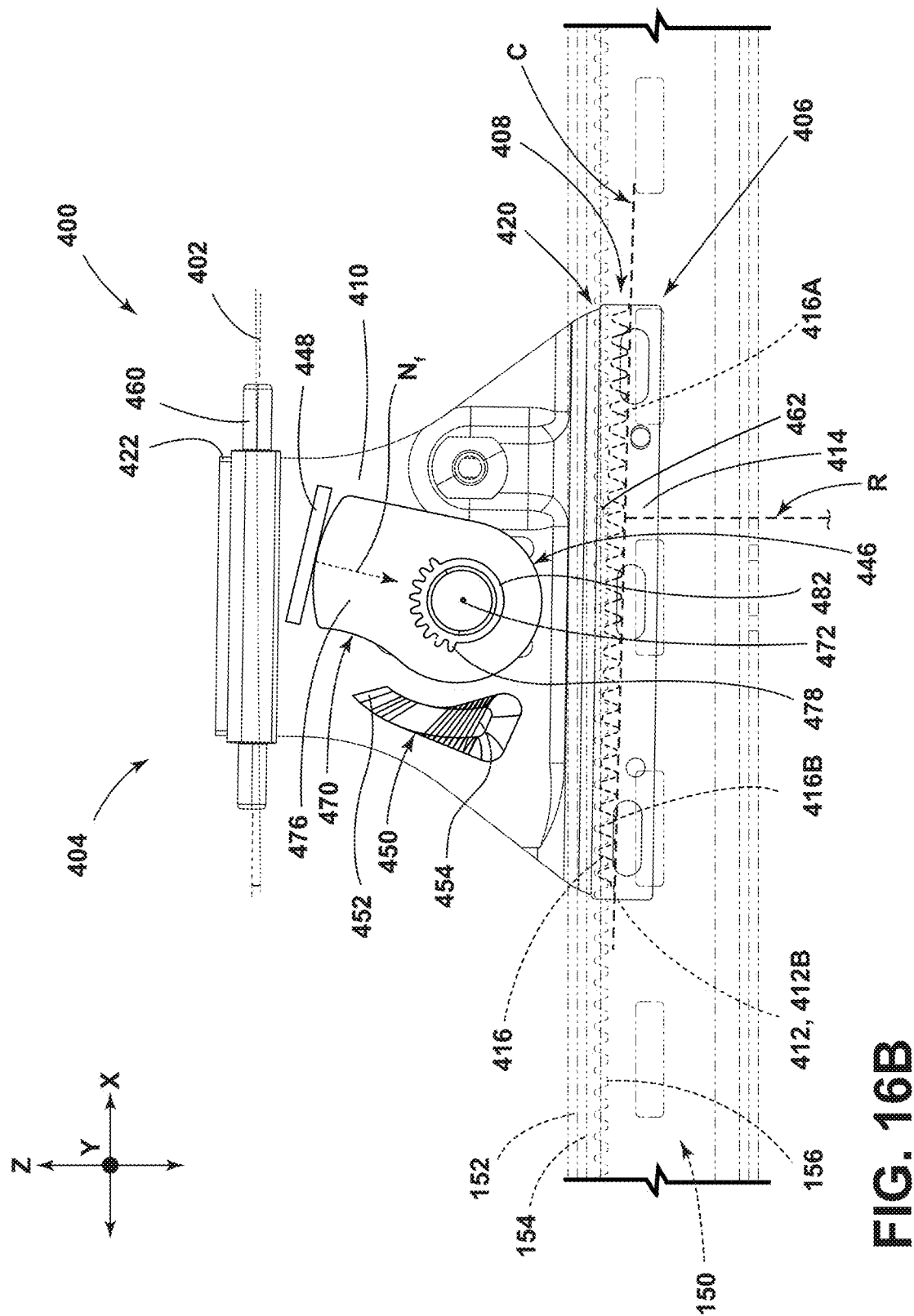

In embodiments, such as generally illustrated in FIG. 16B, a circle C having the radius of the curvature of the second subset 416B of the anchor teeth 416 may be centered below the track assembly 104. The center of the circle C may, for example, be aligned with (e.g., in the Z-direction) and/or may dictate the location of the tilt axis 462. For example and without limitation, the tilt axis 462 may be defined at or about a portion of the anchor teeth 416 that is above (e.g., directly above) the center of such a circle C, and a radius R extending vertically upward from the center may be offset from the line $N_f$ such that the radius R (or an extension thereof) does not intersect with the line $N_f$ below the anchor 400.

With embodiments, configuring the tilt protrusion such that the line $N_f$ is offset from the tilt axis 462 may amplify an amount of force applied to the anchor 400 (e.g., by effectively increasing a lever arm length) by the anchor cam 470, which may facilitate rotation of an anchor 400 about the tilt axis 462. The normal force (and a line $N_f$ aligned therewith) may, additionally and/or alternatively, extend away from a toothed anchor portion 412 relative to a Z-direction, at least to some degree, which may facilitate adjustment of the anchor 400 generally upward in a Z-direction, which may facilitate engaging the anchor 400 with the toothed portion 154. In some circumstances, a tilt protrusion 448 may be configured as a surface, edge, body, and/or other structure configured to engage an anchor cam protrusion 476.

With embodiments, such as generally illustrated in FIGS. 16A and 16B, an anchor 400 may be rotatable about a tilt axis 462 (e.g., an offset tilt axis) between a default position and a titled position. An offset tilt axis 462 may extend generally in a Y-direction and/or perpendicular to an anchor axis 402. An offset tilt axis 462 may, for example, be offset (e.g., generally in an X-direction) from a center/middle of an anchor 400 and/or at least a portion of a tilt protrusion 448 (e.g., a point and/or area of the tilt protrusion 448 that engages and/or contacts the anchor cam protrusion 476). An offset tilt axis 462 may be disposed at or about a second end 406 and/or a toothed portion 412 of an anchor 400. For example and without limitation, an offset tilt axis 462 may be disposed at or about an end of a first subset of anchor teeth 416A adjacent and/or proximate a second subset of anchor teeth 416B (e.g., where a first subset of anchor teeth 416A contacts and/or transitions to a second subset of anchor teeth 416B). In general, an offset tilt axis 462 may be disposed such that when adjusting the anchor 400 into engagement with the track assembly 104 (e.g., generally upward in a Z-direction), the anchor 400 and/or an anchor shaft 460 may rotate about the offset tilt axis 462. For example and without limitation, an anchor 400 having a first toothed anchor portion 412A and a second toothed anchor portion 412B may be initially adjusted into engagement with a track assembly 104 when in a default position (see, e.g., FIGS. 15B, 16A, 17A) in which some or all of the first toothed anchor portion 412A may be engaged with the toothed portion 154. Further adjustment of the anchor 400 (e.g., via engaging, contacting, and/or pressing an anchor cam protrusion 476 against a tilt protrusion 448 of the anchor 400) may cause the anchor 400 to tilt/rotate about an offset tilt axis 462 from the default position toward a tilted position. Tilting/rotating an anchor 400 about an offset tilt axis 462 may cause at least some anchor teeth 416 (e.g., one or more of a first subset of anchor teeth 416A, anchor teeth 416' of a second anchor 400', etc.) to be pressed or jammed into the track teeth 156 of the of the toothed portion 154, which may reduce play between one or more of the anchors 400 and the track assembly 104 (see, e.g., FIGS. 15C, 16B, 17B). Additionally and/or alternatively, tilting/rotating an anchor 400 about an offset tilt axis 462 may cause an anchor 400 to engage (e.g., contact) and/or shift at least a portion of a support member 200 and/or a second anchor 400' generally in an X-direction, which may reduce play between the support assembly 102 (e.g., the support member 200) and the track assembly 104 (see, e.g., FIGS. 17A, 17B). For example and without limitation, the second toothed anchor portion 412B may be configured (e.g., curved, offset, etc.) to cause an anchor 400 to tilt/rotate about an axis 462 that is offset from a center of the anchor 400.

Figure 17A:
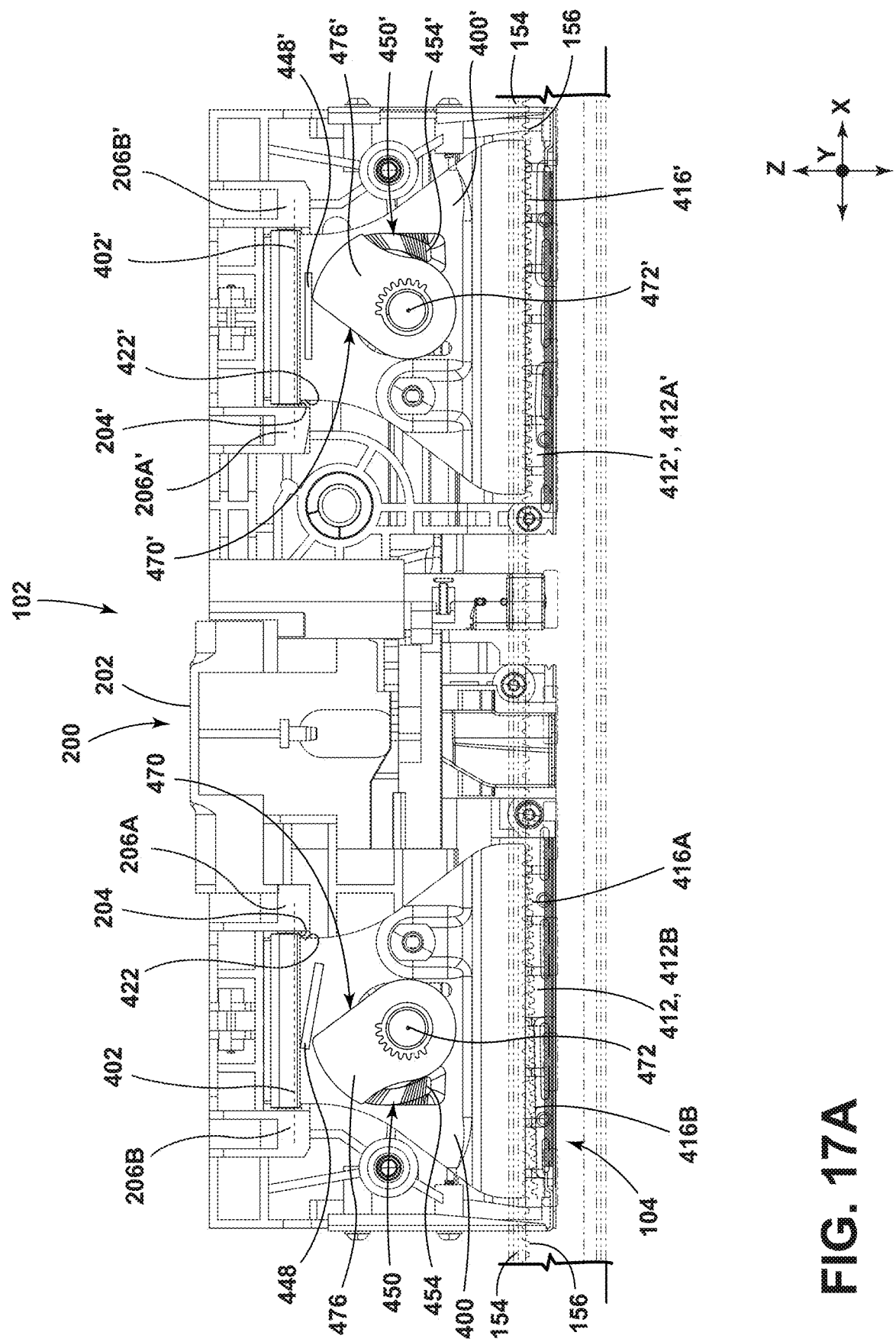
FIGS. 17A and 17B are side views generally illustrating portions of an embodiment of a track system with an anchor in a default position and in a tilted position, respectively, according to teachings of the present disclosure.

With embodiments, if an anchor 400 is in a default position and engaged with a toothed portion 154 of a track assembly 104, an anchor axis 402 may extend generally parallel to an X-direction, at least some (e.g., all) of a first subset of anchor teeth 416A may be engaged with the track teeth 156 of the toothed portion 154, and/or at least some (e.g., most, all, etc.) of a second subset of anchor teeth 416B may be disengaged from the track teeth 156 of the toothed portion 154 (see, e.g., FIG. 15B, 16A, 17A). If an anchor 400 is in a tilted position and engaged with a toothed portion 154 of a track assembly 104, an anchor axis 402 may extend obliquely and/or perpendicularly to an X-direction, one or more of a second subset of anchor teeth 416B may be engaged with the track teeth 156 of the toothed portion 154, and/or one or more of a first subset of anchor teeth 416A may be disengaged from the track teeth 156 of the toothed portion 154 (see, e.g., FIG. 15C, 16B, 17B).

In embodiments, a support member 200 may include a first anchor 400 and a second anchor 400'. A first anchor 400 may include an anchor axis 402, a first end 404, a second end 406, a hook portion 408, an anchor body 410, a toothed anchor portion 412 (e.g., a second toothed anchor portion 412B), an anchor member 414, anchor teeth 416, a first subset of anchor teeth 416A, a second subset of anchor teeth 416B, a gap 420, a contact surface 422, an anchor protrusion 440, an anchor tab 442, an anchor adjustment portion 444, an anchor opening 446, a tilt protrusion 448, a ramp portion 450, a first ramp end 452, second ramp end 454, an anchor biasing member 456, an anchor shaft 460, and/or a tilt axis 462 (e.g., an offset tilt axis). A second anchor 400' may include an anchor axis 402', a first end 404', a second end 406', a hook portion 408', an anchor body 410', a toothed anchor portion 412' (e.g., a first toothed anchor portion 412A'), an anchor member 414', anchor teeth 416', a gap 420', a contact surface 422', an anchor protrusion 440', an anchor tab 442', an anchor adjustment portion, an anchor opening, a tilt protrusion 448', a ramp portion 450', a first ramp end 452', an anchor biasing member 456', a second ramp end 454', and/or an anchor shaft 460', some or all of which may be configured in the same or similar manner as corresponding features of a first anchor 400.

In some circumstances, a support member 200 may experience a dynamic event that may involve increased forces being applied to a support member 200 and/or a track assembly 104. For example, in a vehicle application, a dynamic event may include a vehicle collision. With embodiments, a first anchor 400 and/or a second anchor 400' may be configured to provide resistance for dynamic events. For example and without limitation, in an engaged position, a first anchor 400 and/or a second anchor 400' may be engaged with a hook portion 152 and/or a toothed portion 154 of a track assembly 104 to resist forces applied to the support member 200 to restrict and/or prevent substantial movement of a support member 200 relative to a track assembly, such as in an X-direction, a Y-direction, and/or a Z-direction. With some embodiments, an anchor (e.g., a second anchor 400') may be configured to provide more resistance during dynamic events than another anchor (e.g., the first anchor 400). For example, if a second anchor 400' that includes anchor teeth 416' that are disposed substantially linearly (e.g., a first toothed anchor portion 412A) and are all (or mostly all) engaged with respective track teeth 156, the second anchor 400' may provide more resistance to movement (e.g., X-direction movement) of the support member 200 than a first anchor 400 that may include a second toothed anchor portion 412B and/or a curved subset of teeth 416B that are not engaged or not fully engaged with respective track teeth 156. Additionally or alternatively, during a dynamic event, if anchor teeth 416' of the second anchor 400' and/or track teeth 156 of the toothed portion 154 start to deform and/or shear, additional anchor teeth 416 of the first anchor 400, such as additional teeth from the curved subset 416B, may tilt into engagement with the toothed portion 154 of the track assembly 104, which may provide additional resistance to dynamic forces.

With embodiments, when one or more anchors 400, 400' is engaged with a toothed portion 154 of a track assembly 104, at least a portion of a support member 200 (e.g., a body 202) may be movable, at least to some degree, relative to one or more anchors 400, 400', which may result in at least some play between a support assembly 102 (e.g., a support member 200) and a track assembly 104. If a first anchor 400 engages a toothed portion 154 of a track assembly 104 (e.g., when in a default position), the first anchor 400 may move, at least to some degree, in an X-direction (e.g., via rotating about a tilt axis 462), such as toward or away from a second anchor 400' (e.g., in addition to a rotational movement about axis 402). Such X-direction movement of a first anchor 400 may result in a contact surface 422 of the first anchor 400 (and/or an anchor shaft 460 connected thereto) engaging, contacting, and/or pressing against a contact surface 204 of the support member 200 (and/or a projection 206A thereof), which may cause at least a portion of the support member 200 (e.g., a body 202) to adjust and/or shift generally in an X-direction, which may cause a contact surface 204' of a support member 200 (and/or a projection 206A' thereof) to engage, contact, and/or press against a contact surface 422' of a second anchor 400' (and/or an anchor shaft 460' connected thereto), which may cause the second anchor 400' to shift to at least some degree (e.g., generally in an X-direction), which may cause both anchors 400, 400' to simultaneously engage (e.g., to contact, to be pressed/jammed against, etc.) the body 202 of the support member 200, which may reduce play between the anchors 400, 400' and the body 202 of the support member 200, which reduce play between the support assembly 102 (e.g., the support member 200) and the track assembly 104 (see, e.g., FIGS. 17A, 17B). In some instances, the first and second anchors 400, 400' may be disposed such that the first anchor 400 may move into (e.g., direct) contact with the second anchor 400' to facilitate a reduction of play. Additionally and/or alternatively, if there is play between the anchor teeth 416' of the second anchor 400' and the track teeth 156 of the track assembly 104, such as the result of manufacturing tolerances, an a X-direction shift of the first anchor 400 may reduce and/or eliminate such play, which may reduce and/or eliminate play between the support assembly 102 (e.g., the support member 200) and the track assembly 104. For example and without limitation, the first anchor 400 may be configured to shift the second anchor 400' to effectively press or jam the anchor teeth 416' of the second anchor 400' into the track teeth 156 of the track assembly 104, which may reduce play therebetween. Additionally and/or alternatively, a first anchor 400 may be configured to effectively press or jam the anchor teeth 416' of the second anchor 400' into the track teeth 156 of the track assembly 104 via rotating about an offset tilt axis 462 to a tilted position.

With embodiments, an anchor 400, 400' may be adjustable to an engaged position (see, e.g., FIGS. 11A, 12, and 15B-17B) in which an anchor 400, 400' (e.g., a toothed anchor portion 412, 412') is engaged with a toothed portion 154 of a track assembly 104 (e.g., the anchor teeth 416, 416' are engaged with the track teeth 156) and/or a disengaged position (see, e.g., FIGS. 11B and 15A) in which an anchor 400, 400' (e.g., a toothed anchor portion 412, 412') is disengaged from/not engaged with a toothed portion 154 of a track assembly 104 (e.g., the anchor teeth 416, 416' are not engaged with the track teeth 156). A first anchor 400 may be adjustable (e.g., rotatable) about an offset tilt axis 462 between a default position and/or a tilted position. For example, a first anchor 400 may be in a default position when it initially engages a track assembly 104 and may be subsequently rotated about the offset tilt axis 462 toward a tilted position. A disengaged position may include, for example, an unaligned position in which an anchor 400, 400' is disengaged from and not aligned with the toothed portion 154 (e.g., relative to a Z-direction) and/or an aligned position in which an anchor 400, 400' is disengaged from and aligned with the toothed portion 154 (e.g., relative to a Z-direction). When in an unaligned position, an anchor 400, 400' may be disposed and/or extend obliquely or perpendicularly to a Z-direction. When in an aligned position and/or in an engaged position, an anchor 400, 400' may be disposed generally parallel to a Z-direction. An anchor 400, 400' may, for example, be adjusted generally downward in a Z-direction toward the disengaged position and/or may be adjusted generally upward in a Z-direction toward the engaged position. An anchor 400, 400' may, when disengaged from the toothed portion 154 for example, be adjusted (e.g., moved, slid, rotated) generally laterally in a Y-direction toward an aligned position and/or toward an unaligned position.

With embodiments, an anchor 400, 400', such as when in an unaligned position (see, e.g., FIGS. 1A, 11B), may be insertable into and/or removable from a track assembly 104, such as via being inserted into and/or removed from a track receptacle 130 through a track opening 128. When in an aligned position, an anchor 400, 400' may (i) restrict and/or prevent removal of the support member 200 from a track assembly 104 (e.g., in a Z-direction) and/or (ii) facilitate adjustment of a support member 200 along a track assembly 104 (e.g., via an adjuster pinion 250, via manual movement of a support assembly 102 by a user, etc.). When an anchor 400, 400' is in an engaged position (see, e.g., FIGS. 1B, 11A and 15B-17B), an anchor 400, 400' may connect, secure, and/or fix a support assembly 102 and/or a support member 200 to a track assembly 104 such that X-direction Y-direction, and/or Z-direction movement of the support member 200 relative to the track assembly 104 is restricted and/or substantially prevented.

With embodiments, an adjuster assembly 230 may be engaged with a track assembly 104 when an anchor 400, 400' is in a disengaged position (see, e.g., FIG. 15A) such that the support member 200 is connected/secured to the track assembly 104 and/or is adjustable along the track assembly 104 such as via operation of an electric motor 232, which may cause rotation of the adjuster pinion 250 about an adjuster pinion axis 252, which may cause the adjuster pinion teeth 254 to engage the toothed portion 154 of the track assembly 104, which may cause movement of the support member 200 along the track assembly 104. Additionally and/or alternatively, an adjuster assembly 230 may be disengaged from and/or out of Z-direction alignment with a track assembly 104 when an anchor 400, 400' is in an unaligned position such that the support member 200 is removable from and/or insertable into a track assembly 104 in a plurality of locations along the track assembly 104. An adjuster assembly 230 may be disengaged from a track assembly 104 when an anchor 400, 400' is in an engaged position (see, e.g., FIGS. 15B and 15C), which may protect the adjuster assembly 230 (e.g., an adjuster pinion 250) from damage (at least to some degree) in the event of a collision and/or an application of abnormal stress (e.g., stress exceeding that which occurs during normal use and/or operation) to the support assembly 102 and/or the track assembly 104. With embodiments, an adjuster assembly 230 and/or an adjuster pinion 250 may default to an aligned position and/or an anchor 400, 400' may default to an engaged position.

With embodiments, such as generally illustrated in FIGS. 1A, 12, and 14-19B, a support member 200 may include an anchor cam 470, which may be configured to engage and/or facilitate adjustment of a corresponding anchor 400. An anchor cam 470 may be rotatably connected to a support member 200. An anchor cam 470 may be rotatable about an anchor cam axis 472, which may extend generally in a Y-direction. An anchor cam 470 may include an anchor cam hub 474 and/or an anchor cam protrusion 476. An anchor cam protrusion 476 may extend radially from an anchor cam hub 474 relative to an anchor cam axis 472. An anchor cam protrusion 476 may be configured to contact, abut, and/or engage a ramp portion 450 of a corresponding anchor 400. An anchor cam 470 may include an anchor cam projection 480, which may be connected to and/or extend radially from an anchor cam base 482. An anchor cam projection 480 may be configured to contact, abut, and/or engage an anchor adjustment portion 444 of a corresponding anchor 400. An anchor cam base 482 extend at least partially through an anchor opening 446 of an anchor 400 (e.g., generally in a Y-direction). An anchor cam protrusion 476 and an anchor cam projection 480 may be disposed at and/or connected to opposite ends of an anchor cam base 482 such that, for example, the anchor cam protrusion 476 and the anchor cam projection 480 may be disposed on opposite sides of an anchor 400. An anchor cam 470 may include on or more anchor cam teeth 478, which may extend radially relative to an anchor cam axis 472, via which an anchor cam 470 may engage an engagement member toothed portion 352 of a corresponding engagement member 350. In examples, an anchor cam 470 may be connected to an engagement member toothed portion 352 of an engagement member 350, which may be configured to rotate the anchor cam 470 about an anchor cam axis 472.

In embodiments, an anchor cam 470 may be configured such that, when disengaging an anchor 400 from a track assembly 104, an anchor cam projection 480 may adjust an anchor 400 generally downward in a Z-direction to disengage the anchor 400 from a toothed portion 154 of the track assembly 104 (e.g., via engaging an anchor adjustment portion 444) prior to an anchor cam protrusion 476 adjusting the anchor 400 away from the toothed portion 154 generally in a Y-direction (e.g., via engaging a ramp portion 450). Additionally and/or alternatively, an anchor cam 470 may be configured such that, when engaging an anchor 400 with a track assembly 104, an anchor cam protrusion 476 may adjust and/or allow adjustment of the anchor 400 toward a toothed portion 154 of the track assembly 104 generally in a Y-direction (e.g., via disengaging a ramp portion 450 and/or an anchor biasing member 456 applying a biasing force) prior to an anchor cam projection 480 adjusting and/or allowing adjustment of an anchor 400 generally upward in a Z-direction to engage the anchor 400 with the toothed portion 154 (e.g., via disengaging an anchor adjustment portion 444 and/or an anchor biasing member 456 applying a biasing force).

In embodiments, a support member 200 may include a first anchor cam 470 configured to engage a first anchor 400 and a second anchor cam 470' configured to engage a second anchor 400'. A second anchor cam 470' may include a second anchor cam axis 472', an anchor cam hub 474', an anchor cam protrusion 476', anchor cam teeth 478', an anchor cam projection 480', and/or an anchor cam base 482', some or all of which may be configured in the same or similar manner as corresponding features of a first anchor cam 470.

With embodiments, such as generally illustrated in FIGS. 15B and 15C, when an engagement cam 312 is in a first engagement cam position, an adjuster assembly 230 and/or an adjuster pinion 250 may be disengaged from a track assembly 104, and/or a support member 200 may be secured (e.g., fixed) to a track assembly 104 and adjustment and/or removal of a support member 200 from the track assembly 104 may be restricted and/or prevented via an anchor 400, 400'. In a first engagement cam position, a second actuation portion 336 may biased into contact with an engagement cam protrusion 318 (e.g., generally downward in a Z-direction), a first actuation portion 334 may (or may not) contact an adjuster assembly 230 (e.g., a flange 242), an anchor cam 470, 470' may be oriented such that (i) an anchor cam projection 480 does not engage/contact (or contacts to a lesser extent than in the second engagement cam position) an anchor adjustment portion 444 (see, e.g., FIG. 18A) and/or (ii) an anchor cam protrusion 476, 476' does not engage/contact (or contacts to a lesser extent than in the second engagement cam position) a ramp portion 450, 450' and/or engages a tilt protrusion 448 (see, e.g., FIG. 19A), an adjuster assembly 230 and/or an adjuster pinion 250 may be disengaged from a track assembly 104 (e.g., a toothed portion 154), and/or an anchor 400, 400' may be engaged with a toothed portion 154 of a track assembly 104 (e.g., disposed in an engaged position).

With embodiments, such as generally illustrated in FIGS. 1A and 15A, when an engagement cam 312 is in a second engagement cam position, an adjuster assembly 230 and/or an adjuster pinion 250 may be engaged with a track assembly 104, and/or removal of a support member 200 from a track assembly 104 may be restricted and/or prevented via the adjuster assembly 230 (e.g., depending on the position of the adjuster assembly 230), and/or a support member 200 may be adjustable relative to the track assembly 104, such as by actuating a motor 232 of the adjuster assembly 230 and/or rotating the adjuster pinion 250. In a second engagement cam position, a second actuation portion 336 may be disposed adjacent to and spaced apart from an engagement cam hub 316, a first actuation portion 334 may engage, contact, and/or press against an adjuster assembly 230 (e.g., a flange 242) such as generally in a Z-direction, an anchor cam 470, 470' may be oriented such that (i) an anchor cam projection 480 engages and/or contacts an anchor adjustment portion 444 (see, e.g., FIG. 18B) and/or (ii) an anchor cam protrusion 476, 476' engages and/or contacts a ramp portion 450, 450' and/or disengages a tilt protrusion 448 (see, e.g., FIG. 19B), an anchor 400, 400' may be disengaged from a toothed portion 154 of a track assembly 104 (e.g., disposed in a disengaged position), and/or an adjuster assembly 230 and/or an adjuster pinion 250 may be engaged with a toothed portion 154 of a track assembly 104. Additionally and/or alternatively, a second actuation portion 336 may contact and/or be biased against an engagement cam hub 316 when an engagement cam 312 is in a second engagement cam position.

With embodiments, such as generally illustrated in FIGS. 15A-15C, engaging and/or connecting a support assembly 102 on a track assembly 104 may include inserting (e.g., moving sliding, rotating, etc.) an adjuster pinion 250, an adjuster assembly 230, and/or one or more anchors 400, 400' into a track receptacle 130 and adjusting an adjuster pinion 250, an adjuster assembly 230, and/or one or more anchors 400, 400', generally in a Y-direction, into Z-direction alignment with a toothed portion 154 of a track assembly 104, which may include rotating the adjuster assembly 230 (e.g., about an adjuster axis 240) and/or an anchor 400, 400' (e.g., about an anchor axis 402, 402'), such as by rotating an anchor cam 470, 470' and/or by adjusting, sliding, moving, etc. the adjuster assembly 230, an anchor 400, 400', and/or a slider 270 for example. Engaging and/or connecting a support assembly 102 on a track assembly 104 may include adjusting an adjuster pinion 250, an adjuster assembly 230, and/or one or more anchors 400, 400' into engagement with a toothed portion 154 of a track assembly 104, such as by adjusting (e.g., moving sliding, rotating, etc.) an adjuster pinion 250, an adjuster assembly 230, and/or an anchor 400, 400' generally upward in a Z-direction, which may include adjusting (e.g., rotating) an actuation body 330, adjusting (e.g., rotating) an engagement cam 312, and/or adjusting (e.g., sliding) a slider 270. Disengaging and/or disconnecting a support assembly 102 and a track assembly 104 may include adjusting (e.g., moving sliding, rotating, etc.) an adjuster pinion 250, an adjuster assembly 230, and/or an anchor 400, 400', in an opposite direction for example, which may involve the above described process being conducted in reverse.

With embodiments, such as generally illustrated in FIGS. 6A-8, and 10-13, an adjuster assembly 230, an adjuster pinion 250, and/or an anchor 400, 400' may be adjusted to an engaged position, an aligned position, and/or an unaligned position via actuating an actuation shaft 292. Actuating an actuation shaft 292 may include rotating an actuation shaft 292 (e.g., about an engagement cam axis 314), which may cause a slider pinion 280 to rotate, which may cause the slider pinion 280 to engage a toothed slider portion 276 (e.g., via slider pinion teeth 294 and slider teeth 278), which may slide, shift, move, etc. the slider 270 (e.g., generally in an X-direction) relative to an adjuster assembly 230 and/or an anchor 400, 400', which may (i) adjust an adjuster assembly 230 and/or an adjuster pinion 250 from an unaligned position to an aligned position (e.g., via engaging a tab 236) and/or (ii) adjust an anchor 400, 400' from an unaligned position to an aligned position and/or to an engaged position (e.g., via engaging an anchor tab 442, 442'). Continued rotation of the actuation shaft 292 (e.g., in the same direction) may (i) adjust an adjuster assembly 230 and/or an adjuster pinion 250 from an aligned position to an engaged position (e.g., via rotating an engagement cam 312 from a first engagement cam position to a second engagement cam position) and/or (ii) further adjust the slider 270 (e.g., generally in an X-direction), which may adjust an anchor 400, 400' from an engaged position to a disengaged position (e.g., via engaging an anchor tab 442, 442' with a slider recess 304, 304'). An actuation shaft 292 may be rotated in an opposite direction, for example, to engage (and/or subsequently disengage) an anchor 400, 400' from a track assembly 104 and/or to disengage an adjuster assembly 230 and/or an adjuster pinion 250 from a track assembly 104, which may involve the above described process being conducted in reverse.

With embodiments, such as generally illustrated in FIGS. 1A, 1B, 9A-9C, and 14-19B, an adjuster assembly 230 and/or an adjuster pinon 250 may be (i) adjusted to an aligned position and/or an unaligned position via actuating a lever 212, and/or (ii) adjusted to an engaged position and/or an aligned position via rotating an actuation shaft 292. In such embodiments, an anchor 400, 400' may be adjusted to an engaged position, an aligned position, and/or an unaligned position via actuating a lever 212 and/or rotating an actuation shaft 292. Rotation of an actuation shaft 292 may, in some circumstances, be restricted and/or prevented when the adjuster assembly 230 and/or adjuster pinion 250 is in an unaligned position (e.g., is not in an aligned position or an engaged position). Additionally and/or alternatively, actuation of a lever 212 may, in some circumstances, be restricted and/or prevented when an adjuster assembly 230 and/or adjuster pinion 250 is engaged with a toothed portion 154 (e.g., is not in an aligned position or an unaligned position).

With embodiments, actuating (e.g., adjusting, rotating, etc.) a lever 212 of a support member 200 may cause the lever 212 to contact and/or press against a slider 270, which may cause the slider 270 to slide, shift, move, etc. (e.g., generally in an X-direction) relative to an adjuster assembly 230 and/or an anchor 400, 400' which may cause a toothed slider portion 276 of the slider 270 to engage a slider pinion 280 (e.g., via slider pinion teeth 294 and slider teeth 278), which may cause the slider pinion 280 to rotate about an axis (e.g., an engagement cam axis 314), which (i) may not cause an actuation shaft 292 to rotate such that an engagement cam 312 is not adjusted and does not adjust the adjuster assembly 230, and/or (ii) may cause an engagement body 310 to rotate, which may adjust an anchor 400, 400' to an engaged position, an aligned position, and/or an unaligned position. Adjusting a slider 270 via actuating a lever 212 may, additionally and/or alternatively, cause the slider 270 to (i) engage a tab 236 of an adjuster assembly 230, which may adjust an adjuster assembly 230 and/or an adjuster pinion 250 to an aligned position and/or an unaligned position, and/or (ii) engage an anchor tab 442, 442', which may adjust and/or facilitate adjustment of an anchor 400, 400' to an engaged position, an aligned position, and/or an unaligned position. For example and without limitation, a channel 298, 298' of a slider 270 may engage an anchor tab 442, 442' to adjust and/or guide an anchor 400, 400' from an unaligned position to an aligned position and/or from an aligned position to an engaged position, which may supplement an anchor biasing member 456, 456' that may (e.g., simultaneously) adjust/bias the anchor 400, 400' (e.g., via providing a biasing force that biases the anchor 400, 400' toward the engaged position).

With embodiments, rotating an actuation shaft 292 may rotate an engagement cam 312, which may adjust an adjuster assembly 230 and/or an adjuster pinion 250 to an engaged position and/or an aligned position. Additionally and/or alternatively, rotating an actuation shaft 292 may rotate an engagement body 310 (e.g., via rotating the engagement cam 312), which (i) may not cause a slider pinion 280 to rotate such that movement of a slider 270 is not caused by rotation of the actuation shaft 292, and/or (ii) may adjust an engagement member 350, 350' and/or an anchor cam 470, 470' to adjust an anchor 400, 400' to an engaged position, an aligned position, and/or an unaligned position. By configuring an actuation shaft 292 to simultaneously rotate an engagement body 310 and/or an engagement cam 312 for example, one or more anchors 400, 400' may be disengaged from a track assembly 104 and/or an adjuster assembly 230 may be engaged with the track assembly 104 (or vice versa) by a single action (e.g., rotating an actuation shaft 292), which may facilitate adjustment of a support assembly 102 relative to a track assembly 104.

For example and without limitation, upon insertion of a support assembly 102 into a track assembly 104, the anchors 400, 400', an adjuster assembly 230, and/or an adjuster pinion 250 may be disposed in or proximate to unaligned positions, such as to facilitate insertion/connection. Then, a lever 212 may be actuated to adjust a slider 270, which may (i) adjust an adjuster assembly 230 and/or an adjuster pinion 250 from an unaligned position to an aligned position (e.g., via engaging a tab 236) and/or (ii) adjust an anchor 400, 400' from an unaligned position and/or an aligned position to an engaged position (e.g., via an anchor biasing member 456, 456', engaging an anchor tab 442, 442', and/or rotating a slider pinion 280 to rotate an engagement body 310 without rotating the actuation shaft 292). Subsequently, an actuation shaft 292 may be rotated, which may (i) adjust an adjuster assembly 230 and/or an adjuster pinion 250 from an aligned position to an engaged position (e.g. via rotating an engagement cam 312) and/or (ii) adjust an anchor 400, 400' from an engaged position to an aligned position and/or unaligned position (e.g., via rotating the engagement cam 312 to rotate an engagement body 310 without rotating the slider pinion 280), which may unlock the support assembly 102 from the track assembly 104 to facilitate movement of the support assembly 102 via the adjuster assembly 230 along the track assembly 104. An actuation shaft 292 may be rotated in an opposite direction and/or a lever 212 may be actuated in an opposite direction, for example, to engage an anchor 400, 400' with a track assembly 104 and/or to disengage an adjuster assembly 230 and/or an adjuster pinion 250 from a track assembly 104, which may involve one or more portions of the above described process being conducted in reverse.

With embodiments, such as generally illustrated in FIG. 1B, adjusting an adjuster pinion 250 and/or an adjuster assembly 230 into and/or out of Z-direction alignment with a toothed portion 154 of a track assembly 104 may include rotating the adjuster pinion 250 and/or the adjuster assembly 230 about an adjuster axis 240, such as by adjusting, sliding, moving, etc. the adjuster assembly 230 and/or a slider 270. A slider 270 and/or an adjuster assembly 230 may be adjusted, moved, slid, etc. (e.g., generally in the X-direction), which may cause a tab 236 to engage and/or slide along the guide surface 282, which may cause the adjuster assembly 230 and/or an adjuster pinion 250 to adjust (e.g., rotate) toward and/or away from a toothed portion 154 of a track assembly 104. Adjusting a slider 270 and/or an adjuster assembly 230 to adjust an adjuster pinion 250 into Z-direction alignment with a toothed portion 154 of a track assembly 104 may include actuating a lever 212 and/or rotating an actuation shaft 292, which may cause the slider 270 to slide, shift, move, etc. relative to the adjuster assembly 230 (e.g., generally in an X-direction), which may cause a tab 236 to slide along a guide surface 282 toward an intermediate section 286 (e.g., from a first end 284), which may cause the adjuster assembly 230 to rotate about an adjuster axis 240, which may adjust the adjuster pinion 250 generally in a Y-direction toward the toothed portion 154 of the track assembly 104 (e.g., away from the slider 270). The slider 270 and/or the adjuster assembly 230 may be adjusted/ moved, in an opposite direction for example, to adjust the adjuster assembly 230 and/or an adjuster pinion 250 out of Z-direction alignment with a toothed portion 154 of a track assembly 104, which may involve the above described process being conducted in reverse.

With embodiments, such as generally illustrated in FIGS. 15A and 15B, adjusting an adjuster pinion 250 and/or an adjuster assembly 230 into and/or out of engagement with a toothed portion 154 of a track assembly 104 may include adjusting an adjuster assembly 230 generally in a Z-direction, such as by rotating an actuation body 330 and/or an engagement cam 312. When adjusting an engagement cam 312 to engage an adjuster assembly 230 and/or an adjuster pinion 250 with a toothed portion 154 of a track assembly 104 (e.g., adjusting the adjuster assembly 230 from the position of FIGS. 1B, 15B toward the position of FIGS. 1A, 15A), an engagement cam 312 may be rotated about an engagement cam axis 314, such as via rotating an actuation shaft 292, which may cause a second actuation portion 336 engaging an engagement cam protrusion 318 to adjust, move, slide, off of the engagement cam protrusion 318 (e.g., to a position in which the second actuation portion 336 is disposed spaced slightly apart from and/or in contact with an engagement cam hub 316), which may cause the actuation body 330 to rotate about an actuation body axis 332, which may cause a first actuation portion 334 to move and/or adjust generally upward in a Z-direction such that it adjusts, presses, pushes, etc. a flange 242 of an adjuster assembly 230 generally upward in a Z-direction, which may cause the adjuster assembly 230 and/or an adjuster pinion 250 to move generally upward in a Z-direction to engage a toothed portion 154 of a track assembly 104. An actuation shaft 292, an engagement cam 312, and/or an actuation body 330 may be adjusted, moved, rotated, etc., in an opposite direction for example, to disengage the adjuster assembly 230 and/or an adjuster pinion 250 from a toothed portion 154 of a track assembly 104 (e.g., to adjust the adjuster assembly 230 from the position of FIG. 15A toward the position of FIG. 15B), which may involve the above described process being conducted in reverse.

Figure 13:
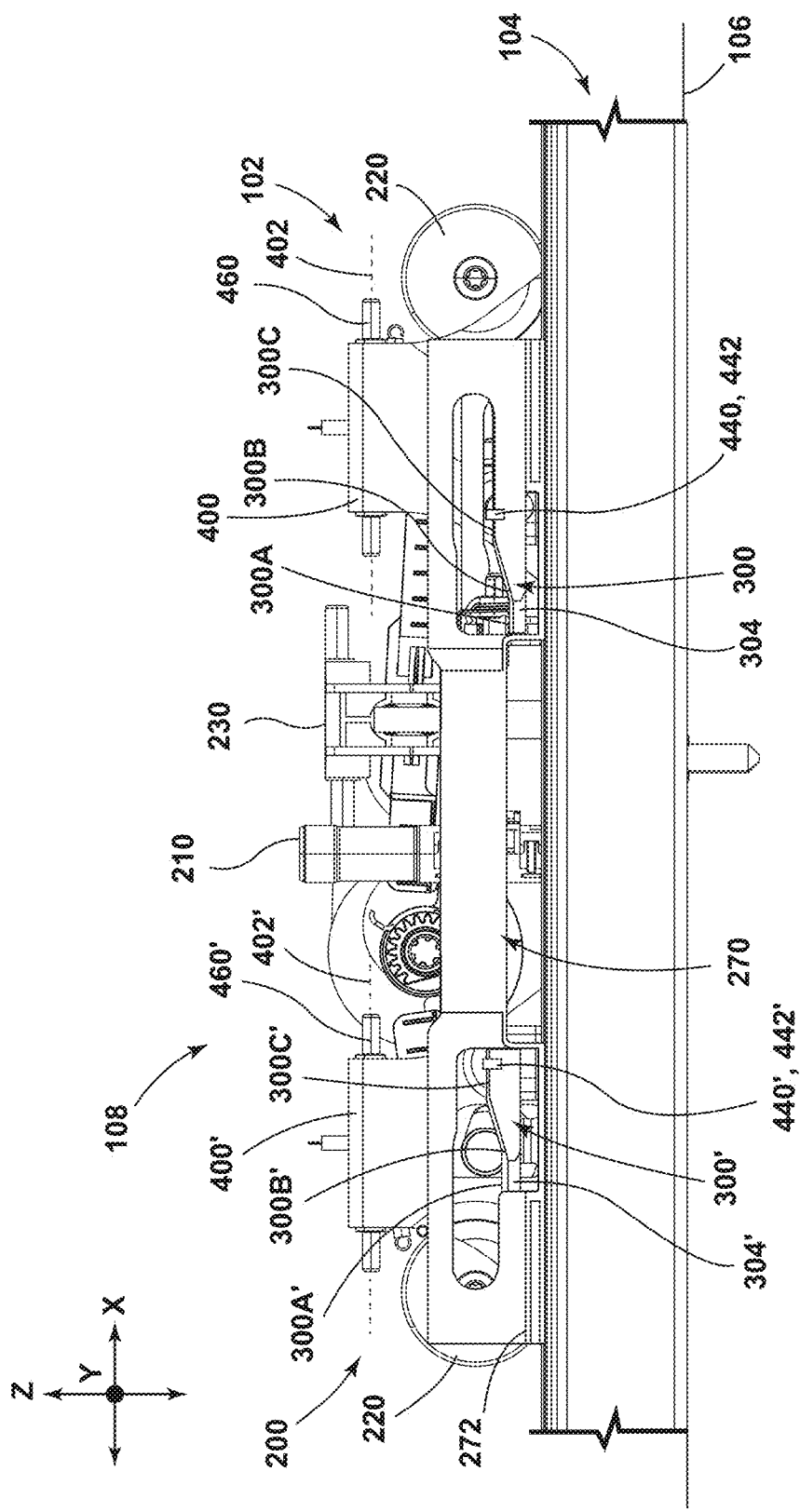
FIG. 13 is a side view generally illustrating an embodiment of a track system with an anchor in an engaged position according to teachings of the present disclosure.

With embodiments, such as generally illustrated in FIGS. 12 and 13, engaging and/or disengaging an anchor 400, 400' with a toothed portion 154 of a track assembly 104 may include adjusting, sliding, moving, etc. an anchor 400, 400' and/or a slider 270. A slider 270 and/or an anchor 400, 400' may be adjusted, moved, slid, etc. (e.g., generally in the X-direction), such as via rotating an actuation shaft 292 and/or actuating a lever 212, which may cause an anchor tab 442, 442' to engage and/or slide along a first slider wall 300, 300', which may cause an anchor 400, 400' to adjust (e.g., rotate, slide, raise, lower, etc.) toward an aligned position, an unaligned position, an engaged position, and/or a disengaged position, which may connect (e.g., temporarily fix) and/or disconnect a support member 200 and a track assembly 104. In examples, adjustment of an anchor tab 442, 442' within a slider channel 298, 298' and/or along a first slider wall 300, 300' may supplement and/or may be supplemented by an anchor biasing member 456, which may adjust/bias an anchor 400, 400' toward an engaged position.

With embodiments, adjusting, moving, and/or sliding a slider 270 and/or an anchor 400, 400' to engage an anchor 400, 400' with a toothed portion 154 of a track assembly 104 (e.g., toward the position of the anchor 400, 400' shown in FIGS. 12 and 13), may include adjusting/moving an anchor tab 442, 442' along a first section 300A, 300A' of a first slider wall 300, 300' (e.g., toward a second section 300B, 300B').

In embodiments, further adjustment of the slider 270 and/or an anchor 400, 400' (e.g., generally in the same X-direction) may cause the anchor tab 442, 442' to adjust/move along a second section 300B, 300B' of a first slider wall 300, 300' (e.g., toward a third section 300C, 300C'), which may cause an anchor 400, 400' to adjust generally downward in a Z-direction away from the toothed portion 154 of the track assembly 104, at least to some degree, which may facilitate rotation of the hooked portion 408 under the toothed portion 154. Adjusting/moving an anchor tab 442, 442' along a second section 300B, 300B' of a first slider wall 300, 300' (e.g., toward a third section 300C, 300C') may, additionally and/or alternatively, cause an anchor 400, 400' to rotate about an anchor axis 402, 402', which may adjust a toothed anchor portion 412, 412' generally in a Y-direction toward the toothed portion 154 of the track assembly 104 (e.g., away from the slider 270), which may cause the toothed anchor portion 412, 412' to be disposed in Z-direction alignment with the toothed portion 154.

With embodiments, further adjustment of the slider 270 and/or an anchor 400, 400' (e.g., generally in the same X-direction) may cause an anchor tab 442, 442' to adjust/move along a third section 300C, 300C' of a first slider wall 300, 300' (e.g., toward a slider recess 304, 304'), which may cause an anchor 400, 400' to adjust generally upward in a Z-direction toward the toothed portion 154 of the track assembly 104 (e.g., toward an engaged position). Adjustment of an anchor 400, 400' toward and/or into an engaged position may cause at least some (e.g., substantially all) of the anchor teeth 416' of the first toothed anchor portion 412A' of the second anchor 400' to engage the toothed portion 154 of a track assembly 104 and at least a first subset of anchor teeth 416A of the second toothed anchor portion 412B of the first anchor 400 to engage the toothed portion 154 of a track assembly 104 (e.g., the first anchor 400 may be in a default position), which may connect (e.g., temporarily fix) a support member 200 and a track assembly 104 to one another (see, e.g., FIGS. 15B, 16A, 17A). Further adjustment of the slider 270 and/or an anchor 400, 400' generally in an X-direction may cause the first anchor 400 and/or an anchor shaft 460 to tilt/rotate about an offset tilt axis 462 (e.g., from a default position toward a tilted position), such as generally described in detail below.

With embodiments, further adjustment of the slider 270 generally in an X-direction (e.g., via rotating an actuation shaft 292 to engage an adjuster assembly 230 with the track assembly 104) may cause an anchor tab 442, 442' to engage a slider recess 304, 304', which may cause an anchor 400, 400' to disengage a toothed portion 154 of a track assembly 104, which may facilitate adjustment of a support assembly 102 and/or a support member 200 along the track assembly 104.

The slider 270 and/or an anchor 400, 400' may be adjusted/moved, in an opposite direction for example, to disengage an anchor 400, 400' and/or a toothed anchor portion 412, 412' from a toothed portion 154 of a track assembly 104 (e.g., to adjust an anchor 400, 400' away from the position of FIGS. 12 and 13), which may involve the above described process being conducted in reverse.

With embodiments, such as generally illustrated in FIGS. 15A-15C, engaging and/or disengaging an anchor 400, 400' from a toothed portion 154 of a track assembly 104 may, additionally and/or alternatively, include adjusting (e.g., rotating) an engagement body 310 about an axis extending generally in a Y-direction (e.g., an engagement cam axis 314). Rotating an engagement body 310, such as via rotating an actuation shaft 292 and/or adjusting a slider 270, may adjust, move, slide, etc. an engagement member 350, 350' generally in an X-direction, which may cause an anchor cam 470, 470' to adjust (e.g., rotate about an anchor cam axis 472, 472'), which may cause an anchor 400, 400' to engage and/or disengage a toothed portion 154 of a track assembly 104, which may connect (e.g., temporarily fix) and/or disconnect the support member 200 and the track assembly 104.

With embodiments, when engaging an anchor 400, 400' with a toothed portion 154 of a track assembly 104 (e.g., adjusting an anchor 400, 400' from the position of FIGS. 1A, 1B, 15A toward the position of FIG. 15B), rotation of an engagement body 310 about an engagement cam axis 314 and/or about another axis extending generally in a Y-direction, such as via rotating an actuation shaft 292 and/or actuating a lever 212, may adjust, move, slide, etc. an engagement member 350, 350' generally in an X-direction toward the engagement body 310 (e.g., via adjusting an engagement member 350, 350' within a slot or groove of the engagement body 310), which may cause an engagement member toothed portion 352, 352' to engage, contact, etc. one or more anchor cam teeth 478, 478', which may cause an anchor cam 470, 470' to rotate about an anchor cam axis 472, 472', which may cause an anchor cam protrusion 476, 476' to slide along a ramp portion 450, 450' generally upward in a Z-direction toward a first ramp end 452, 452' such as from a second ramp end 454, 454' (e.g., from the position of FIG. 19B toward the position of FIG. 19A), which may adjust and/or allow for adjustment of an anchor 400, 400' generally in a Y-direction (e.g., via rotating about an anchor axis 402, 402', such as with a biasing force provided by an anchor biasing member 456), which may cause a toothed anchor portion 412, 412' to move into Z-direction alignment with a toothed portion 154 of a track assembly 104.

In embodiments, rotating an anchor cam 470, 470' about an anchor cam axis 472, 472' may, additionally, alternatively, and/or simultaneously, adjust an anchor cam projection 480 (e.g., from the position of FIG. 18B toward the position of FIG. 18A) to disengage an anchor adjustment portion 444 and/or to press against the anchor adjustment portion 444 to a lesser extent, which may adjust and/or allow adjustment of an anchor 400, 400' generally upward in a Z-direction. Adjustment of an anchor 400, 400' may be conducted via (i) rotating the anchor 400, 400' about an anchor axis 402, 402', such as with a biasing force provided by an anchor biasing member 456 and/or (ii) an anchor cam protrusion 476, 476' engaging a tilt protrusion 448, 448'), which may cause the anchor 400, 400' to translate upward, which may cause at least some of the anchor teeth 416, 416' of the anchors 400, 400' to engage the toothed portion 154 of a track assembly 104. Such engagement between the anchor teeth 416, 416' and the toothed portion 154 may connect (e.g., temporarily fix) a support member 200 and a track assembly 104 to one another (see, e.g., FIGS. 15B, 16A, 17A).

Figure 17B:
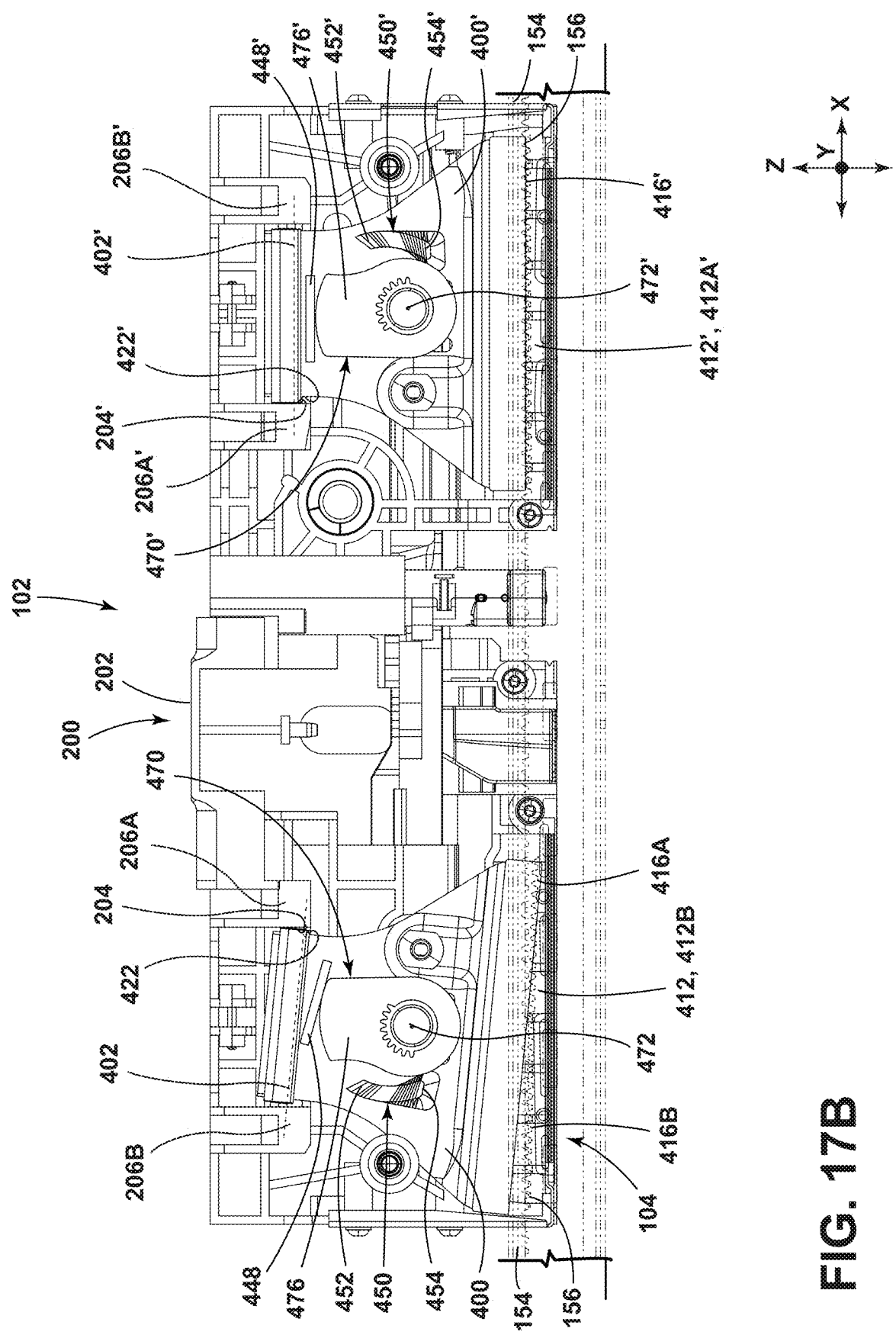

Additionally and/or alternatively, sliding an anchor cam protrusion 476, 476' along a ramp portion 450, 450' generally upward in a Z-direction toward a first ramp end 452, 452' (e.g., when the anchors 400, 400' are engaged with the track assembly 104 and the first anchor 400 is in a default position) may cause the anchor cam protrusion 476, 476' to engage, contact, and/or press against the tilt protrusion 448, 448' of the anchor 400, 400', which may (i) adjust (or facilitate adjustment of) the anchor 400, 400' generally upward in a Z-direction, (ii) restrict and/or prevent an anchor 400, 400' from disengaging the toothed portion 154 of the track assembly 104, and/or (iii) tilt/rotate the anchor 400, 400' about an axis extending generally in a Y-direction (e.g., an offset tilt axis 462), such as from a default position (see, e.g., FIGS. 15B, 16A, 17A) toward a tilted position (see, e.g., FIGS. 15C, 16B, 17B).

With embodiments, tilting/rotating an anchor 400 about an offset tilt axis 462 (e.g., from a default position generally shown in FIGS. 15B, 16A, 17A toward a tilted position generally shown in FIGS. 15C, 16B, 17B) may cause at least a portion of the first anchor 400 (e.g., a portion of an anchor shaft 460 connected thereto) to move generally in an X-direction (e.g., toward or away from the second anchor 400'), which may cause a contact surface 422 of the first anchor 400 to engage, contact, and/or press against a contact surface 204 of the support member 200 (and/or a projection 206A thereof), which may cause at least a portion of the support member 200 (e.g., a body 202) to adjust and/or shift (at least to some degree) generally in an X-direction. A shift of the support member 200 may cause a contact surface 204' of a support member 200 (and/or a projection 206A' thereof) to engage, contact, and/or press against a contact surface 422' of a second anchor 400' (and/or an anchor shaft 460' connected thereto), which may cause both anchors 400, 400' to simultaneously engage (e.g., to contact, to be pressed/jammed against, etc.) the body 202 of the support member 200. Such engagement of both anchors 400, 400' with the body 202 may reduce play between the anchors 400, 400' and the body 202 of the support member 200, which may reduce play between the support assembly 102 (e.g., the support member 200) and the track assembly 104 (see, e.g., FIGS. 15C, 16B, 17B). The play may be a result of a rotational and/or translational connection of the anchors 400, 400' that may facilitate adjustment of the anchors between engaged, aligned, and/or unaligned positions. Reducing or substantially eliminating the play in the engaged positions of the anchors 400, 400' may be desirable, such as to limit rattling noises and/or unintended movements of the support member 200 (and any components, such as a seat, connected thereto) relative to the track assembly 104.

In some embodiments, track teeth 156 of a toothed portion 154 of a track assembly 104 may be configured to substantially receive the anchor teeth 416, 416' (e.g., may be at least as large or larger than the anchor teeth 416, 416'). For example and without limitation, in an engaged position of the second anchor 400', the anchor teeth 416' may be substantially received by the track teeth 156 such that both sides of some or all anchor teeth 416' are in direct contact with track teeth 156 such that there is not a material amount of play, if any, between the anchor teeth 416' (and the anchor 400') relative to the track assembly 104. In some other configurations, tilting/rotating an anchor 400 about an offset tilt axis 462 (e.g., from a default position toward a tilted position) may cause one or more of the second subset of anchor teeth 416B of the first anchor 400 to engage the toothed portion 154 of the track assembly 104, which may cause the anchor teeth 416' of the second anchor 400' to be pressed or jammed into the track teeth 156 of the track assembly 104, which may reduce play between one or more of the anchors 400, 400' and the track assembly 104.

An engagement cam 312 and/or an actuation body 330 may be adjusted, moved, rotated, etc., in an opposite direction, for example, to disengage an anchor 400, 400' from a toothed portion 154 of a track assembly 104 (e.g., to adjust an anchor 400, 400' from the position of FIG. 15C toward the position of FIG. 15A), which may involve one or more portions of the above described process being conducted in reverse.

In embodiments, an anchor 400, 400' and an adjuster pinion 250 may be configured to selectively engage the toothed portion 154. A track system 100 may, in some circumstances, be configured such that the anchor 400, 400' and the adjuster pinion 250 are not simultaneously engaged with the toothed portion 154, and may, in some circumstances, both be disengaged from the toothed portion 154, such as to facilitate vertical removal of a support assembly 102 from a track assembly 104 in a plurality of locations along the track assembly 104.

With embodiments, a method of operating a track system 100 may include providing a track assembly 104 and one or more support assemblies 102. The support assembly 102 and/or one or more support members 200 thereof may be connected with the track assembly 104, such as from a vertical direction (e.g., a Z-direction). The support assembly 102 may include an adjuster assembly 230 and/or one or more anchors 400, 400'. At least a portion of the adjuster assembly 230 (e.g., a pinion 250) and/or a portion of an anchor 400, 400' (e.g., a hook portion 408) may be adjusted/moved (e.g., rotated) into Z-direction alignment with a toothed portion 154 of the track 120. At least a portion of the adjuster assembly 230 and/or an anchor 400, 400' may be adjusted into engagement with the toothed portion 154 (e.g., into an engaged position). Removing the support assembly 102 from the track assembly 104 may involve disengaging the adjuster assembly 230 and/or an anchor 400, 400' from the toothed portion 154 and/or adjusting the adjuster assembly 230 and/or an anchor 400, 400' out of Z-direction alignment with the toothed portion 154, which may include performing the steps of the above described process in an opposite direction. The adjuster assembly 230 and/or an anchor 400, 400' may, for example and without limitation, be moved (e.g., rotated) into/out of Z-direction alignment with the toothed portion 154 and/or into/out of engagement with the toothed portion 154 via adjusting a slider 270, an engagement body 310, an engagement cam 312, an actuation body 330, one or more engagement members 350, 350', and/or one or more anchor cams 470, 470' as previously described.

While embodiments of a track system 100 are generally described in connection with a support assembly 102 connected with a track assembly 104, multiple support assemblies 102, which may include one or a plurality of support members 200, which may be connected to the same track assembly 104, which may include one or a plurality of pairs of tracks 120, 150 (e.g., for a plurality of seats in a vehicle 108).

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. An anchor for a support member of a track system, comprising:

an anchor body connectable to said support member;

a toothed anchor portion including a plurality of anchor teeth configured to engage a plurality of track teeth of a toothed portion of a track assembly; and wherein the anchor body and the toothed anchor portion are connected to one another to collectively form a hook portion configured to engage said toothed portion of said track assembly; and wherein at least a subset of anchor teeth of the plurality of anchor teeth includes a curved or angled row of anchor teeth.

2. The anchor of claim 1, wherein:

the anchor body includes a rotation axis disposed at or about a first end of the anchor body;

the anchor body includes a tilt axis extending substantially perpendicular to the rotation axis; and the toothed anchor portion and the tilt axis are disposed at or about a second end of the anchor body, which is disposed opposite the first end of the anchor body.

3. The anchor of claim 2, wherein the tilt axis is disposed offset from a center of the anchor body.

4. The anchor of claim 1, including an anchor shaft connected to the anchor body;

wherein the anchor shaft defines a rotation axis about which the toothed anchor portion is rotatable; and the anchor shaft is configured to tilt such that the rotation axis tilts.

5. The anchor of claim 1, wherein:

the plurality of anchor teeth extend from the toothed anchor portion generally toward a rotation axis of the anchor body; and at least some anchor teeth of the curved or angled row of anchor teeth are disposed farther from the rotation axis than other anchor teeth of the curved or angled row of anchor teeth.

6. The anchor of claim 5, wherein a distance between the rotation axis and the curved or angled row of anchor teeth increases in a direction toward an edge of the toothed anchor portion.

7. The anchor of claim 1, wherein a second subset of anchor teeth of the plurality of anchor teeth are disposed one after another in a substantially linear manner to define a substantially linear row of anchor teeth.

8. A track system, comprising:

a track assembly including a toothed portion having a plurality of track teeth; and a support assembly including a removable support member adjustably connected to the track assembly;

wherein the support member includes at least two anchors configured to connect the support assembly to the track assembly;

the at least two anchors include a first anchor and a second anchor;

the first anchor includes a plurality of first anchor teeth configured to engage the plurality of track teeth;

the second anchor includes a plurality of second anchor teeth configured to engage the plurality of track teeth;

the plurality of first anchor teeth includes a first subset of first anchor teeth and a second subset of first anchor teeth; and the second subset of first anchor teeth are disposed one after another in a curved or angled configuration.

9. The track system of claim 8, wherein:

the first anchor is adjustable into a first anchor engaged position in which at least some of the plurality of first anchor teeth are engaged with the plurality of track teeth; and the second anchor is adjustable into a second anchor engaged position in which the plurality of second anchor teeth are engaged with the plurality of track teeth.

10. The track system of claim 8, wherein:
the first anchor includes a first rotation axis;
the second anchor includes a second rotation axis; and
the first anchor includes a tilt axis extending substantially perpendicular to the first rotation axis.

11. The track system of claim 8, wherein the first subset of first anchor teeth are disposed one after another in a substantially linear manner to define a substantially linear row of first anchor teeth.

12. The track system of claim 11, wherein:
the first anchor is adjustable about a tilt axis to a default position and to a tilted position;
when the first anchor is in the default position, the first subset of first anchor teeth are engaged with the plurality of track teeth and the second subset of first anchor teeth are not engaged with the plurality of track teeth; and
when the first anchor is in the tilted position, at least some of the second subset of first anchor teeth are engaged with the plurality of track teeth.

13. The track system of claim 12, wherein:
the second anchor is adjustable into an engaged position in which the plurality of second anchor teeth are engaged with the plurality of track teeth; and
when the first anchor is in the tilted position, the second anchor is in the engaged position and is pressed against a body of the support member to reduce play between the support assembly and the track assembly.

14. A method of operating the track system of claim 8, the method comprising:
inserting the support member into the track assembly in a substantially vertical direction;
adjusting the first anchor into a first anchor engaged position in which at least some of the plurality of first anchor teeth are engaged with the plurality of track teeth; and
adjusting the second anchor into a second anchor engaged position in which the plurality of second anchor teeth are engaged with the plurality of track teeth.

15. The method of claim 14, wherein adjusting the second anchor into the engaged position includes providing sufficient resistance to dynamic events to substantially prevent unintended movement of the support assembly.

16. The method of claim 14, including pressing a body of the support member against the second anchor to reduce play between the support assembly and the track assembly via tilting the first anchor into contact with the body of the support member.

17. The method of claim 16, wherein tilting the first anchor includes tilting the first anchor about an offset tilt axis that is offset from a force vector associated with contact between a tilt protrusion of the first anchor and an anchor cam; and
the offset tilt axis extends substantially perpendicular to the first anchor.

18. The method of claim 14, wherein:
the first subset of first anchor teeth are disposed one after another in a substantially linear manner to define a substantially linear row of first anchor teeth; and
adjusting the first anchor into the first anchor engaged position includes adjusting the first anchor such that the second subset of first anchor teeth are not engaged with the plurality of track teeth and the first subset of first anchor teeth are engaged with the plurality of track teeth.

19. The method of claim 18, including adjusting the first anchor about an offset tilt axis from the first anchor engaged position toward a tilted position such that at least some of the second subset of first anchor teeth are engaged with the plurality of track teeth.

20. The method of claim 19, including engaging an anchor cam protrusion of an anchor cam with a tilt protrusion of the first anchor, via rotating the anchor cam, to adjust the first anchor about the offset tilt axis;
wherein adjusting the first anchor about the offset tilt axis includes applying a substantially longitudinal force to a body of the support member to cause the body of the support member to contact the second anchor and reduce play between the second anchor and the support member.

* * * * *